(12) United States Patent
Fang et al.

(10) Patent No.: US 12,034,918 B2
(45) Date of Patent: Jul. 9, 2024

(54) SYSTEMS AND METHODS FOR IMAGE CODING

(71) Applicant: ZHEJIANG DAHUA TECHNOLOGY CO., LTD., Zhejiang (CN)

(72) Inventors: Cheng Fang, Hangzhou (CN); Dong Jiang, Hangzhou (CN); Jucai Lin, Hangzhou (CN); Jun Yin, Hangzhou (CN); Feiyang Zeng, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 264 days.

(21) Appl. No.: 17/447,419

(22) Filed: Sep. 11, 2021

(65) Prior Publication Data

US 2022/0021874 A1  Jan. 20, 2022

Related U.S. Application Data

(63) Continuation of application No. PCT/CN2020/078870, filed on Mar. 11, 2020.

(30) Foreign Application Priority Data

Mar. 12, 2019 (CN) .......................... 201910186065.2
Mar. 12, 2019 (CN) .......................... 201910191221.4
(Continued)

(51) Int. Cl.
*H04N 19/11* (2014.01)
*H04N 19/176* (2014.01)
*H04N 19/56* (2014.01)

(52) U.S. Cl.
CPC ........... *H04N 19/11* (2014.11); *H04N 19/176* (2014.11); *H04N 19/56* (2014.11)

(58) Field of Classification Search
None
See application file for complete search history.

(56) References Cited

U.S. PATENT DOCUMENTS

| 11,750,803 B2* | 9/2023 | Lee ...................... H04N 19/593 |
| | | 375/240.12 |
| 2010/0232505 A1 | 9/2010 | Thoreau et al. |

(Continued)

FOREIGN PATENT DOCUMENTS

| CN | 101064849 A | 10/2007 |
| CN | 102685474 A | 9/2012 |

(Continued)

OTHER PUBLICATIONS

International Search Report in PCT/CN2020/078870 mailed on Jun. 5, 2020, 4 pages.

(Continued)

*Primary Examiner* — Reza Aghevli
(74) *Attorney, Agent, or Firm* — METIS IP LLC

(57) ABSTRACT

A method for intra prediction may include obtaining a target block to be encoded in a target image. The method may also include determining a final most probably mode (MPM) list of the target block based on at least one of (a) first intra-prediction modes configured to encode two or more adjacent blocks of the target block, (b) a width and a height of the target block, (c) statistical information of second intra-prediction modes configured to encode a plurality of first encoded blocks associated with the target block, or (d) texture features of a plurality of second encoded blocks associated with the target block. The method may also include determining, based on the final MPM list, a target intra-prediction mode corresponding to the target block. The method may also include encoding, based on the target intra-prediction mode, the target block.

20 Claims, 14 Drawing Sheets

(30) Foreign Application Priority Data

Jun. 17, 2019 (CN) .......................... 201910523230.9
Jun. 25, 2019 (CN) .......................... 201910555588.X

(56) References Cited

U.S. PATENT DOCUMENTS

| | | | |
|---|---|---|---|
| 2010/0309977 A1 | 12/2010 | Andersson et al. | |
| 2012/0307894 A1 | 12/2012 | Chien et al. | |
| 2013/0114707 A1 | 5/2013 | Seregin et al. | |
| 2013/0243087 A1 | 9/2013 | Lee et al. | |
| 2013/0266064 A1* | 10/2013 | Zhang .................... | H04N 19/61 375/240.12 |
| 2015/0098506 A1 | 4/2015 | Oh et al. | |
| 2015/0181226 A1 | 6/2015 | Park | |
| 2015/0304670 A1 | 10/2015 | Liu et al. | |
| 2016/0249056 A1* | 8/2016 | Tsukuba ............... | H04N 19/174 |
| 2017/0142442 A1* | 5/2017 | Tsukuba ................. | H04N 19/96 |
| 2017/0199494 A1 | 7/2017 | Roelle et al. | |
| 2017/0302961 A1* | 10/2017 | Ikai ...................... | H04N 19/597 |
| 2017/0332084 A1 | 11/2017 | Seregin et al. | |
| 2018/0041762 A1* | 2/2018 | Ikai ........................ | H04N 19/33 |
| 2018/0098064 A1 | 4/2018 | Seregin et al. | |
| 2018/0124397 A1 | 5/2018 | Yoo et al. | |
| 2018/0332284 A1 | 11/2018 | Liu et al. | |
| 2019/0028701 A1 | 1/2019 | Yu et al. | |
| 2019/0166370 A1* | 5/2019 | Xiu ........................ | H04N 19/11 |
| 2019/0222839 A1 | 7/2019 | Jang et al. | |
| 2019/0306526 A1* | 10/2019 | Cho ........................ | G06N 3/047 |
| 2020/0260120 A1* | 8/2020 | Hanhart ............... | H04N 19/597 |
| 2020/0275124 A1 | 8/2020 | Ko et al. | |
| 2021/0136395 A1* | 5/2021 | Jun ........................ | H04N 19/70 |
| 2021/0203926 A1* | 7/2021 | Yamori ................ | H04N 19/593 |
| 2021/0218959 A1 | 7/2021 | Jang et al. | |

FOREIGN PATENT DOCUMENTS

| | | | | |
|---|---|---|---|---|
| CN | 102857750 | A | 1/2013 | |
| CN | 103384326 | A | 11/2013 | |
| CN | 108366256 | A | 8/2018 | |
| CN | 108737840 | A | 11/2018 | |
| CN | 109547782 | A | 3/2019 | |
| EP | 2942954 | A2 | 11/2015 | |
| EP | 3422716 | A1 | 1/2019 | |
| EP | 3422717 | A1 | 1/2019 | |
| EP | 3629579 | A1 | 4/2020 | |
| WO | WO-2013039676 | A1 * | 3/2013 | ............. H04N 19/11 |
| WO | 2018202558 | A1 | 11/2018 | |

OTHER PUBLICATIONS

Written Opinion in PCT/CN2020/078870 mailed on Jun. 5, 2020, 5 pages.
First Office Action in Chinese Application No. 201910191221.4 mailed on Aug. 31, 2020, 12 pages.
First Office Action in Chinese Application No. 201910186065.2 mailed on Sep. 10, 2020, 25 pages.
The Second Office Action in Chinese Application No. 201910555588.X mailed on Jun. 23, 2021, 18 pages.
First Office Action in Chinese Application No. 201910523230.9 mailed on Dec. 28, 2020, 20 pages.
First Office Action in Chinese Application No. 201910555588.X mailed on Dec. 28, 2020, 18 pages.
Zhang, Dongdong et al., Fast Intra Mode Decision for HEVC Based on Texture Characteristic from RMD and MPM, 2014 IEEE Visual Communications and Image Processing Conference, 510-513, 2014.
Series H: Audiovisual and Multimedia Systems Infrastructure of audiovisual services—Coding of moving video, ITU-T-H.264, 2013.
Series H: Audiovisual and Multimedia Systems Infrastructure of audiovisual services—Coding of moving video, ITU-T-H.265, 2015.
Yoon, Yong-Uk et al., CE3-related: MPM Modifications for Intra Mode Coding, Joint Video Experts Team (JVET) of ITU-T SG 16 WP 3 and ISO/IEC JTC 1/SC 29/WG 11 12th Meeting: Macao, 2018, 5 pages.
Yu, Yue et al., On MPM determination and Planar mode signaling, Joint Collaborative Team on Video Coding(JCT-VC) of ITU-T SG16 WP3 and ISO/IEC JTC1/SC29/WG11 8th Meeting, 2012, 6 pages.
E.Francois et al., CE6b: Intra mode coding with 4 MPMs and mode ranking, Joint Collaborative Team on Video Coding(JCT-VC) of ITU-T SG16 WP3 and ISO/IEC JTC1/SC29/WG11 7th Meeting, 2011, 8 pages.
Vadim Seregin et al., Neighbor based intra most probable modes list derivation, Joint Video Exploration Team (JVET) of ITU-T SG16 WP3 and ISO/IEC JTC 1/SC 29/WG 11 3rd Meeting, 2016, 4 pages.
Mathias Wien, Variable Block-Size Transforms for H.264/AVC, IEEE Transactions on Circuits and Systems for Video Technology, 13(7):604-613, 2003.
M. Albrecht et al., Description of SDR, HDR, and 360° video coding technology proposal by Fraunhofer HHI, Joint Video Experts Team (JVET) of ITU-T SG 16 WP3 and ISO/IEC JTC 1/SC 29/WG 11 10th Meeting, 2018, 123 pages.
Huang, Hui et al., Efficient intra prediction modes coding based on regional maximum probability criterion, Journal of Circuits and Systems, 13(5): 52-57, 2008.
Jiao, Changzhe, Study of Texture-similarity Judgment Based Fast Intra-prediction Algorithm, Full-text Database of China's Outstanding Master's Thesis, 2012, 76 pages.
Mahsa T. Pourazad et al., HEVC: The New Gold Standard for Video Compression, IEEE Consumer Electronics Magazine, 2012, 11 pages.
Jinho Lee et al., CE3: Simplification of MPM derivation (CE3-3.2), Joint Video Experts Team (JVET) of ITU-T SG 16 WP 3 and ISO/IEC JTC 1/SC 29/WG 11 14th Meeting, 2019, 4 pages.
Junaid Tariq et al., Efficient Intra and Most Probable Mode (MPM) Selection Based on Statistical Texture Features, 2015 IEEE International Conference on Systems, Man, and Cybernetics, 1776-1781, 2015.
Zhang, Tao, Research on High Effiency Intra Coding in Video Compression, China Doctoral Dissertation Full-text Database, 2017, Part One, 100 pages.
Zhang, Tao, Research on High Effiency Intra Coding in Video Compression, China Doctoral Dissertation Full-text Database, 2017, Part Two, 58 pages.
Benjamin Bross, CE3: Multiple reference line intra prediction, Joint Video Experts Team (JVET) of ITU-T SG 16 WP 3 and ISO/IEC JTC 1/SC 29/WG 11 12th Meeting, 2018, 6 pages.
Benjamin Bross et al., CE3: Multiple reference line intra prediction (JVETK0051), Joint Video Experts Team (JVET) of ITU-T SG 16 WP3 and ISO/IEC JTC 1/SC 29/WG 11 11th Meeting, 2018, 8 pages.
The Extended European Search Report in European Application No. 20769666.7 mailed on May 6, 2022, 11 pages.
Chen, Jianle et al., Algorithm Description of Joint Exploration Test Model 5, Joint Video Exploration Team (JVET) of ITU-T SG 16 WP 3 and ISO/IEC JTC 1/SC 29/WG 11 5th Meeting, 2017, 44 pages.
Chen, Jianle et al., Algorithm Description of Joint Exploration Test Model 7 (JEM7), Joint Video Exploration Team (JVET) of ITU-T SG 16 WP 3 and ISO/IEC JTC 1/SC 29/WG 11 7th Meeting, 2017, 48 pages.
Chen, Jianle et al., Algorithm Description for Versatile Video Coding and Test Model 4 (VTM 4), Joint Video Experts Team (JVET) of ITU-T SG 16 WP 3 and ISO/IEC JTC 1/SC 29/WG 11 13th Meeting, 2019, 62 pages.

* cited by examiner

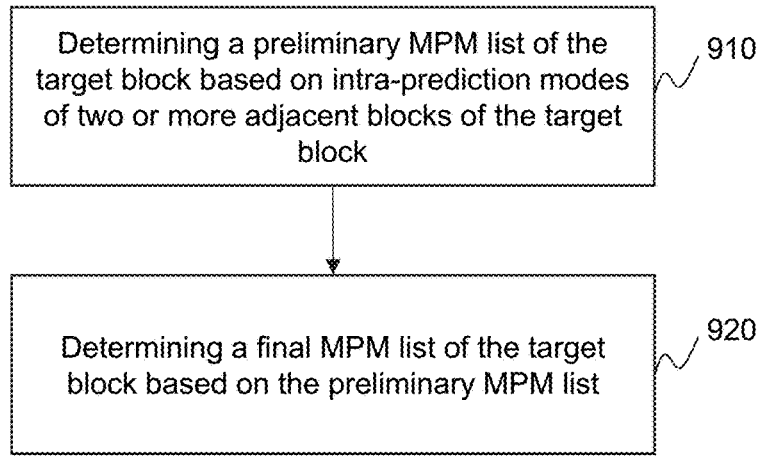
FIG. 9
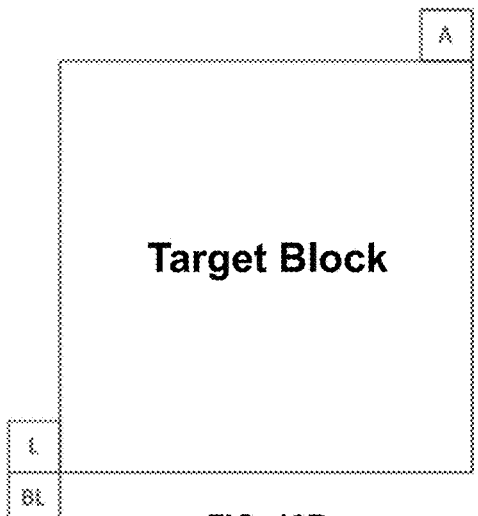
FIG. 10A
FIG. 10B
FIG. 10C

1600

```
┌─────────────────────────────────────────────────────────────┐
│ Determining an MPM candidate list of the target block based on │ ──1610
│ statistical information of intra-prediction modes of a plurality of encoded │
│                          blocks                             │
└─────────────────────────────────────────────────────────────┘
                              │
                              ▼
┌─────────────────────────────────────────────────────────────┐
│ Determining a final MPM list of the target block based one the MPM │ ──1620
│                      candidate list                         │
└─────────────────────────────────────────────────────────────┘
```

```
┌─────────────────────────────────────────────────────────────┐
│ Ranking the intra-prediction modes in descending order of the statistical │ ──1710
│                  numbers of the intra-prediction modes      │
└─────────────────────────────────────────────────────────────┘
                              │
                              ▼
┌─────────────────────────────────────────────────────────────┐
│ Selecting a preset number of top-ranked intra-prediction modes as │ ──1720
│              elements of the MPM candidate list             │
└─────────────────────────────────────────────────────────────┘
```

```
┌─────────────────────────────────────────────────────────────┐
│ Determining a preliminary MPM list of the target block based on intra- │ ──1810
│   prediction modes of two or more adjacent blocks of the target block │
└─────────────────────────────────────────────────────────────┘
                              │
                              ▼
┌─────────────────────────────────────────────────────────────┐
│ Determining a final MPM list of the target block based on the preliminary │ ──1820
│              MPM list and the MPM candidate list            │
└─────────────────────────────────────────────────────────────┘
```

| Obtaining a plurality of encoded blocks, and determining at least one of the plurality of encoded blocks as a similar block of the target block, a difference between a first texture value of each of the plurality of encoded blocks and a second texture value of the target block being within a preset range | ~1910 |

↓

| Determining a final MPM list of the target block based on an intra-prediction mode related to the at least one similar block | ~1920 |

FIG. 19

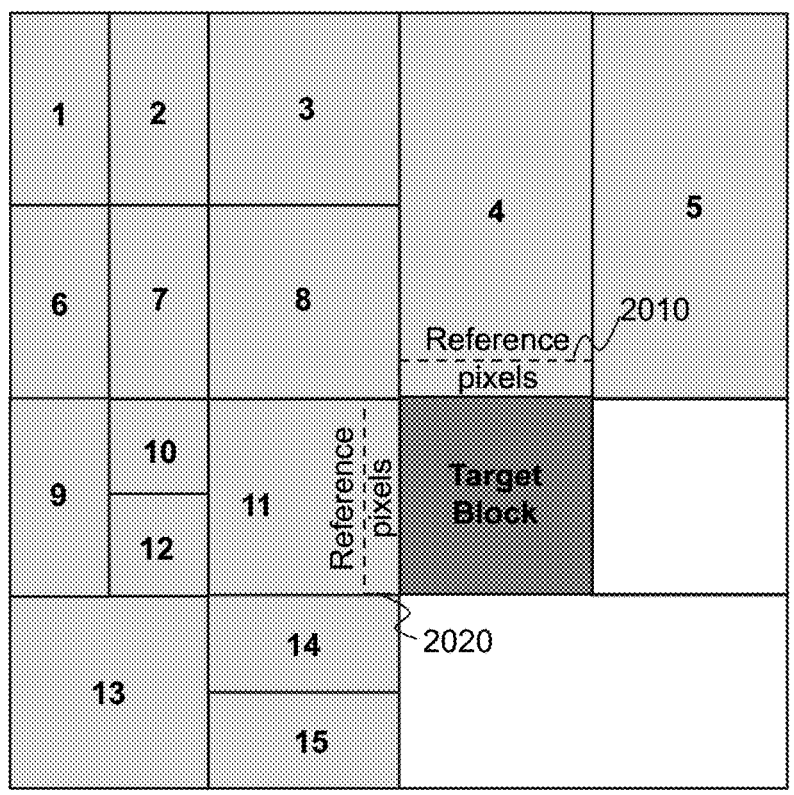

FIG. 20

SYSTEMS AND METHODS FOR IMAGE CODING

CROSS-REFERENCE TO RELATED APPLICATIONS

This application is a continuation of International Application No. PCT/CN2020/078870, filed on Mar. 11, 2020, which claims priority to Chinese Patent Application No. 201910191221.4 filed on Mar. 12, 2019, Chinese Patent Application No. 201910186065.2 filed on Mar. 12, 2019, Chinese Patent Application No. 201910523230.9 filed on Jun. 17, 2019, and Chinese Patent Application No. 201910555588.X filed on Jun. 25, 2019, the contents of each of which are incorporated herein by reference in their entirety.

TECHNICAL FIELD

The present disclosure generally relates to image processing technology, and in particular, to systems and methods for image coding.

BACKGROUND

In order to reduce the occupied resources during storage or transmission of image data or video data, it is usually necessary to encode (or compress) the image data or video data. The encoded data is referred to as a video coding stream. The encoded data is transmitted to a user terminal through a wired or wireless network, and then decoded for presentation. The encoding process includes prediction, transformation, quantization, entropy encoding, or the like. Because pixel values of adjacent pixels in an image (e.g., a single image or a video frame) are usually similar, and the color of the adjacent pixels in the image generally does not change sharp, this spatial correlation of the pixels in the image may be used to perform compression. The prediction includes intra-prediction that is to remove spatial redundancy of the image. The intra-prediction is to predict pixel values of pixels in a target block to be encoded in the image using a target intra-prediction mode according to one or more already encoded pixels (also referred to as reference pixels) in the image. In order to improve compression efficiency, a most probable prediction mode (MPM) list is determined to estimate the target intra-prediction mode. Therefore, it is desirable to provide systems and/or method for determining an MPM list for efficient intra-prediction.

SUMMARY

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

According to an aspect of the present disclosure, a system for intra prediction may include one or more storage devices and one or more processors configured to communicate with the one or more storage devices. The one or more storage devices may include a set of instructions. When the one or more processors executing the set of instructions, the one or more processors may be directed to perform one or more of the following operations. The one or more processors may obtain a target block to be encoded in a target image. The one or more processors may determine a final most probably mode (MPM) list of the target block based on at least one of (a) first intra-prediction modes configured to encode two or more adjacent blocks of the target block, (b) a width and a height of the target block, (c) statistical information of second intra-prediction modes configured to encode a plurality of first encoded blocks associated with the target block, or (d) texture features of a plurality of second encoded blocks associated with the target block. The one or more processors may determine, based on the final MPM list, a target intra-prediction mode corresponding to the target block. The one or more processors may encode, based on the target intra-prediction mode, the target block.

In some embodiments, to determine the final MPM list of the target block, the one or more processors may determine a preliminary MPM list based on the first intra-prediction modes, wherein in the preliminary MPM list, the first intra-prediction modes may be ranked based on a descending order of a correlation degree between each of the two or more adjacent blocks and the target block. The one or more processors may determine the final MPM list based on the preliminary MPM list.

In some embodiments, the two or more adjacent blocks may include a first-level adjacent block and a second-level adjacent block, wherein the correlation degree between the first-level adjacent block and the target block may be greater than the correlation degree between the second-level adjacent block and the target block.

In some embodiments, at least a portion of a side of the first-level adjacent block may overlap at least a portion of a side of the target block. Only a vertex of the second-level adjacent block may overlap with a vertex of the target block.

In some embodiments, to determine the preliminary MPM list based on the first intra-prediction modes, the one or more processors may obtain the first intra-prediction modes by searching the two or more adjacent blocks according to a searching order, wherein the searching order may include the descending order of the correlation degree between each of the two or more adjacent blocks and the target block. The one or more processors may obtain the preliminary MPM list by merging intra-prediction modes of a same type in the obtained first intra-prediction modes.

In some embodiments, to determine the final MPM list based on the preliminary MPM list, the one or more processors may determine the final MPM list based on the preliminary MPM list and one or more non-angular intra-prediction modes, wherein the one or more non-angular intra-prediction modes may include at least one of a planar mode or a direct-current (DC) mode, and the final MPM list may include at least one of the one or more non-angular intra-prediction modes and one or more top-ranked angular intra-prediction modes of the preliminary MPM list.

In some embodiments, to determine the final MPM list based on the preliminary MPM list and the non-angular intra-prediction mode, in response to determining that the preliminary MPM list includes at least one of the one or more non-angular intra-prediction modes, the one or more processors may set a first element of the final MPM list as the planar mode. The one or more processors may set a second element of the final MPM list as the DC mode. The one or more processors may add, as one or more elements of the final MPM list, the one or more top-ranked angular intra-prediction modes of the preliminary MPM list behind the second element of the final MPM list according to an order of the one or more top-ranked angular intra-prediction modes in the preliminary MPM list. In response to determining that the preliminary MPM list does not include the one or more non-angular intra-prediction modes in the preliminary MPM list, the one or more processors may add, as one or more elements of the final MPM list, the one or more top-ranked angular intra-prediction modes of the preliminary MPM list to the final MPM list according to the order of the one or more top-ranked angular intra-prediction modes in the preliminary MPM list, wherein a count of the one or more top-ranked angular intra-prediction modes is two less than a count of elements in the final MPM list. The one or more processors may add, as two elements of the final MPM list, the planar mode and the DC mode behind the one or more top-ranked angular intra-prediction modes of the preliminary MPM list.

In some embodiments, to determine the final MPM list based on the preliminary MPM list and the non-angular intra-prediction mode, in response to determining that the preliminary MPM list includes only one of the one or more non-angular intra-prediction modes, the one or more processors may set a first element of the final MPM list as the one of the one or more non-angular intra-prediction modes in the preliminary MPM list. The one or more processors may add, as one or more elements of the final MPM list, the one or more top-ranked angular intra-prediction modes of the preliminary MPM list after the first element of the final MPM list according to an order of the one or more top-ranked angular intra-prediction modes in the preliminary MPM list. The one or more processors may add, as an element of the final MPM list, another of the one or more non-angular intra-prediction modes that is different from the one of the one or more non-angular intra-prediction modes in the preliminary MPM list behind the one or more top-ranked angular intra-prediction modes.

In some embodiments, to determine the final MPM list based on the preliminary MPM list and the non-angular intra-prediction mode, in response to determining that the preliminary MPM list includes only one of one or more non-angular intra-prediction modes, the one or more processors may set a first element of the final MPM list as the one of the one of the one or more non-angular intra-prediction modes. The one or more processors may set a second element of the final MPM list as another of the one or more non-angular intra-prediction modes that is different from the one of the one or more non-angular intra-prediction modes. The one or more processors may add, as one or more elements of the final MPM list, the one or more top-ranked angular intra-prediction modes of the preliminary MPM list behind the second element of the final MPM list according to an order of the one or more top-ranked angular intra-prediction modes in the preliminary MPM list.

In some embodiments, a count of the two or more adjacent blocks may be 2. To determine the final MPM list based on the preliminary MPM list and the one or more non-angular intra-prediction modes, in response to determining that the preliminary MPM list includes one or two elements each of which is the planar mode or the DC mode, the one or more processors may set first two elements of the final MPM list as the planar mode and the DC mode. The one or more processors may set third to sixth elements of the final MPM list as a vertical mode V, a horizontal mode H, a mode V−4, and a mode H+4, respectively. In response to determining that the preliminary MPM list includes only one element that is an angular intra-prediction mode m, the one or more processors may set the first element of the final MPM list as the angular intra-prediction mode m. The one or more processors may set the second and third elements of the final MPM list as the planar mode and the DC mode. The one or more processors may set the fourth to sixth elements of the final MPM list as a mode m−1, a mode m+1, and a mode m−2, respectively. In response to determining that the preliminary MPM list includes two elements $m_0$ and $m_1$ only one of which is the angular intra-prediction mode, and $m_0$ is ranked before $m_1$ in the preliminary MPM list, the one or more processors may set the first element of the final MPM list as $m_0$. The one or more processors may set the second element of the final MPM list as $m_1$. The one or more processors may add the planar mode and the DC mode to the final MPM list. The one or more processors may merge same modes in $m_0$, $m_1$, the planar mode, and the DC mode. The one or more processors may set the fourth to sixth elements of the final MPM list as a mode $\max\{m_0, m_1\}-1$, a mode $\max\{m_0, m_1\}+1$, and a mode $\max\{m_0, m_1\}-2$, respectively. In response to determining that the preliminary MPM list includes two elements $m_0$ and $m_1$ both of which are the angular intra-prediction modes, and $m_0$ is ranked before $m_1$ in the preliminary MPM list, the one or more processors may set the first element of the final MPM list as $m_0$. The one or more processors may set the second element of the final MPM list as $m_1$. The one or more processors may set the third and fourth elements of the final MPM list as the planar mode and the DC mode. The one or more processors may set the fifth and sixth elements of the final MPM list as the mode $\max\{m_0, m_1\}-1$ and the mode $\max\{m_0, m_1\}+1$. If at least one of the mode $\max\{m_0, m_1\}-1$ and the mode $\max\{m_0, m_1\}+1$ is the same as one of $m_0$, $m_1$, the planar mode, and the DC mode, the one or more processors may set the fifth and sixth elements of the final MPM list as the mode $\max\{m_0, m_1\}-2$ and the mode $\max\{m_0, m_1\}+2$.

In some embodiments, a count of the two or more adjacent blocks may be 2. To determine the final MPM list based on the preliminary MPM list and the non-angular intra-prediction mode, in response to determining that the preliminary MPM list includes the DC mode and an angular intra-prediction mode m, the one or more processors may set a first element of the final MPM list as the DC mode. The one or more processors may set a second and a third element of the final MPM list as the planar mode and the mode m, respectively. The one or more processors may set fourth to sixth elements of the final MPM list as a mode m−1, a mode m+1, and a mode m−2, respectively. In response to determining that the preliminary MPM list includes the planar mode and the angular intra-prediction mode m, and m=2, 34, or 66, the one or more processors may set the first element of the final MPM list as the planar mode. The one or more processors may set the second element of the final MPM list as the mode m. The one or more processors may set the third element of the final MPM list as the DC mode. The one or more processors may set the fourth to sixth elements of the final MPM list as the mode m−1, the mode m+1, and the mode m−2, respectively.

In some embodiments, in response to determining that there is at least one pending element to be determined in the final MPM list, the one or more processors may obtain a maximum angular intra-prediction mode in the preliminary MPM list. The one or more processors may determine at least one nearby angular intra-prediction mode of the maximum angular intra-prediction mode. The one or more processors may set the at least one pending element in the final MPM list as the at least one nearby angular intra-prediction mode.

In some embodiments, the target block may be encoded using multiple reference lines, and the final MPM list may include at least one non-angular intra-prediction mode and at least one angular intra-prediction mode. The one or more processors may determine the final MPM list as a first final MPM list of a first reference line of the multiple reference lines, wherein the first reference line may be closest to the target block in the multiple reference lines. The one or more processors may determine a second final MPM list of non-first reference lines of the multiple reference lines based on the first final MPM list.

In some embodiments, to determine the second final MPM list of non-first reference lines of the multiple reference lines based on the first final MPM list, the one or more processors may add, as one or more elements of the second final MPM list, one or more of the at least one angular intra-prediction mode of the first final MPM list to the second final MPM list according to an order of the one or more of the at least one angular intra-prediction modes in the first final MPM list.

In some embodiments, to determine the second final MPM list of non-first reference lines of the multiple reference lines based on the first final MPM list, the one or more processors may obtain a maximum angular intra-prediction mode in the preliminary MPM list. The one or more processors may determine at least one nearby angular intra-prediction mode of the maximum angular intra-prediction mode. The one or more processors may obtain the second final MPM list by replacing the at least one non-angular intra-prediction mode in the first final MPM list with the at least one nearby angular intra-prediction mode.

In some embodiments, the target block may be encoded using multiple reference lines, and a count of the two or more adjacent blocks may be 2. The one or more processors may determine the final MPM list as a first final MPM list of a first reference line of the multiple reference lines, wherein the first reference line may be closest to the target block in the multiple reference lines. The one or more processors may determine a second final MPM list of non-first reference lines of the multiple reference lines by an operation including one of: in response to determining that the preliminary MPM list includes one or two elements each of which is a planar mode or a DC mode, setting first to sixth elements of the second final MPM list as a vertical mode, a horizontal mode, an angular mode 2, an angular mode 34, an angular mode 66, and an angular mode 26, respectively; in response to determining that the preliminary MPM list includes one or two elements only one of which is an angular intra-prediction mode m, setting the first to sixth elements of the second final MPM list as the mode m, a mode m−1, a mode m+1, a mode m−2, a mode m+2, and a mode m−3, respectively; or in response to determining that the preliminary MPM list includes two angular intra-prediction modes $m_0$ and $m_1$, and $m_0$ is ranked before $m_1$ in the preliminary MPM list, setting the first element of the second final MPM list as $m_0$; setting the second element of the second final MPM list as $m_1$; and setting the third to sixth elements as any four of 8 modes $\min\{m_0, m_1\}\pm 1$, $\max\{m_0, m_1\}\pm 1$, $\max\{m_0, m_1\}\pm 1$, $\max\{m_0, m_1\}\pm 2$.

In some embodiments, to determine the final MPM list of the target block, the one or more processors may determine a preliminary MPM list of the target block, the preliminary MPM list including a plurality of intra-prediction modes. The one or more processors may obtain a size relation between the width and the height of the target block. The width of the target block may be equal to a length of a first side of the target block that is along a horizontal direction of the target block. The height of the target block may be equal to a length of a second side of the target block that is along a vertical direction of the target block. The one or more processors may determine the final MPM list by adjusting the preliminary MPM list based on the size relation.

In some embodiments, to determine the final MPM list by adjusting the preliminary MPM list based on the size relation, the one or more processors may adjust positions of at least two of the plurality of intra-prediction modes in the preliminary MPM list based on the size relation.

In some embodiments, to adjust the positions of the at least two of the plurality of intra-prediction modes in the preliminary MPM list based on the size relation, in response to determining that the size relation indicates that the width of the target block is greater than the height of the target block, the one or more processors may determine the final MPM list by switching positions of a vertical mode and a horizontal mode in the preliminary MPM list so that the vertical mode is ranked in front of the horizontal mode in the final MPM list. In response to determining that the size relation indicates that the height of the target block is greater than the width of the target block, the one or more processors may determine the final MPM list by switching positions of the vertical mode and the horizontal mode in the preliminary MPM list so that the vertical mode is ranked behind the horizontal mode in the final MPM list.

In some embodiments, to adjust the positions of the at least two of the plurality of intra-prediction modes in the preliminary MPM list based on the size relation, in response to determining that the size relation indicates that the width of the target block is greater than the height of the target block, the one or more processors may determine the final MPM list by switching positions of an intra-prediction mode of a first adjacent block of the target block and an intra-prediction mode of a second adjacent block of the target block in the preliminary MPM list so that the intra-prediction mode of the first adjacent block is ranked in front of the intra-prediction mode of the second adjacent block. In response to determining that the size relation indicates that the height of the target block is greater than the width of the target block, the one or more processors may determine the final MPM list by switching the positions of the intra-prediction mode of the first adjacent block of the target block and the intra-prediction mode of the second adjacent block of the target block in the preliminary MPM list so that the intra-prediction mode of the top adjacent block is ranked behind the intra-prediction mode of the left adjacent block, wherein the first adjacent block may be adjacent to the first side of the target block, and the second adjacent block is adjacent to the second side of the target block.

In some embodiments, to determine the final MPM list by adjusting the preliminary MPM list based on the size relation, the one or more processors may replace one or more of the plurality of intra-prediction modes in the preliminary MPM list based on the size relation.

In some embodiments, to replace the one or more of the plurality of intra-prediction modes in the preliminary MPM list based on the size relation, in response to determining that the size relation indicates that the width of the target block is greater than the height of the target block, the one or more processors may determine the final MPM list by replacing a horizontal mode in the preliminary MPM list with a vertical mode. In response to determining that the size relation indicates that the height of the target block is greater than the width of the target block, the one or more processors may determine the final MPM list by replacing the vertical mode in the preliminary MPM list with the horizontal mode.

In some embodiments, to replace the one or more of the plurality of intra-prediction modes in the preliminary MPM list based on the size relation, in response to determining that the size relation indicates that the width of the target block is greater than the height of the target block, the one or more processors may determine the final MPM list by replacing a maximum ordinary angular mode or an ordinary angular mode nearby the maximum ordinary angular mode in the preliminary MPM list with a wide-angular mode adjacent to the maximum ordinary angular mode. In response to determining that the size relation indicates that the height of the target block is greater than the width of the target block, the one or more processors may determine the final MPM list by replacing a minimum ordinary angular mode or an ordinary angular mode nearby the minimum ordinary angular mode in the preliminary MPM list with a wide-angular mode adjacent to the minimum ordinary angular mode.

In some embodiments, to replace the one or more of the plurality of intra-prediction modes in the preliminary MPM list based on the size relation, in response to determining that the size relation indicates that the height and the width of the target block are different, the one or more processors may obtain a first number of encoded adjacent blocks corresponding to a longer side of the target block. The one or more processors may obtain intra-prediction modes of the first number of encoded adjacent blocks. The one or more processors may determine the final MPM list by replacing one or more of the plurality of intra-prediction modes in the preliminary MPM list with the intra-prediction modes of the first number of encoded adjacent blocks.

In some embodiments, to determine the final MPM list of the target block, the one or more processors may obtain the plurality of first encoded blocks or the plurality of second encoded blocks associated with the target block. At least a portion of the plurality of first encoded blocks or at least a portion of the plurality of second encoded blocks may be in the target image or in a video frame prior to the target image. The one or more processors may determine an MPM candidate list based on the plurality of first encoded blocks or the plurality of second encoded blocks. The one or more processors may determine a preliminary MPM list based on the first intra-prediction modes configured to encode the two or more adjacent blocks of the target block. The one or more processors may determine the final MPM list based on the preliminary MPM list and the MPM candidate list.

In some embodiments, to determine the MPM candidate list based on the plurality of first encoded blocks or the plurality of second encoded blocks, the one or more processors may obtain the second intra-prediction modes. The one or more processors may determine the statistical information of the second intra-prediction modes. The statistical information may include a statistical count of the second intra-prediction modes of each type. The one or more processors may determine the MPM candidate list based on the statistical information of the second intra-prediction modes.

In some embodiments, to determine the MPM candidate list based on the statistical information of the second intra-prediction modes, the one or more processors may rank the second intra-prediction modes based on a descending order of the statistical counts. The one or more processors may determine one or more top-ranked second intra-prediction modes as one or more elements of the MPM candidate list.

In some embodiments, to determine the MPM candidate list based on the plurality of first encoded blocks or the plurality of second encoded blocks, the one or more processors may obtain a first texture value of the target block and a second texture value of each of the plurality of second encoded blocks. The one or more processors may determine a texture difference between the first texture value and the second texture value. The one or more processors may select at least one of the plurality of second encoded blocks based on the texture differences, the texture difference of the at least one selected second encoded block being within a range. The one or more processors may determine one or more of the at least one selected second encoded block as one or more similar blocks of the target block. The one or more processors may obtain one or more third intra-prediction modes related to the one or more similar blocks. The one or more processors may determine the MPM candidate list based on the one or more third intra-prediction modes.

In some embodiments, the one or more similar blocks of the target block may include one of the at least one selected second encoded block corresponding to which the texture difference is minimum in the at least one selected second encoded block.

In some embodiments, the MPM candidate list may include the one or more third intra-prediction modes. The one or more third intra-prediction modes may include at least one of an optimal intra-prediction mode configured to encode the similar block and one or more fourth intra-prediction modes in an MPM list of the similar block.

In some embodiments, in the MPM candidate list, the optimal intra-prediction mode may be ranked in front of the one or more fourth intra-prediction modes in the MPM list of the similar block. An order of the one or more fourth intra-prediction modes in the MPM candidate list may be consistent with an order of the one or more fourth intra-prediction modes in the MPM list of the similar block.

In some embodiments, the first texture value may be represented as a gradient value related to the target block.

In some embodiments, the gradient value related to the target block may include a gradient value of the target block or a gradient value of an extended target block. The extended target block may include the target block, first reference pixels on a first side of the target block, and second reference pixels on a second side of the target block, the first side being adjacent to the second side.

In some embodiments, the one or more processors may determine that an absolute difference between the first texture value and the texture value of the similar block is less than or equal to a value.

In some embodiments, to obtain the plurality of first encoded blocks or the plurality of second encoded blocks associated with the target block, the one or more processors may search for the plurality of first encoded blocks or the plurality of second encoded blocks in a region of at least one of the target image and one or more video frames prior to the target image according to an order from left to right and from top to bottom.

In some embodiments, to determine the final MPM list based on the preliminary MPM list and the MPM candidate list, the one or more processors may determine the final MPM list by inserting at least one element of the MPM candidate list into the preliminary MPM list.

In some embodiments, to determine the final MPM list based on the preliminary MPM list and the MPM candidate list, the one or more processors may determine one or more elements to be replaced in the preliminary MPM list. The one or more processors may determine the final MPM list by replacing the one or more elements to be replaced with one or more top-ranked elements in the MPM candidate list.

In some embodiments, the two or more adjacent blocks of the target block may include a first adjacent block and a second adjacent block. The final MPM list may include M elements, M≥3. The one or more elements to be replaced may be ranked behind (M−N)th element of the preliminary MPM list. N may be an integer within [1, M−1] if the intra-prediction mode of the first adjacent block is the same as the intra-prediction mode of the second adjacent block. Or N may be an integer within [1, M−2] if the intra-prediction mode of the first adjacent block is different from the intra-prediction mode of the second adjacent block.

In some embodiments, N may refer to a count of the one or more elements to be replaced.

In some embodiments, the one or more elements to be replaced in the preliminary MPM list may include at least one of a planar mode, a direct-current (DC) mode, a vertical mode, a horizontal mode, or an intra-prediction mode adjacent to at least one of the first intra-predication modes of the two or more adjacent blocks.

In some embodiments, the one or more elements to be replaced may include a special mode in the preliminary MPM list. The special mode may include an intra-prediction mode different from the first intra-prediction modes of the two or more adjacent blocks in the preliminary MPM list.

In some embodiments, to determine the final MPM list by replacing the one or more elements to be replaced with the one or more top-ranked elements in the MPM candidate list, the one or more processors may obtain one of the one or more elements to be replaced in the preliminary MPM list as a target element to be replaced. The one or more processors may obtain one of the one or more top-ranked elements in the MPM candidate list as a reference mode. The one or more processors may determine whether the reference mode is different from one or more elements in the preliminary MPM list except the one or more elements to be replaced. In response to determining that the reference mode is different from the one or more elements in the preliminary MPM list except the one or more elements to be replaced, the one or more processors may replace the target element to be replaced with the reference mode.

In some embodiments, the one or more processors may determine a code word of the target intra-prediction mode by encoding the target intra-prediction mode based on the final MPM list.

According to another aspect of the present disclosure, a method for intra prediction may include one or more of the following operations. One or more processors may obtain a target block to be encoded in a target image. The one or more processors may determine a final most probably mode (MPM) list of the target block based on at least one of (a) first intra-prediction modes configured to encode two or more adjacent blocks of the target block, (b) a width and a height of the target block, (c) statistical information of second intra-prediction modes configured to encode a plurality of first encoded blocks associated with the target block, or (d) texture features of a plurality of second encoded blocks associated with the target block. The one or more processors may determine, based on the final MPM list, a target intra-prediction mode corresponding to the target block. The one or more processors may encode, based on the target intra-prediction mode, the target block.

According to yet another aspect of the present disclosure, a system for intra prediction may include a first block obtaining unit configured to obtain a target block to be encoded in a target image. The system may also include a first list determination unit configured to determine a final most probably mode (MPM) list of the target block based on at least one of (a) first intra-prediction modes configured to encode two or more adjacent blocks of the target block, (b) a width and a height of the target block, (c) statistical information of second intra-prediction modes configured to encode a plurality of first encoded blocks associated with the target block, or (d) texture features of a plurality of second encoded blocks associated with the target block. The system may also include a first mode determination unit configured to determine, based on the final MPM list, a target intra-prediction mode corresponding to the target block. The system may also include an encoding unit configured to encode, based on the target intra-prediction mode, the target block.

According to yet another aspect of the present disclosure, a non-transitory computer readable medium may comprise at least one set of instructions for intra prediction. The at least one set of instructions may be executed by one or more processors of a computing device. The one or more processors may obtain a target block to be encoded in a target image. The one or more processors may determine a final most probably mode (MPM) list of the target block based on at least one of (a) first intra-prediction modes configured to encode two or more adjacent blocks of the target block, (b) a width and a height of the target block, (c) statistical information of second intra-prediction modes configured to encode a plurality of first encoded blocks associated with the target block, or (d) texture features of a plurality of second encoded blocks associated with the target block. The one or more processors may determine, based on the final MPM list, a target intra-prediction mode corresponding to the target block. The one or more processors may encode, based on the target intra-prediction mode, the target block.

According to yet another aspect of the present disclosure, a system for intra prediction may include one or more storage devices and one or more processors configured to communicate with the one or more storage devices. The one or more storage devices may include a set of instructions. When the one or more processors executing the set of instructions, the one or more processors may be directed to perform one or more of the following operations. The one or more processors may obtain a target block to be encoded in a target image. The one or more processors may determine a final most probably mode (MPM) list of the target block based on at least one of (a) first intra-prediction modes configured to encode two or more adjacent blocks of the target block, (b) a width and a height of the target block, (c) statistical information of second intra-prediction modes configured to encode a plurality of first encoded blocks associated with the target block, and (d) texture features of a plurality of second encoded blocks associated with the target block. The one or more processors may obtain a code word of a target intra-prediction mode of the target block. The one or more processors may obtain the target intra-prediction mode by decoding the code word of the target intra-prediction mode based on the final MPM list. The one or more processors may decode the target block based on the target intra-prediction mode.

According to yet another aspect of the present disclosure, a method for intra prediction may include one or more of the following operations. One or more processors may obtain a target block to be encoded in a target image. The one or more processors may determine a final most probably mode (MPM) list of the target block based on at least one of (a) first intra-prediction modes configured to encode two or more adjacent blocks of the target block, (b) a width and a height of the target block, (c) statistical information of second intra-prediction modes configured to encode a plurality of first encoded blocks associated with the target block, and (d) texture features of a plurality of second encoded blocks associated with the target block. The one or more processors may obtain a code word of a target intra-prediction mode of the target block. The one or more processors may obtain the target intra-prediction mode by decoding the code word of the target intra-prediction mode based on the final MPM list. The one or more processors may decode the target block based on the target intra-prediction mode.

According to yet another aspect of the present disclosure, a system for intra prediction may include a second block obtaining unit configured to obtain a target block to be encoded in a target image. The system may also include a second list determination unit configured to determine a final most probably mode (MPM) list of the target block based on at least one of (a) first intra-prediction modes configured to encode two or more adjacent blocks of the target block, (b) a width and a height of the target block, (c) statistical information of second intra-prediction modes configured to encode a plurality of first encoded blocks associated with the target block, and (d) texture features of a plurality of second encoded blocks associated with the target block. The system may also include a second mode determination unit configured to obtain a code word of a target intra-prediction mode of the target block. The second mode determination unit may also be configured to obtain the target intra-prediction mode by decoding the code word of the target intra-prediction mode based on the final MPM list. The system may also include a decoding unit configured to decode the target block based on the target intra-prediction mode.

According to yet another aspect of the present disclosure, a non-transitory computer readable medium may comprise at least one set of instructions for intra prediction. The at least one set of instructions may be executed by one or more processors of a computing device. The one or more processors may obtain a target block to be encoded in a target image. The one or more processors may determine a final most probably mode (MPM) list of the target block based on at least one of (a) first intra-prediction modes configured to encode two or more adjacent blocks of the target block, (b) a width and a height of the target block, (c) statistical information of second intra-prediction modes configured to encode a plurality of first encoded blocks associated with the target block, and (d) texture features of a plurality of second encoded blocks associated with the target block. The one or more processors may obtain a code word of a target intra-prediction mode of the target block. The one or more processors may obtain the target intra-prediction mode by decoding the code word of the target intra-prediction mode based on the final MPM list. The one or more processors may decode the target block based on the target intra-prediction mode.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 9 is a flowchart illustrating an exemplary process for determining a final MPM list according to some embodiments of the present disclosure;

FIGS. 10A-10C are schematic diagrams illustrating exemplary adjacent blocks of a target block according to some embodiments of the present disclosure;

FIG. 16 is a flowchart illustrating an exemplary process for determining a final MPM list according to some embodiments of the present disclosure;

FIG. 17 is a flowchart illustrating an exemplary process for determining a candidate MPM list according to some embodiments of the present disclosure;

FIG. 18 is a flowchart illustrating an exemplary process for determining a final MPM list according to some embodiments of the present disclosure;

FIG. 19 is a flowchart illustrating an exemplary process for determining a final MPM list according to some embodiments of the present disclosure; and FIG. 20 is a schematic diagram illustrating exemplary encoded blocks according to some embodiments of the present disclosure.

DETAILED DESCRIPTION

Figure 1:
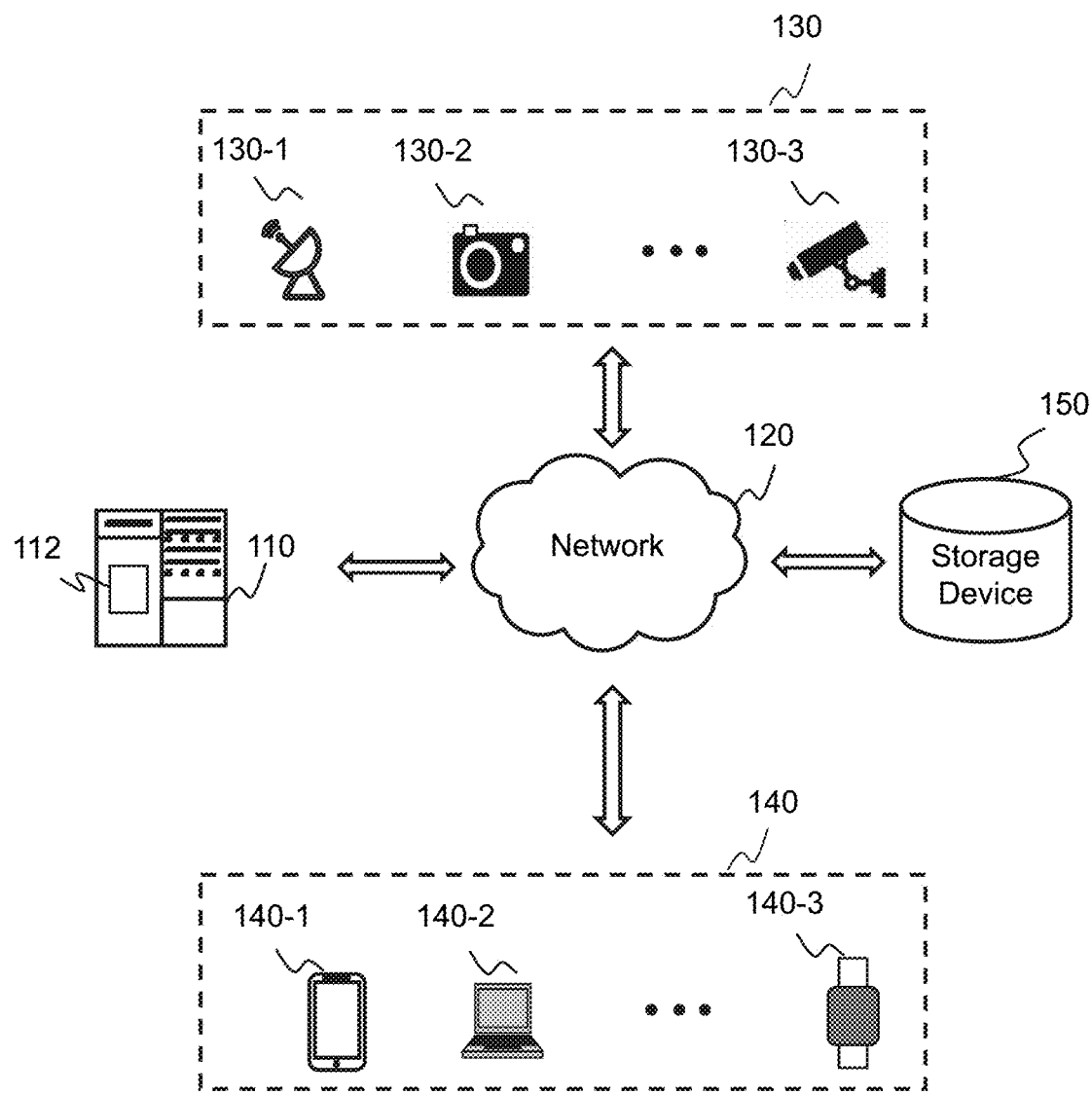
FIG. 1 is a schematic diagram illustrating an exemplary image coding system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "unit," "module," and/or "block" used herein are one method to distinguish different components, elements, parts, sections, or assemblies of different levels in ascending order. However, the terms may be displaced by other expression if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

FIG. 1 is a schematic diagram illustrating an exemplary image coding system according to some embodiments of the present disclosure. As shown, the image coding system 100 may include a server 110, a network 120, an acquisition device 130, a user device 140, and a storage device 150.

The server 110 may be a single server or a server group. The server group may be centralized or distributed (e.g., the server 110 may be a distributed system). In some embodiments, the server 110 may be local or remote. For example, the server 110 may access information and/or data stored in the acquisition device 130, the user device 140, and/or the storage device 150 via the network 120. As another example, the server 110 may be directly connected to the acquisition device 130, the user device 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 of the present disclosure.

In some embodiments, the server 110 may include a processing device 112. The processing device 112 may process information and/or data relating to image coding to perform one or more functions described in the present disclosure. For example, the processing device 112 may obtain a target block to be encoded in a target image. The processing device 112 may determine a final MPM list of the target block. The processing device 112 may determine a target intra-prediction mode of the target block based on the final MPM list. The processing device 112 may encode the target intra-prediction mode based on the final MPM list. In some embodiments, the processing device 112 may include one or more processing devices (e.g., single-core processing device(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiment, the sever 110 may be unnecessary and all or part of the functions of the server 110 may be implemented by other components (e.g., the acquisition device 130, the user device 140) of the image coding system 100. For example, the processing device 112 may be integrated into the acquisition device 130 or the user device 140 and the functions (e.g., performing intra-prediction to an image) of the processing device 112 may be implemented by the acquisition device 130 or the user device 140.

The network 120 may facilitate exchange of information and/or data for the image coding system 100. In some embodiments, one or more components (e.g., the server 110, the acquisition device 130, the user device 140, the storage device 150) of the image coding system 100 may transmit information and/or data to other component(s) of the image coding system 100 via the network 120. For example, the server 110 may obtain an image to be coded from the acquisition device 130 via the network 120. As another example, the server 110 may obtain an intra-prediction mode associated with the image coding from the storage device 150. In some embodiments, the network 120 may be any type of wired or wireless network, or combination thereof. Merely by way of example, the network 120 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof.

The acquisition device 130 may be configured to acquire an image (the "image" herein refers to a single image or a frame of a video). In some embodiments, the acquisition device 130 may include a camera 130-1, a video recorder 130-2, a sensor 130-3, etc. The camera 130-1 may include a gun camera, a dome camera, an integrated camera, a monocular camera, a binocular camera, a multi-view camera, or the like, or any combination thereof. The video recorder 130-2 may include a PC Digital Video Recorder (DVR), an embedded DVR, or the like, or any combination thereof. The sensor 130-1 may include an acceleration sensor (e.g., a piezoelectric sensor), a velocity sensor (e.g., a Hall sensor), a distance sensor (e.g., a radar, an infrared sensor), a steering angle sensor (e.g., a tilt sensor), a traction-related sensor (e.g., a force sensor), or the like, or any combination thereof. The image acquired by the acquisition device 130 may be a two-dimensional image, a three-dimensional image, a four-dimensional image, etc. In some embodiments, the acquisition device 130 may include a plurality of components each of which can acquire an image. For example, the acquisition device 130 may include a plurality of sub-cameras that can capture images or videos simultaneously. In some embodiments, the acquisition device 130 may transmit the acquired image to one or more components (e.g., the server 110, the user device 140, the storage device 150) of the image coding system 100 via the network 120.

The user device 140 may be configured to receive information and/or data from the server 110, the acquisition device 130, and/or the storage device 150 via the network 120. For example, the user device 140 may receive a coded image determined based on a plurality of predicted coding units corresponding to a plurality of coding units in the image from the server 110. In some embodiments, the user device 140 may process information and/or data received from the server 110, the acquisition device 130, and/or the storage device 150 via the network 120. For example, the user device 140 may decode the coded image received from the server 110. In some embodiments, the user device 140 may provide a user interface via which a user may view information and/or input data and/or instructions to the image coding system 100. For example, the user may view the decoded image via the user interface. As another example, the user may input an instruction associated with an image coding parameter via the user interface. In some embodiments, the user device 140 may include a mobile phone 140-1, a computer 140-2, a wearable device 140-3, or the like, or any combination thereof. In some embodiments, the user device 140 may include a display that can display information in a human-readable form, such as text, image, audio, video, graph, animation, or the like, or any combination thereof. The display of the user device 140 may include a cathode ray tube (CRT) display, a liquid crystal display (LCD), a light emitting diode (LED) display, a plasma display panel (PDP), a three dimensional (3D) display, or the like, or a combination thereof. In some embodiments, the user device 140 may be connected to one or more components (e.g., the server 110, the acquisition device 130, the storage device 150) of the image coding system 100 via the network 120.

The storage device 150 may be configured to store data and/or instructions. The data and/or instructions may be obtained from, for example, the server 110, the acquisition device 130, and/or any other component of the image coding system 100. In some embodiments, the storage device 150 may store data and/or instructions that the server 110 may execute or use to perform exemplary methods described in the present disclosure. For example, the storage device 150 may store the prediction mode associated with the image coding. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The storage device 150 may be configured to store data and/or instructions. For example, the storage device 150 may store data and/or instructions that the server 110 may execute or use to perform exemplary methods described in the present disclosure. In some embodiments, the storage device 150 may be connected to the network 120 to communicate with one or more components (e.g., the server 110, the acquisition device 130, the user device 140) of the image coding system 100. One or more components of the image coding system 100 may access the data or instructions stored in the storage device 150 via the network 120. In some embodiments, the storage device 150 may be directly connected to or communicate with one or more components (e.g., the server 110, the acquisition device 130, the user device 140) of the image coding system 100. In some embodiments, the storage device 150 may be part of other components of the image coding system 100, such as the server 110, the acquisition device 130, or the user device 140.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
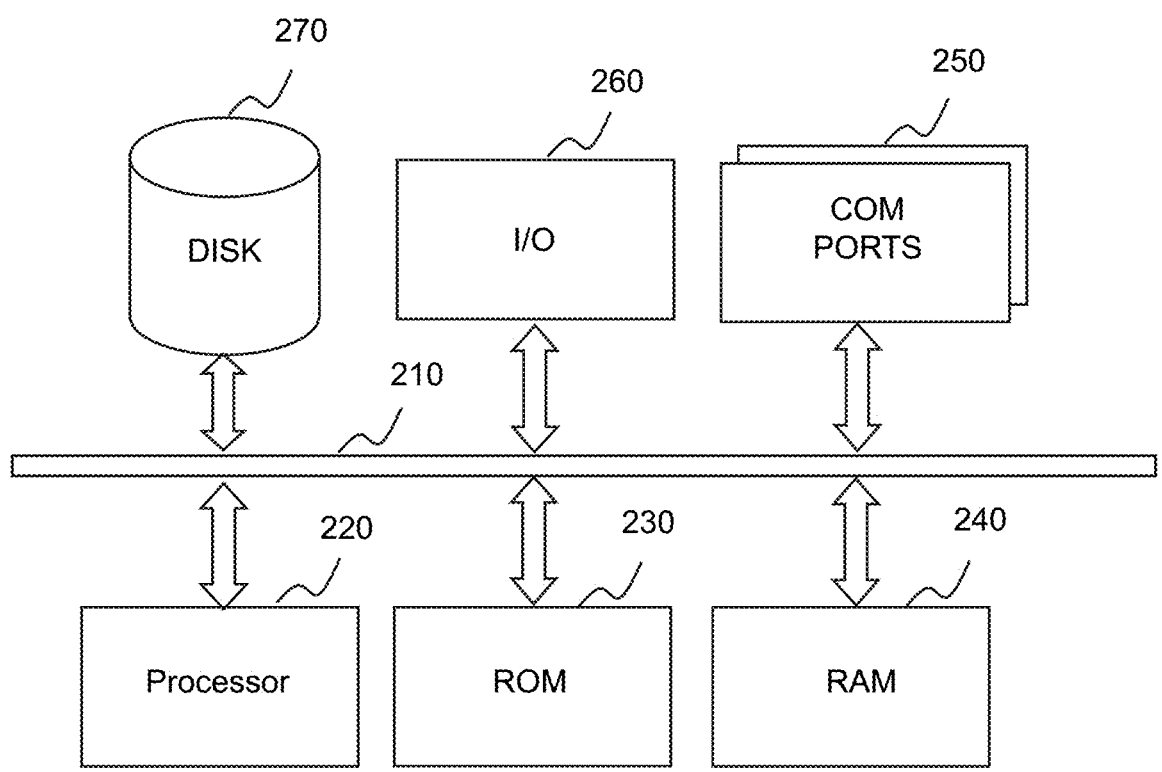
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200. For example, the processing device 112 may be implemented on the computing device 200 and configured to perform functions of the processing device 112 disclosed in this disclosure.

The computing device 200 may be used to implement any component of the image coding system 100 as described herein. For example, the processing device 112 may be implemented on the computing device 200, via its hardware, software program, firmware, or a combination thereof. Although only one such computer is shown, for convenience, the computer functions relating to image coding as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read-only memory (ROM) 230, or a random-access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an input/output (I/O) component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both operation A and operation B, it should be understood that operation A and operation B may also be performed by two different processors 220 jointly or separately in the computing device 200 (e.g., a first processor executes operation A and a second processor executes operation B, or the first and second processors jointly execute operations A and B).

Figure 3:
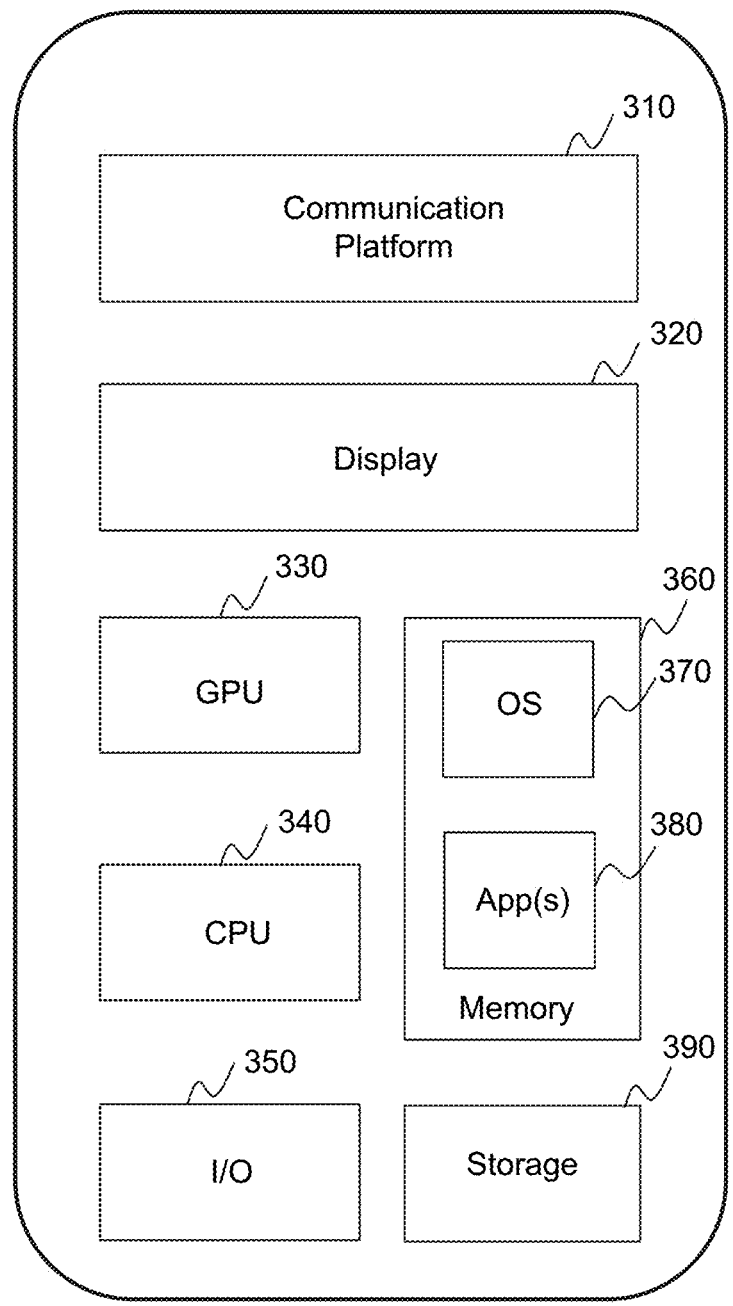
FIG. 3 is a schematic diagram illustrating exemplary hardware and/or software components of an exemplary terminal device according to some embodiments of the present disclosure.

FIG. 3 is a schematic diagram illustrating exemplary hardware and/or software components of an exemplary terminal device according to some embodiments of the present disclosure. In some embodiments, the user device 140 may be implemented on the terminal device 300 shown in FIG. 3.

As illustrated in FIG. 3, the terminal device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the terminal device 300.

In some embodiments, an operating system 370 (e.g., iOS™, Android™, Windows Phone™) and one or more applications (Apps) 380 may be loaded into the memory 360 from the storage 390 in order to be executed by the CPU 340. The applications 380 may include a browser or any other suitable mobile apps for receiving and rendering information relating to image coding or other information from the processing device 112. User interactions may be achieved via the I/O 350 and provided to the processing device 112 and/or other components of the image coding system 100 via the network 120.

Figure 4:
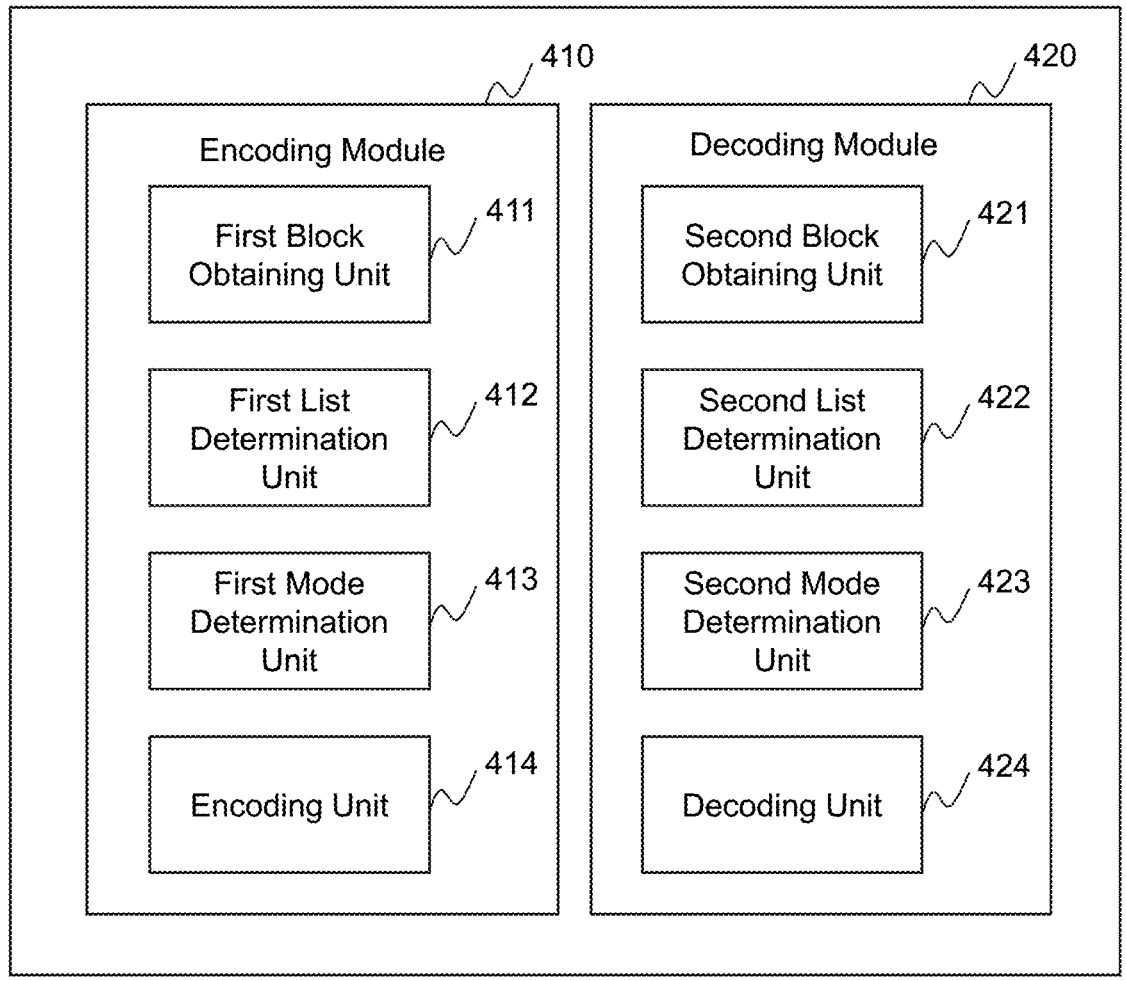
FIG. 4 is a schematic diagram illustrating an exemplary processing device according to some embodiments of the present disclosure.

FIG. 4 is a schematic diagram illustrating an exemplary processing device according to some embodiments of the present disclosure. The processing device 112 may include an encoding module 410 and a decoding module 420. The encoding module 410 may include a first block obtaining unit 411, a first list determination unit 412, a first mode determination unit 413, and an encoding unit 414. The decoding module 420 may include a second block obtaining unit 421, a second list determination unit 422, a second mode determination unit 423, and a decoding unit 424.

The first block obtaining unit 411 may be configured to obtain a target block to be encoded in a target image. The first list determination unit 412 may be configured to determine a final most probably mode (MPM) list of the target block based on at least one of (a) first intra-prediction modes configured to encode two or more adjacent blocks of the target block, (b) a width and a height of the target block, (c) statistical information of second intra-prediction modes configured to encode a plurality of first encoded blocks associated with the target block, or (d) texture features of a plurality of second encoded blocks associated with the target block. The first mode determination unit 413 may be configured to determine, based on the final MPM list, a target intra-prediction mode corresponding to the target block. The encoding unit 414 may be configured to encode, based on the target intra-prediction mode, the target block. The encoding unit 414 may be further configured to determine a code word of the target intra-prediction mode by encoding the target intra-prediction mode based on the final MPM list.

The second block obtaining unit 421 may be configured to obtain a target block to be encoded in a target image. The second list determination unit 422 may be configured to determine a final most probably mode (MPM) list of the target block based on at least one of (a) first intra-prediction modes configured to encode two or more adjacent blocks of the target block, (b) a width and a height of the target block, (c) statistical information of second intra-prediction modes configured to encode a plurality of first encoded blocks associated with the target block, or (d) texture features of a plurality of second encoded blocks associated with the target block. The second mode determination unit 423 may be configured to obtain a code word of a target intra-prediction mode of the target block and obtain the target intra-prediction mode by decoding the code word based on the final MPM list. The decoding unit 424 may be configured to decode, based on the target intra-prediction mode, the target block.

The modules and units in the processing device 120 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 112 may further include a storage module (not shown in FIG. 4). The storage module may be configured to store data generated during any process performed by any component of in the processing device 112. As another example, each of components of the processing device 112 may correspond to a storage module, respectively. Additionally or alternatively, the components of the processing device 112 may share a common storage module. As still another example, the decoding module may be omitted.

In some embodiments, the systems and/or method for image encoding in the present disclosure may be applied to image intra-prediction for luminance components or chrominance components.

Figure 5A:
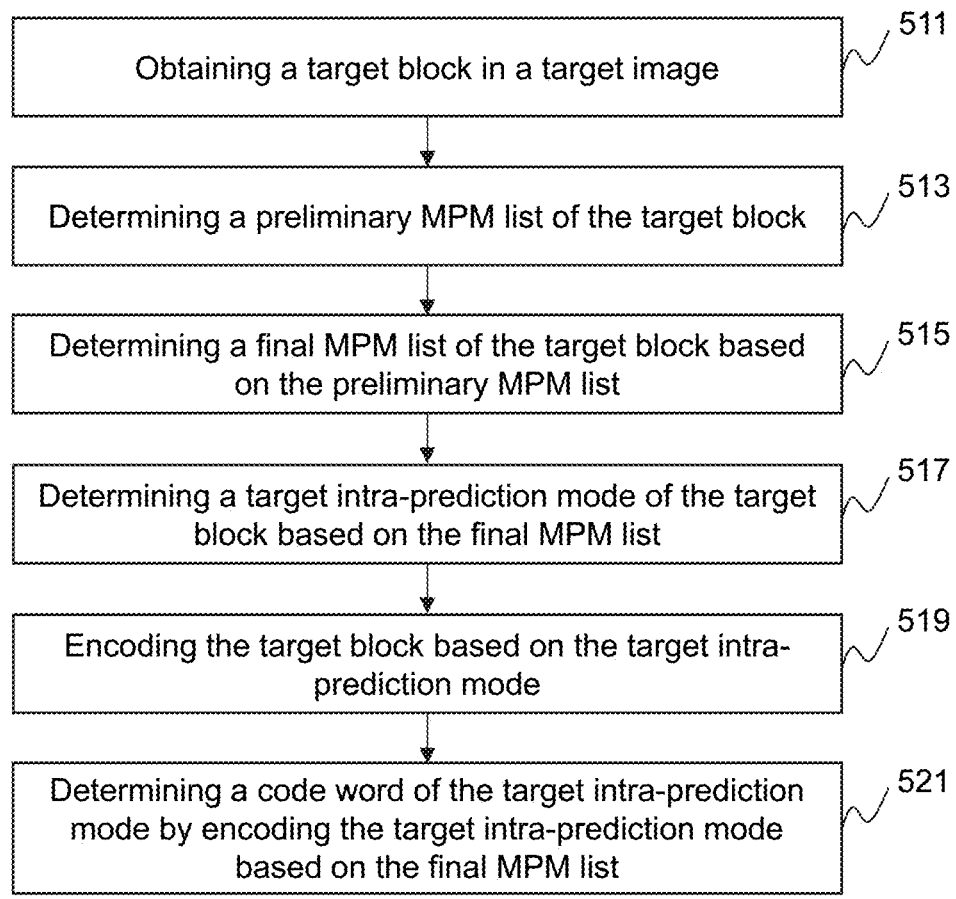
FIG. 5A is a flowchart illustrating an exemplary encoding process for intra-prediction according to some embodiments of the present disclosure.

FIG. 5A is a flowchart illustrating an exemplary encoding process for intra prediction according to some embodiments of the present disclosure. In some embodiments, the process 500-1 may be implemented as a set of instructions (e.g., an application) stored in the storage ROM 230 or RAM 240. The processor 220, and/or the modules and/or the units in FIG. 4 may execute the set of instructions, and when executing the instructions, the processor 220, and/or the modules and/or the units may be configured to perform the process 500-1. The operations of the illustrated process presented below are intended to be illustrative. In some embodiments, the process 500-1 may be accomplished with one or more additional operations not described and/or without one or more of the operations herein discussed. Additionally, the order in which the operations of the process as illustrated in FIG. 5A and described below is not intended to be limiting.

In 511, the processing device 112 may obtain a target block in a target image. In some embodiments, the target image may be a single image or a video frame to be encoded (or compressed). In some embodiments, the target image may be in a format of YUV (including a luminance component, a Cb chrominance component, and a Cr chrominance component) or Red-Green-Blue (RGB) (which may be converted into the YUV format). In some embodiments, the target image may be divided into a plurality of coding units (CU). A coding unit may include a plurality of pixels in the target image. A coding unit may be square or non-square (e.g., rectangular) in shape. The sizes of the plurality of coding units may be the same or different. The size of a coding unit may be defined by a number (or count) of pixels in the coding unit. For example, the numbers (or counts) of the pixels included in the plurality of coding units may be the same or different. The shapes of the plurality of coding units may be the same or different. In some embodiments, at least one of the plurality of coding units may be further divided into two or more sub-units. In some embodiments, the division of the coding unit may include vertical division, horizontal division, or the like. Details regarding the division of the coding unit may be found elsewhere in the present disclosure (e.g., the description in connection with FIG. 13, FIG. 14, and/or FIG. 15). The target image may be encoded by individually encoding the plurality of coding units and/or the sub-units in a certain order, such as from left to right and from top to bottom in the target image. In some embodiments, the target block may be one of the plurality of coding units or the sub-units that is to be encoded.

In 513, the processing device 112 may determine a preliminary most probable mode (MPM) list of the target block. In some embodiments, the preliminary MPM list may include a plurality of intra-prediction modes ranked in a first order.

In 515, the processing device 112 may determine a final MPM list of the target block based on the preliminary MPM list. In some embodiments, the final MPM list may include a plurality of intra-prediction modes ranked in a second order.

In some embodiments, the processing device 112 may determine the final MPM list based at least in part on at least one of:
 (a) intra-prediction modes of two or more adjacent blocks of the target block,
 (b) a width and a height of the target block, or
 (c) intra-prediction modes related to a plurality of encoded blocks,
 wherein when determining the final MPM list based on the intra-prediction modes of the plurality of encoded blocks, the processing device 112 may consider a statistical number (or count) of the intra-prediction modes of an encoded block, and/or a similarity between the texture features of an encoded block and the target block.

Details regarding the determination of the preliminary MPM list and/or the final MPM list may be found elsewhere in the present disclosure (e.g., the description in connection with FIGS. 9-20).

In 517, the processing device 112 may determine a target intra-prediction mode of the target block based on the final MPM list. The target intra-predication mode may be configured to predict the pixel values of the pixels in the target block according to one or more pixels that have already encoded (also referred to as reference pixels) in the target image.

Figure 6:
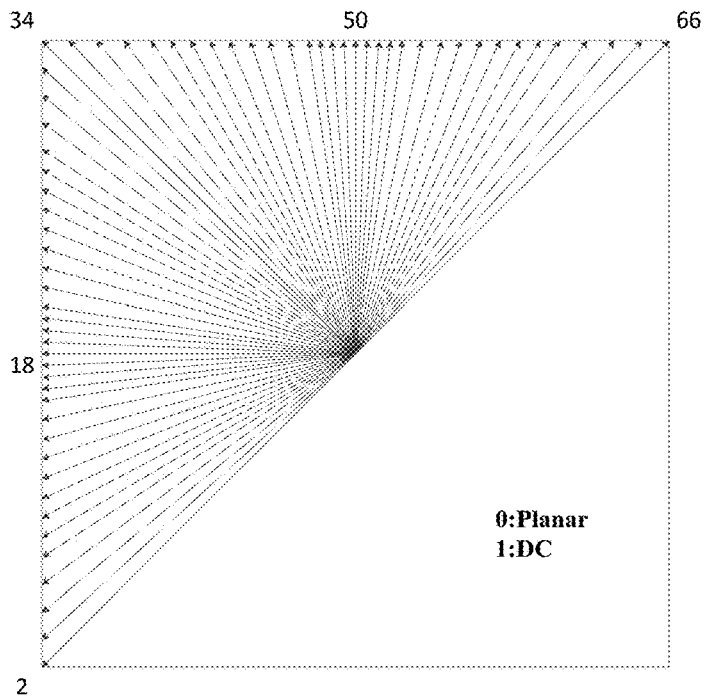
FIG. 6 is a schematic diagram illustrating exemplary directions of ordinary angular modes with different indexes according to some embodiments of the present disclosure.
Figure 7:
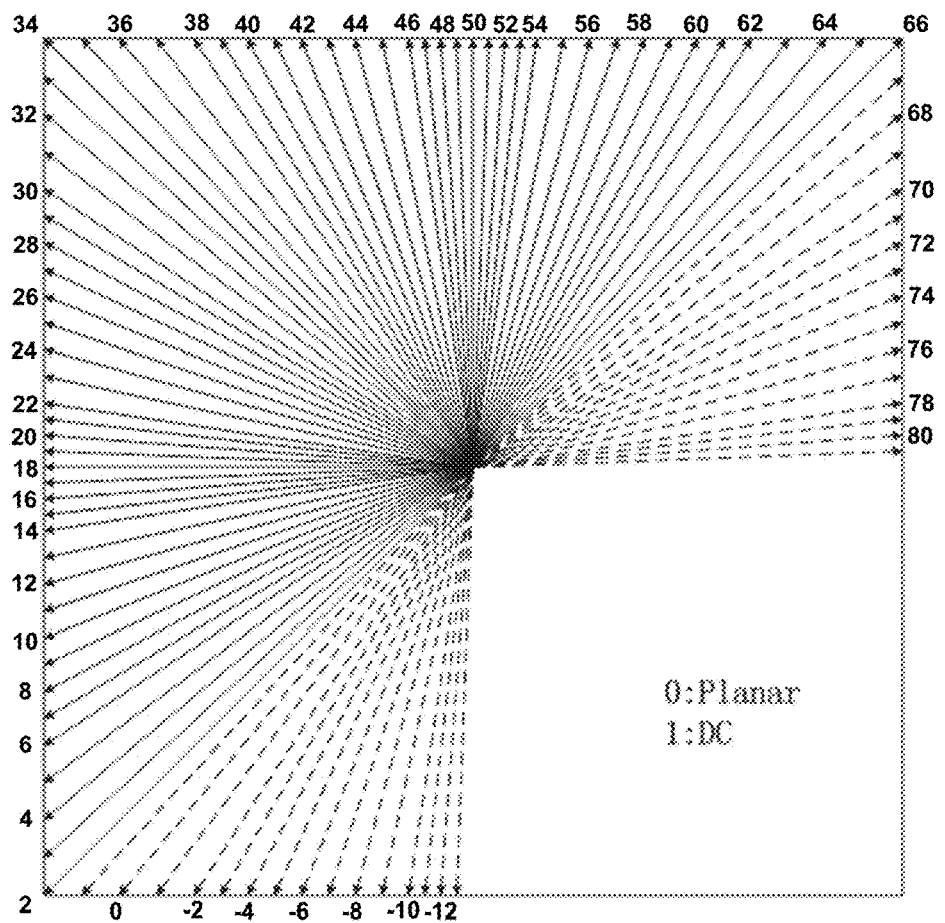
FIG. 7 is a schematic diagram illustrating exemplary directions of wide-angular modes with different indexes according to some embodiments of the present disclosure.

In some embodiments, according to the final MPM list, the target intra-predication mode may be selected from a plurality of intra-predication modes. In some embodiment, the intra-predication mode may include an angular mode or a non-angular mode. The non-angular mode may include a planar mode, a direct-current (DC) mode, or the like. The angular mode may include different types of modes each of which may represent a prediction direction. For example, the plurality of intra-predication modes may include 35 intra-prediction modes that include the planar mode, the DC mode, and 33 angular modes each of which represents a prediction direction. As another example, FIG. 6 shows 67 exemplary intra-prediction modes according to some embodiments of the present disclosure. As shown in FIG. 6, the plurality of intra-predication modes may include the 67 exemplary intra-prediction modes that include the planar mode, the DC mode, and 65 angular modes each of which represents a prediction direction where an arrow points. As shown in FIG. 6, the index of the planar mode may be 0. The index of the DC mode may be 1. The indexes of the 65 angular modes may be 2-66, respectively. As shown in FIG. 6, angular modes 18 and 50 may represent a horizontal prediction direction and a vertical prediction direction, respectively. As still another example, in addition to the 67 intra-prediction modes shown in FIG. 6, the plurality of intra-prediction modes may further include a plurality of wide-angular modes (as shown in FIG. 7) each of which represents a prediction direction where a dashed arrow in FIG. 7 points. As shown in FIG. 7, the indexes of the wide-angular modes may be −13-1 and 67-81. Angular modes 2-66 may be referred to as ordinary angular modes. In some embodiments, when the wide-angular modes are applied, the indexes of the planar mode and the wide-angular mode 0 may be different, and the indexes of the DC mode and the wide-angular mode 1 may be different. For example, the index of the planar mode may be designated as "0," the index of the DC mode may be designated as "1," the index of the wide-angular mode 0 may be designated as "wide-angular 0," and the index of the wide-angular mode 1 may be designated as "wide-angular 1." As another example, the index of the planar mode may be designated as "non-angular 0," the index of the DC mode may be designated as "non-angular 1," the index of the wide-angular mode 0 may be designated as "0," and the index of the wide-angular mode 1 may be designated as "1." As still another example, the index of the planar mode may be designated as "non-angular 0," the index of the DC mode may be designated as "non-angular 1," the index of the wide-angular mode 0 may be designated as "wide-angular 0," and the index of the wide-angular mode 1 may be designated as "wide-angular 1."

As used in the present disclosure, terms "angular mode" and "angular intra-prediction mode" may be used interchangeably. Terms "non-angular mode" and "non-angular intra-prediction mode" may be used interchangeably. As used in the present disclosure, an angular intra-prediction mode may be represented based on its index. For example, an angular intra-prediction mode with an index m may be represented as an angular mode m, an angular intra-prediction mode m, a mode m, or m, which may be used interchangeably. A non-angular intra-prediction mode may be represented as the planar mode, Planar, the DC mode, or DC.

In some embodiments, the processing device 112 may determine the reference pixels corresponding to the target block based on at least one reference line. In some embodiments, the reference line may include a first portion nearby a first side (e.g., a left side) and a second portion nearby a second side (e.g., a top side) of the target block. The first side and the second side may be adjacent. A portion (e.g., the first portion or the second portion) of a reference line is nearby a side of the target block indicates that there may be a certain number (e.g., 0, 1, 2, 3, 4, 5, etc.) of rows or columns of pixels between the portion of the reference line and the side of the target block.

In some embodiments, the first side and the second side of the target block may be physically adjacent rather than parallel to each other. For example, if the first side is the left side of the target block, the second side may be the top side or a bottom side of the target block, not a right side of the target block. In some embodiments, since a reference line needs to include as many encoded pixels as possible, the first side and/or the second side of the target block may be determined based on an order of encoding/decoding the target image. For example, if the order of encoding/decoding the target image is from the left to the right and from the top to the bottom, the first side may be the left side of the target block and the second side may be the top side of the target block or the first side may be the top side of the target block and the second side may be the left side of the target block.

In some embodiments, the reference line may include multiple pixels of the target block. For example, the first portion (or the second portion) of a reference line may include at least a part of pixels in a pixel row or a pixel column nearby the first side (or the second side) of the target block. In some embodiments, the pixels included in the at least one reference line may be referred to as the reference pixels of the target block. In some embodiments, the number (or count) of the reference pixels in the first portion (or the second portion) of a reference line may be greater than or equal to a length of the first side of the target block (or a second side length of the target block on the second side). As used herein, the length of a side of the target block refers to a count or number of pixels on the side of the target block.

Figure 8:
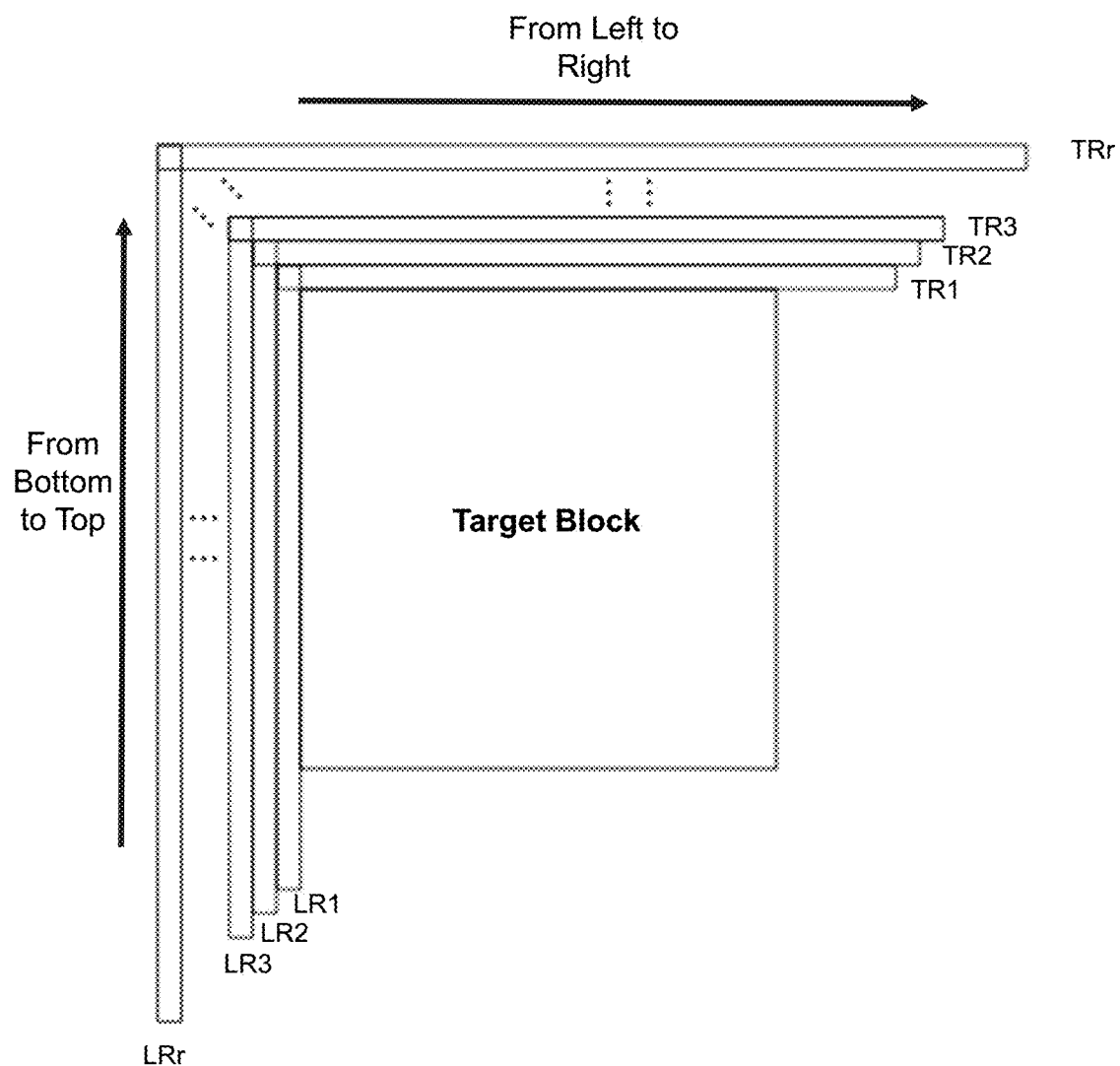
FIG. 8 is a schematic diagram illustrating exemplary reference lines associated with a target block according to some embodiments of the present disclosure.

In some embodiments, the pixel value of a reference pixel may be determined based on one or more pixel values of encoded pixels in the target image. In some embodiments, for the first portion of a reference line, the pixel values of reference pixels on the first portion may be determined successively according to a specified direction (e.g., as shown in FIG. 8, from bottom to top or from left to right). When the pixel value of a reference pixel is determined to be not available, i.e., the reference pixel has not been encoded, the pixel value of the reference pixel may be determined based on a pixel value of an encoded reference pixel or set as a default value. For example, for a 1st reference pixel in the first portion, if the pixel value of the 1st reference pixel is determined to be not available, whether pixel values of other reference pixels on the first portion are available may be determined one by one along a specified direction (e.g., from bottom to top, from left to right) until a pixel value of a $t^{th}$ reference pixel on the first portion is determined to be available. Pixel values of reference pixels between the $1^{st}$ reference pixel and the $t^{th}$ reference pixel on the first portion may be set as the pixel value of the $t^{th}$ reference pixel. If the pixel values of other reference pixels on the first portion are determined to be not available, the pixel values of the $1^{st}$ reference pixel on the first portion may be set as a default value. As another example, for a non-$1^{st}$ reference pixel in the first portion, if the pixel value of the non-$1^{st}$ reference pixel is determined to be not available, the pixel value of the non-$1^{st}$ reference pixel may be set as a pixel value of a reference pixel prior to the non-$1^{st}$ reference pixel along the specified direction.

FIG. 8 is a schematic diagram illustrating exemplary reference lines associated with a target block according to some embodiments of the present disclosure. As illustrated in FIG. 8, r reference lines (e.g., $LR_1+TR_1$, $LR_2+TR_2$, $LR_3+TR_3$, . . . , $LIR_r+TR_r$) may be defined on the left and above the target block. The r reference lines on the left and above the target block may include r first portions (e.g., $LR_1$, $LR_2$, $LR_3$, . . . , $LR_r$) located on the left of the target block and r second portions (e.g., $TR_1, TR_2, TR_3, \ldots, TR_r$) located above the target block. Each of r reference lines may be identified with an index. For example, the indexes of $LR_1+TR_1$, $LR_2+TR_2$, $LR_3+TR_3, \ldots, LIR_r+TR_r$, may be 0 (e.g., the first reference line), 1, 2, . . . , r−1, respectively. The larger the index of a reference line is, the greater the distance between the reference line and the target block may be. For example, $LR_1$ may be adjacent to the left side of the target block and $TR_1$ may be adjacent to the top side of the target block. As described above, the first portion and/or the second portion of each of the r reference lines may include a plurality of reference pixels and pixel values of the plurality of reference pixels may be determined one by one along a specified direction (e.g., as shown in FIG. 8, from bottom to top or from left to right).

In some embodiments, the planar prediction mode may be used for prediction of a region of the target image with relatively smooth image texture and relatively gradual gradient of pixel values. According to the planar prediction mode, the pixel values of the pixels in the target block may be predicted by performing linear interpolation and/or averaging based on pixel values of the reference pixels adjacent to the top, bottom, left, and/or right sides of the target block.

In some embodiments, the DC prediction mode may be used for a region of the target image that is relatively smooth, and with relatively smooth texture and relatively little gradient of pixel values. According to the DC prediction mode, an average of pixel values of the reference pixels adjacent to a first side (e.g., the left side) and a second side (e.g., the top side) of the target block may be determined as an intermediate variable, and then all pixel values of the pixels in the target block may be predicted according to the intermediate variable. For example, all pixel values of the pixels in the target block may be predicted as the intermediate variable.

In some embodiments, a pixel value of a target pixel in the target block may be predicted according to an angular mode and at least one reference line. For example, for each of the at least one reference line, a straight line may be determined from the target pixel along a prediction direction of an angular mode. If the straight line goes through only one reference pixel in the reference line, the pixel value of the reference pixel may be determined as a candidate pixel value. If the straight line goes through between two reference pixels in the reference line, a candidate pixel value may be determined by performing interpolation based on the pixel values of the two reference pixels. The candidate pixel value with a minimum cost value may be determined as a prediction value of the target pixel.

In some embodiments, the target intra-prediction mode of the target block may be an intra-prediction mode with a smallest rate-distortion cost (Rdcost) in the final MPM list of the target block. In some embodiments, if a single one reference line (e.g., the first reference line with the index=0) is used for intra-prediction of the target block, the processing device 112 may determine a final MPM list corresponding to the reference line. In some embodiments, if multiple reference lines are used for intra-prediction of the target block, the processing device 112 may determine a final MPM list corresponding to the multiple reference lines, or the processing device 112 may determine a first final MPM list corresponding to the first reference line, and determine a second final MPM list corresponding to the non-first reference lines (e.g., reference lines with the index>0). The target intra-prediction mode of the target block may be an intra-prediction mode with a smallest Rdcost in the final MPM list. Because the prediction value of each pixel in the target block (used to determine a residual data block corresponding to the target block) is determined according to at least one reference line and the target intra-prediction mode, in addition to the target intra-prediction mode of the target block, it is necessary to determine the index of the at least one reference line corresponding to the target intra-prediction mode.

In some embodiments, the processing device 112 may determine one or more specific intra-prediction modes. The processing device 112 may select the intra-prediction mode with a smallest Rdcost in the one or more specific intra-prediction modes and the final MPM list as the target intra-prediction mode of the target block.

In some embodiments, if a single one reference line is used for intra-prediction of the target block, the process for determining the target intra-prediction mode may include a first preliminary selection stage, a second preliminary selection stage, and an advanced selection stage.

In the first preliminary selection stage, the processing device 112 may select, based on the Rdcosts of a plurality of intra-prediction modes, one or more first preliminary modes from the planar mode, the DC mode, and angular modes of which the indexes are even of the plurality of intra-prediction modes (e.g., modes 6, 30, 48, etc. of modes 0-66 shown in FIG. 6). In some embodiments, the processing device 112 may select 3 first preliminary modes corresponding to 3 smallest Rdcosts, respectively.

In the second preliminary selection stage, for each angular mode in the one or more first preliminary modes, the processing device 112 may determine the Rdcost of at least one nearby angular mode of the angular mode. The processing device 112 may compare the Rdcosts of the nearby angular modes and the Rdcosts of the one or more first preliminary modes, and retain the angular mode with the smallest Rdcost based on the comparison to obtain one or more (e.g., 3) second preliminary modes. For example, the nearby angular mode of the angular mode f may include at least one of angular modes f±1, f±2, f±3, f±4, etc. If the first preliminary modes include the DC mode and angular modes 18 and 36 (e.g., as shown in FIG. 6), the nearby angular mode of the angular mode 18 and 36 may include angular modes 17 and 19 corresponding to angular modes 18 and angular modes 35 and 37 corresponding to angular mode 36. The processing device 112 may determine the Rdcosts of the angular modes 17, 19, 35, and 37. The processing device 112 may compare the Rdcosts of the DC mode and the angular modes 18, 36, 17, 19, 35, and 37. If the Rdcosts of the DC mode and the angular modes 19 and 36 are the 3 smallest Rdcosts among the 7 Rdcosts, the second preliminary mode may include the DC mode and the angular modes 19 and 36.

In the advanced selection stage, the processing device 112 may add at least one intra-prediction mode (e.g., the first one, two, or three modes) in the final MPM list to the one or more second preliminary modes, and merge the same intra-prediction modes to obtain a candidate mode list. The processing device 112 may select the intra-prediction mode with the smallest Rdcost in the candidate mode list as the target intra-prediction mode.

In some embodiments, if multiple reference lines are used for intra-prediction of the target block, the process for determining the target intra-prediction mode may include a first preliminary selection stage, a second preliminary selection stage, a third preliminary selection stage, and an advanced selection stage.

In the first preliminary selection stage, the processing device 112 may select, based on the Rdcosts of a plurality of intra-prediction modes, one or more first preliminary modes from the planar mode, the DC mode, and angular modes of which the indexes are even of the plurality of intra-prediction modes (e.g., modes 6, 30, 48, etc. of modes 0-66 shown in FIG. 6). In some embodiments, the processing device 112 may select 3 first preliminary modes corresponding to 3 smallest Rdcosts, respectively. In this stage, only the first reference line (reference line 0) of the target block may be used. The index of the reference line corresponding to the one or more first preliminary modes may be recorded as 0.

In the second preliminary selection stage, for each angular mode in the one or more first preliminary modes, the processing device 112 may determine the Rdcost of at least one nearby angular mode of the angular mode. The processing device 112 may compare the Rdcosts of the nearby angular modes and the Rdcosts of the one or more first preliminary modes, and retain the angular mode with the smallest Rdcost based on the comparison to obtain one or more (e.g., 3) second preliminary modes. For example, the nearby angular mode of the angular mode f may include at least one of angular modes f±1, f±2, f±3, f±4, etc. In this stage, only the first reference line (reference line 0) of the target block may be used. The index of the reference line corresponding to the one or more second preliminary modes may be recorded as 0.

In the third preliminary selection stage, the processing device 112 may determine the Rdcosts of one or more intra-prediction modes in the second final MPM list corresponding to the non-first reference lines, and compare these Rdcosts with the Rdcosts of the one or more second preliminary modes. The processing device 112 may select one or more (e.g., 3) third preliminary modes corresponding to one or more (e.g., 3) smallest Rdcosts, respectively, based on the comparison. The processing device 112 may record the index of the reference line corresponding to each of the one or more third preliminary modes.

In the advanced selection stage, the processing device 112 may add at least one intra-prediction mode (e.g., the first one, two, or three modes) in the first final MPM list corresponding to the first reference line to the one or more third preliminary modes, and merge the same intra-prediction modes to obtain a candidate mode list. The processing device 112 may select the intra-prediction mode with the smallest Rdcost to in the candidate mode list as the target intra-prediction mode.

In some embodiments, in the preliminary selection stage, the processing device 112 may determine the Rdcost using a sum of absolute transformed difference (SATD) cost (between the original image and the predicted image) with relatively low complexity. In some embodiments, in the advanced selection stage, the processing device 112 may determine the Rdcost using a sum of squared error (SSE) cost (between the original image and the predicted image) with relatively high complexity.

In some embodiments, the Rdcost of an intra-prediction mode may be represented as Equation (1) below:

$$Rdcost = D + \lambda * R \tag{1}$$

wherein D and R respectively represent a distortion loss and the number (or count) of bits when an intra-prediction mode is used to predict the target block, and λ refers to a Lagrange factor.

In some embodiments, the processing device 112 may encode the target block based on the target intra-prediction mode.

In 519, the processing device 112 may encode the target block based on the target intra-prediction mode. For example, the processing device 112 may predict the pixel values of the pixels in the target block using the target intra-prediction mode according to a single reference line (e.g., the reference line 0) or multiple reference lines.

In 521, the processing device 112 may determine a code word of the target intra-prediction mode by encoding the target intra-prediction mode based on the final MPM list.

Merely by way of example, the final MPM list may include 3 intra-prediction modes, such as $MPM_f[0]$=Planar, $MPM_f[1]$=DC, $MPM_f[2]$=15. When the target intra-prediction mode is the planar mode, the processing device 112 may determine the code word of the target intra-prediction mode as a binary code word 0 corresponding to the index [0] that indicates the first location in the final MPM list. When the target intra-prediction mode is the DC mode, the processing device 112 may determine the code word of the target intra-prediction mode as a binary code 10 corresponding to the index [1] that indicates the second location in the final MPM list. When the target intra-prediction mode is the angular mode 15 (e.g., as shown in FIG. 6), the processing device 112 may determine the code word of the target intra-prediction mode as a binary code word 110 corresponding to the index [2] that indicates the third location in the final MPM list. When the target intra-prediction mode is the angular mode 20 (e.g., as shown in FIG. 6) that is not included in the final MPM list, the processing device 112 may determine the code word of the target intra-prediction mode as a binary code word that has more than three bits.

In some embodiments, for multiple reference lines, the processing device 112 may further determine a code word of at least one of the multiple reference lines corresponding to the target intra-prediction mode by encoding the at least one reference line. According to the code word of the target intra-prediction mode of the target block and the code word of the at least one reference line, the processing device 112 may determine a combination code word and write the combination code word into a code stream.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 5B:
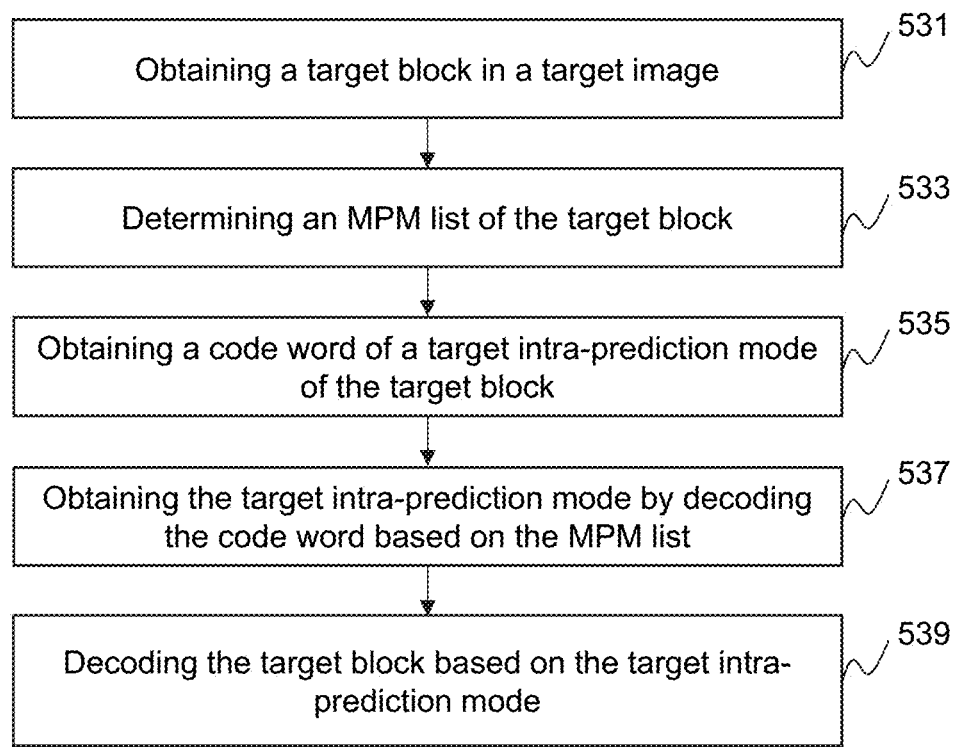
FIG. 5B is a flowchart illustrating an exemplary decoding process for intra-prediction according to some embodiments of the present disclosure.

FIG. 5B is a flowchart illustrating an exemplary decoding process for intra prediction according to some embodiments of the present disclosure. In some embodiments, the process 500-2 may be implemented as a set of instructions (e.g., an application) stored in the storage ROM 230 or RAM 240. The processor 220, and/or the modules and/or the units in FIG. 4 may execute the set of instructions, and when executing the instructions, the processor 220, and/or the modules and/or the units may be configured to perform the process 500-2. The operations of the illustrated process presented below are intended to be illustrative. In some embodiments, the process 500-2 may be accomplished with one or more additional operations not described and/or without one or more of the operations herein discussed. Additionally, the order in which the operations of the process as illustrated in FIG. 5B and described below is not intended to be limiting.

In 531, the processing device 112 may obtain a target block in a target image.

In 533, the processing device 112 may determine an MPM list of the target block.

In 535, the processing device 112 may obtain a code word of the target intra-prediction mode of the target block.

In 537, the processing device 112 may obtain the target intra-prediction mode by decoding the code word based on the MPM list.

In 539, the processing device 112 may decode the target block based on the target intra-prediction mode.

In some embodiments, the processing device 112 may decode a coding stream encoded by an encoder. Taking the decoding of a target block in a target image as an example, the processing device 112 may decode a code word of a target intra-prediction mode of the target block to obtain the target intra-prediction mode. When there are multiple reference lines, it is necessary to decode the reference line corresponding to the target intra-prediction mode. According to the reference line and the target intra-prediction mode, the reference pixels of the target block may be determined, so the predicted pixel value of each pixel in the target block may be obtained. According to data such as the residual pixel value of each pixel, the target block may be decoded. During a process for decoding a code word of a target intra-prediction mode, it is also necessary to establish an MPM list. The process for determining MPM list for decoding the target block may be similar to the processing for determining the MPM list (e.g., the final MPM list) for encoding the target block. The decoding process for a target block may be similar to the encoding process for the target block, which will not be repeated here.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 9 is a flowchart illustrating an exemplary process for determining a final MPM list of a target block according to some embodiments of the present disclosure. In some embodiments, the process 900 may be implemented as a set of instructions (e.g., an application) stored in the storage ROM 230 or RAM 240. The processor 220, and/or the modules and/or the units in FIG. 4 may execute the set of instructions, and when executing the instructions, the processor 220, and/or the modules and/or the units may be configured to perform the process 900. The operations of the illustrated process presented below are intended to be illustrative. In some embodiments, the process 900 may be accomplished with one or more additional operations not described and/or without one or more of the operations herein discussed. Additionally, the order in which the operations of the process as illustrated in FIG. 9 and described below is not intended to be limiting. In some embodiments, the processing device 112 may perform operations 513 and 515 of the process 500 in FIG. 5 based on the process 900.

In 910, the processing device 112 may determine a preliminary most probable mode (MPM) list of a target block according to intra-prediction modes of two or more blocks (referred to as adjacent blocks for brevity) adjacent to the target block. In some embodiments, an adjacent block may include a plurality of pixels that have already encoded (also referred to as encoded pixels) in the target image. The intra-prediction mode of an adjacent block may refer to the intra-prediction mode used to encode the adjacent block.

In some embodiments, operation 910 may include: obtaining the two or more adjacent blocks of the target block in the target image; obtaining the intra-prediction modes of the two or more adjacent blocks; ranking the intra-prediction modes of the two or more adjacent modes according to a correlation between each of the two or more adjacent blocks and the target block; and determining the preliminary MPM list based on the rank result. As used herein, a correlation between two blocks (e.g., the adjacent block and the target block) may refer to a probability that the intra-prediction modes used to encode the two blocks are the same.

In some embodiments, the adjacent block of the target block may include one or more first-level adjacent blocks and one or more second-level adjacent blocks. A first-level adjacent block may refer to a block of which at least a portion of a side overlap at least a portion of a side of the target block, such as the top adjacent block A and the left adjacent block L in FIG. 10A. A second-level adjacent block may refer to a block of which only a vertex overlap a vertex of the target block, such as the bottom-left adjacent block BL, the top-left adjacent block AL, and the top-right adjacent block AR in FIG. 10A.

The size of an adjacent block may be equal to, greater than, or smaller than the size of the target block. For example, the number (or count) of the pixels in the adjacent block may be equal to, greater than, or less than the number (or count) of the pixels in the target block. In some embodiments, an adjacent block may be square or non-square (e.g., rectangular) in shape. In some embodiments, the shape of an adjacent block may be the same as or different from the shape of the target block. In some embodiments, the sizes of the two or more adjacent blocks may be the same or different. In some embodiments, the shapes of the two or more adjacent blocks may be the same or different.

In some embodiments, the processing device 112 may obtain the two or more adjacent blocks based on the encoding order of the target image. For example, if the encoding order is from left to right and from top to bottom, the processing device 112 may obtain two or more adjacent blocks (e.g., at least two of blocks A, L, BL, AL, and AR in FIG. 10A) located above and/or on the left of the target block to ensure that the obtained two or more adjacent blocks include encoded pixels. For example, as shown in FIG. 10B, the processing device 112 may obtain three adjacent blocks A, L, and BL. As another example, as shown in FIG. 10C, the processing device 112 may obtain two adjacent blocks A and L.

In some embodiments, the processing device 112 may obtain more than two adjacent blocks, which may make full use of more adjacent blocks, make use of the correlation between each adjacent block and the target block, and increase the number (or count) of intra-prediction modes in the preliminary MPM list and the number (or count) of intra-prediction modes in the final MPM list, thereby increasing the probability that the target intra-prediction mode of the target block falls into the final MPM list.

In some embodiments, the processing device 112 may rank the intra-prediction modes of the two or more adjacent in a descending order of the correlation between each of the two or more adjacent blocks and the target block. The correlation between a first-level adjacent block and the target block may be higher than the correlation between a second-level adjacent block and the target block. It may be understood that the stronger the correlation between an adjacent block and the target block is, the stronger the correlation between the intra-prediction mode used in the adjacent block and the target intra-prediction mode used in the target block may be, and the greater the probability that the target intra-prediction mode of the target block is the same as the intra-prediction mode of the adjacent block may be.

In some embodiments, the processing device 112 may obtain at least two of a top adjacent block (A), a left adjacent block (L), a top-left adjacent block (AL), a bottom-left adjacent block (BL), and a bottom-right adjacent block (AR) shown in FIG. 10A as the adjacent blocks of the target block.

In some embodiments, the descending order of the correlation between each of blocks A, L, AL, BL, and AR, and the target block may include, but not limited to:

(I) L>A>BL>AL>AR,
(II) L>A>AL>BL>AR,
(III) A>L>BL>AL>AR,
(IV) A>L>AL>BL>AR, and
(V) A>L>AR>BL>AL.

In some embodiments, the processing device 112 may obtain more than two of the top adjacent block (A), the left adjacent block (L), the top-left adjacent block (AL), the bottom-left adjacent block (BL), and the bottom-right adjacent block (AR) shown in FIG. 10A as the adjacent blocks of the target block. For example, as shown in FIG. 10B, the processing device 112 may obtain the adjacent blocks of the target block including the top adjacent block (A), the left adjacent block (L), and the bottom-left adjacent block (BL). In some embodiments, the correlation between L (or A) and the target block may be higher than the correlation between BL and the target block. The descending order of the correlation between each of the three adjacent blocks and the target block may include L>A>BL, or A>L>BL.

In some embodiments, the processing device 112 may rank an L mode (the intra-prediction mode used in block L), an A mode (the intra-prediction mode used in block A), and a BL mode (the intra-prediction mode used in block BL) based on the descending order of the correlation between each of L, A, and BL, and the target block to obtain the preliminary MPM list. The elements in the preliminary MPM list of the target block may sequentially be: the L mode, the A mode, and the BL mode, or the A mode, the L mode, and the BL mode. As used in the present disclosure, an element in a list (e.g., the preliminary MPM list, the final MPM list, the candidate mode list, and the MPM candidate list) including one or more intra-prediction modes may correspond to one of the one or more intra-prediction modes in the list. As used in the present disclosure, a/the first element (or mode), a/the second element (or mode), a/the third element (or mode), etc. in a list (e.g., the preliminary MPM list, the final MPM list, the candidate mode list, and the MPM candidate list) may refer to a/the first-ranked element (or mode), a/the second-ranked element (or mode), a/the third-ranked element (or mode), etc. in the list.

Figure 11:
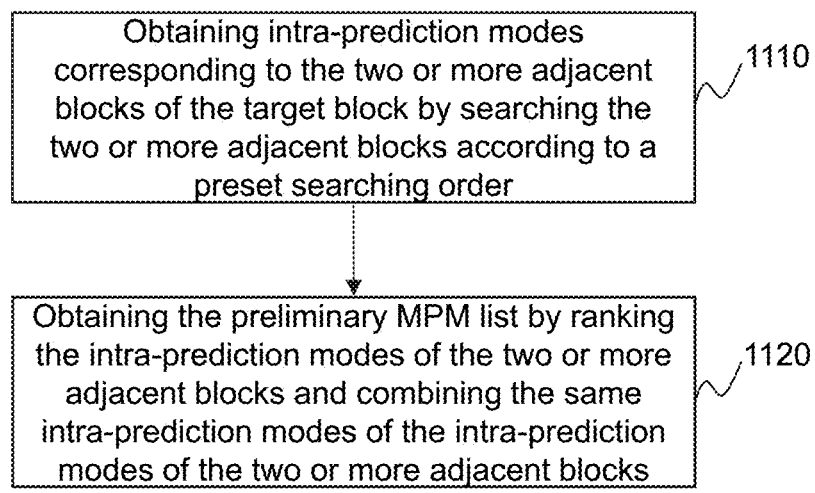
FIG. 11 is a flowchart illustrating an exemplary process for determining a preliminary MPM list according to some embodiments of the present disclosure.

Details regarding determining the preliminary MPM list may be found elsewhere in the present disclosure (e.g., the description in connection with FIG. 11).

In 920, the processing device 112 may determine a final MPM list of the target block according to the preliminary MPM list of the target block.

In some embodiments, the preliminary MPM list of the target block may be designated as the final MPM list of the target block. In some embodiments, the processing device 112 may determine the final MPM list by performing one or more operations to the preliminary MPM list, such as deleting one or more elements (e.g., one or more prediction modes), adding one or more elements (e.g., one or more prediction modes), adjusting a location of at least one element (e.g., one or more prediction modes) in the preliminary MPM list, etc. In the adjusted preliminary MPM list (e.g., the final MPM list), the order of the intra-prediction modes of the adjacent blocks may be consistent with the descending order of the correlation between each adjacent block and the target block.

In some embodiments, the processing device 112 may determine the final MPM list of the target block according to the preliminary MPM list and a non-angular intra-prediction mode (e.g., the planar mode and/or the DC mode). The final MPM list may include one or more angular intra-prediction modes (also referred to as a type-B mode) that are ranked relatively high (e.g., top 1, top 2, top 5, top 1%, top 2%, top 5%, etc.) in the preliminary MPM list, and/or the non-angular intra-prediction mode (also referred to as a type-A mode).

In some embodiments, the probability that the non-angular intra-prediction mode is selected as the target intra-prediction mode may be relatively high. The intra-prediction mode that is ranked relatively high in the preliminary MPM list may have a higher probability of being selected as the target intra-prediction mode than the intra-prediction mode that is ranked relatively low in the preliminary MPM list. Therefore, the intra-prediction mode ranked relatively high in the preliminary MPM list and the non-angular intra-prediction mode may have higher priority, and may be ranked relatively high in the final MPM list to increase the probability that the target intra-prediction mode falls into the final MPM list.

In some embodiments, the number (or count) of one or more angular intra-prediction modes ranked relatively high in the preliminary MPM list (also referred to as a type-B mode) may be less than or equal to a threshold, such as M−2, wherein M refers to the number (or count) of elements (i.e., prediction modes) in the final MPM list.

In some embodiments, the processing device 112 may determine the final MPM list based on whether there is at least one non-angular intra-prediction mode (e.g., the planar mode and/or the DC mode) in the preliminary MPM list, and the order of the intra-prediction modes ranked (e.g., the order of the angular intra-prediction modes, the order of the non-angular intra-prediction modes) in the preliminary MPM list, which may improve the priority (e.g., the rank) of the non-angular intra-prediction mode in the final MPM list.

In a first embodiment, if there is at least one non-angular intra-prediction mode (e.g., the planar mode and/or the DC mode) in the preliminary MPM list of the target block, the processing device 112 may set the first two elements in the final MPM list as the planar mode and the DC mode, respectively. According to the order of the one or more type-B modes in the preliminary MPM list, the processing device 112 may successively add, as the elements of the final MPM list, at least a portion of the one or more type-B modes after the planar mode and the DC mode.

If there is no non-angular intra-prediction mode (i.e., type-A mode) in the preliminary MPM list of the target block, according to the order of the one or more type-B modes in the preliminary MPM list, the processing device 112 may successively add, as the elements of the final MPM list, at least a portion of the one or more type-B modes to the final MPM list. The processing device 112 may successively add, as the elements of the final MPM list, the planar mode and the DC mode subsequently after the at least a portion of the one or more type-B modes.

In order to simplify the description, M (the number (or count) of the intra-prediction modes in the final MPM list) may be set as 6. For example, the final MPM list may include 6 elements, such as, in order, $MPM_f[0]$, $MPM_f[1]$, $MPM_f[2]$, $MPM_f[3]$, $MPM_f[4]$, and $MPM_f[5]$. The processing device 112 may obtain N (N≥2) adjacent blocks of the target block. The number (or count) of the intra-prediction modes in the preliminary MPM list may be i (N≥i). The preliminary MPM list may be denoted as $\{m_0, m_1, \ldots, m_{i-1}\}$. Modes 0-66 in FIG. 6 may be applied.

Merely by way of example, a first solution (including case a and case b) for determining the final MPM list may be described as follows.

In case a, if there is at least one non-angular intra-prediction modes in the preliminary MPM list, the processing device 112 may set the first two elements in the final MPM list as $MPM_f[0]$=Planar, and $MPM_f[1]$=DC.

If there is no angular intra-prediction mode in the preliminary MPM list, the processing device 112 may set the remaining four elements in the final MPM list as $MPM_f[2]$=vertical mode (e.g., mode 50 in FIG. 6), $MPM_f[3]$=horizontal mode (e.g., mode 18 in FIG. 6), $MPM_f[4]$=vertical mode-4 (e.g., mode 46 in FIG. 6), $MPM_f[5]$=vertical mode+4 (e.g., mode 54 in FIG. 6).

If there are only n (0<n<i) angular intra-prediction modes (e.g., $m_0, m_1, \ldots, m_{n-1}$) in the preliminary MPM list, the processing device 112 may set the remaining four elements based on the n modes based on the order of the n modes in the preliminary MPM list. For example, if n>4, the processing device 112 may successively set the remaining four elements as the first four of the n modes. As another example, if 1≤n≤4, the processing device 112 may successively add the n modes to the preliminary MPM list after the second element of the preliminary MPM list. If there is still at least one pending element that is not determined in the final MPM list, for example, when n is less than 4, the processing device 112 may perform a supplement filling operation. Details regarding the supplement filling operation may be found elsewhere in the present disclosure (e.g., the description in connection with FIG. 12).

In case b, there is no non-angular intra-prediction mode in the preliminary MPM list, that is, the i modes $\{m_0, m_1, \ldots, m_{i-1}\}$ in the preliminary MPM list are all angular intra-prediction modes.

If 1≤i≤4, the processing device 112 may add $\{m_0, m_1, \ldots, m_{i-1}\}$ in the final MPM list in order, and add the planar mode and the DC mode in order subsequently after $\{m_0, m_1, \ldots, m_{i-1}\}$. If there is still at least one pending element that is not determined in the final MPM list, e.g., i is less than 4, the processing device 112 may perform the supplement filling operation. Details regarding the supplement filling operation may be found elsewhere in the present disclosure (e.g., the description in connection with FIG. 12).

If i>4, the processing device 112 may add the first 4 modes in $\{m_0, m_1, \ldots, m_{i-1}\}$ in the final MPM list in order, and add the planar mode and the DC mode in order subsequently after the first 4 modes.

In a second embodiment, if there is only one type of the non-angular intra-prediction mode in the preliminary MPM list of the target block, the processing device 112 may designate the non-angular intra-prediction mode as the first element in the final MPM list. The processing device 112 may add at least one angular intra-prediction mode of the preliminary MPM list subsequently after the first element and add another type of the non-angular intra-prediction mode subsequently after the added at least one angular intra-prediction mode.

In order to simplify the description, M (the number (or count) of the intra-prediction modes in the final MPM list) may be set as 6. For example, the final MPM list may include 6 elements, such as, in order, $MPM_f[0]$, $MPM_f[1]$, $MPM_f[2]$, $MPM_f[3]$, $MPM_f[4]$, and $MPM_f[5]$. The processing device 112 may obtain N (N≥2) adjacent blocks of the target block. The number (or count) of the intra-prediction modes in the preliminary MPM list may be i (N≥i). The preliminary MPM list may be denoted as $\{m_0, m_1, \ldots, m_{i-1}\}$. Modes 0-66 in FIG. 6 may be applied.

Merely by way of example, a second solution (including a case of N=2 and a case of N>2) for determining the final MPM list may be described as follows.

In the case of N=2, if there are one or two modes in the preliminary MPM list, and all of the one or two modes are the non-angular intra-prediction mode, the processing device 112 may set the first two elements in the final MPM list as the planar mode and the DC mode (e.g., $MPM_f[0]$=Planar, $MPM_f[1]$=DC, or $MPM_f[0]$=DC, and $MPM_f[1]$=Planar). The processing device 112 may set the remaining four elements as $MPM_f[2]$=vertical mode (e.g., mode 50 in FIG. 6), $MPM_f[3]$=horizontal mode (e.g., mode 18 in FIG. 6), $MPM_f[4]$=vertical mode-4 (e.g., mode 46 in FIG. 6), $MPM_f[5]$=vertical mode+4 (e.g., mode 54 in FIG. 6).

If there is only one mode that is the angular intra-prediction modem in the preliminary MPM list, the processing device 112 may set the first element in the final MPM list as the angular intra-prediction mode m (e.g., $MPM_f[0]$=m). The processing device 112 may set the second element and the third element as two non-angular intra-prediction modes (e.g., $MPM_f[1]$=Planar, $MPM_f[2]$=DC, or $MPM_f[1]$=DC, and $MPM_f[2]$=Planar), and set the remaining three elements as angular modes m−1, m+1, and m−2 (e.g., $MPM_f[3]$=m−1, $MPM_f[4]$=m+1, $MPM_f[5]$=m−2).

If there are two modes $m_0$ and $m_1$ in the preliminary MPM list, and there is only one angular intra-prediction mode in $m_0$ and $m_1$, the processing device 112 may set the first two elements as $m_0$ and $m_1$ in order (e.g., $MPM_f[0]$=$m_0$, $MPM_f[1]$=$m_1$), and add the two non-angular intra-prediction modes. The processing device 112 may combine the same modes (e.g., the same non-angular modes) and set the remaining 3 elements as 3 angular modes max $\{m_0, m_1\}$−1, max $\{m_0, m_1\}$+1, and max $\{m_0, m_1\}$−2 (e.g., $MPM_f[3]$=max $\{m_0, m_1\}$−1, $MPM_f[4]$=max $\{m_0, m_1\}$+1, $MPM_f[5]$=max $\{m_0, m_1\}$−2).

Alternatively, if there are two modes that are the DC mode and an angular intra-prediction mode m in the preliminary MPM list, the processing device 112 may set the first element in the final MPM list as the DC mode (e.g., $MPM_f[0]$=DC), and set the second element and the third element as the planar mode and m (e.g., $MPM_f[1]$=Planar, $MPM_f[2]$=m).

Alternatively, if there are two modes that are the planar mode and an angular intra-prediction mode m in the preliminary MPM list, and m=2 or 34 or 66 (e.g., as shown in FIG. 6), the processing device 112 may set the first element in the final MPM list as the planar mode (e.g., $MPM_f[0]$=Planar), set the second element as m (e.g., $MPM_f[1]$=m), and set the third element as the DC mode (e.g., $MPM_f[2]$=DC).

If there are two angular intra-prediction modes $m_0$ and $m_1$ in the preliminary MPM list, the processing device 112 may set the first two elements in the final MPM list as $m_0$ and $m_1$, respectively in order (e.g., $MPM_f[0]$=$m_0$, $MPM_f[1]$=$m_1$), and add the two non-angular intra-prediction modes (e.g., $MPM_f[2]$=Planar, $MPM_f[3]$=DC, or $MPM_f[2]$=DC, and $MPM_f[3]$=Planar). The processing device 112 may set the remaining 2 elements as angular modes max $\{m_0, m_1\}$−1 and max $\{m_0, m_1\}$+1 (e.g., $MPM_f[4]$=max $\{m_0, m_1\}$−1, $MPM_f[5]$=max $\{m_0, m_1\}$+1). If at least one of max $\{m_0, m_1\}$−1 and max $\{m_0, m_1\}$+1 is consistent with the determined 4 elements, the processing device 112 may set the remaining 2 elements as max $\{m_0, m_1\}$−2, max $\{m_0, m_1\}$+2 (e.g., $MPM_f[4]$=max $\{m_0, m_1\}$−2, $MPM_f[5]$=max $\{m_0, m_1\}$+2), and so on.

When N>2, the process for determining the final MPM list may be the same as the first solution.

Merely by way of example, a third solution (including a case of N=2 and a case of N>2) for determining the final MPM list may be described as follows.

When N=2, the process for determining the final MPM list may be the same as the first solution or the second solution. But when there are only the DC mode and an angular intra-prediction mode m in the preliminary MPM list, $MPM_f[0]$=DC, $MPM_f[1]$=Planar, and $MPM_f[2]$=m, or $MPM_f[1]$=m, and $MPM_f[2]$=Planar. The remaining elements may be determined based on the first solution or the second solution.

When N>2, the process for determining the final MPM list may be the same as the first solution, but when only the DC mode and one or more angular intra-prediction modes exist in the preliminary MPM list (e.g., there is no planar mode in the preliminary MPM list), $MPM_f[0]$=DC, and the processing device 112 may add at least one of the one or more angular intra-prediction modes and the planar mode after the DC mode. In some embodiments, the planar mode may be ranked before the added at least one angular intra-prediction mode in the final MPM list. In some embodiments, the added at least one angular intra-prediction mode may be ranked in front of the planar mode in the final MPM list. If the added at least one angular intra-prediction mode includes multiple angular intra-prediction modes, the planar mode may not be inserted between any two of the multiple angular intra-prediction modes. The planar mode may be guaranteed in the final MPM list. If there is still at least one pending element that is not determined in the final MPM list, the processing device 112 may perform the supplement filling operation.

Merely by way of example, a fourth solution (including a case of N=2 and a case of N>2) for determining the final MPM list may be described as follows.

When N=2, the process for determining the final MPM list may be the same as the first solution or the second solution, but when there is only the planar mode and an angular intra-prediction mode m in the preliminary MPM list (e.g., the DC mode does not exist in the preliminary MPM list), and m=2 or 34 or 66 (e.g., as shown in FIG. 6), $MPM_f[0]$=Planar, $MPM_f[1]$=m, $MPM_f[2]$=DC, and the remaining 3 elements may be set based on the first solution or the second solution.

When N>2, the process for determining the final MPM list may be the same as the first solution, but when there is only the planar mode and one or more angular intra-prediction modes in the preliminary MPM list, and there is only one of modes 2, 34, and 66 in the one or more angular intra-prediction modes, MPM [0]=Planar, and the remaining 5 elements may add at least one of the one or more angular intra-prediction modes and the DC mode after the planar mode. The added at least one angular intra-prediction mode may be ranked in front of the DC mode in the final MPM list. If the added at least one angular intra-prediction mode includes multiple angular intra-prediction modes, the DC mode may not be inserted between any two of angular intra-prediction modes, and the DC mode may be guaranteed in the final MPM list. If there is still at least one pending element that is not determined in the final MPM list, the processing device 112 may perform the supplement filling operation.

Merely by way of example, a fifth solution (including a case of N=2 and a case of N>2) for determining the final MPM list may be described as follows. The fifth solution may be a combination of the third solution and the fourth solution.

In a third embodiment, if there is only one type of the non-angular intra-prediction mode in the preliminary MPM list of the target block, the processing device 112 may take the non-angular intra-prediction mode as the first element in the final MPM list, and take another type of the non-angular intra-prediction mode as the second element, and add at least one angular intra-prediction mode of the preliminary MPM list to the final MPM list according to the order of the at least one angular intra-prediction mode in the preliminary MPM list.

For example, when only the DC mode and one or more angular intra-prediction modes exist in the preliminary MPM list (e.g., there is no planar mode in the preliminary MPM list), $MPM_f[0]$=DC, and $MPM_f[1]$=Planar. The processing device 112 may add the one or more angular intra-prediction modes in order in the final MPM list until all elements of the final MPM list are determined or all angular intra-prediction modes of the preliminary MPM list are added to the final MPM list. If there is still at least one pending element that is not determined in the final MPM list, the processing device 112 may perform the supplement operation.

The detailed description of the third embodiment may also relate to the contents of the second solution, the third solution, the fourth solution, and the fifth solution, and details are not described herein again.

It may be understood that the process for determining the final MPM list to increase the priority of the non-angular intra-prediction mode in the final MPM list may be performed based on any one of the five solutions above, or any combination thereof, or other solutions.

It may be understood that the non-angular intra-prediction mode may be more possible to be selected as the target intra-prediction mode. When the non-angular intra-prediction mode exists in the preliminary MPM list, the priority of the non-angular intra-prediction mode (e.g., the location in the final MPM list) should be further increased in the final MPM list, because the probability that the non-angular mode is selected as the target intra-prediction mode may be further increased. The three embodiments above use different ways to further increase the priority of the non-angular intra-prediction mode in the final MPM list, so it is further beneficial to save bits and improve the compression rate.

In some embodiments, if one reference line (e.g., the reference line $LR_1+TR_1$ in FIG. 8) of the target block is obtained for intra-prediction, the final MPM list determined in 920 may correspond to the one reference line (e.g., TR1+LR1 shown in FIG. 8). In some embodiments, if multiple reference lines (e.g., two or more reference lines of $LR_1+TR_1$, $LR_2+TR_2$, $LR_3+TR_3$, ..., $LR_r+TR_r$ in FIG. 8) of the target block are obtained for intra-prediction, the processing device 112 may determine an MPM list (e.g., the final MPM list determined in 920) for all of the multiple reference lines. Alternatively, the processing device 112 may determine a first final MPM list (e.g., the final MPM list determined in 920) for the reference line 0 (the first reference line), and determine a second final MPM list for the non-first reference lines based on the first final MPM list. The reference line 0 (e.g., $LR_1+TR_1$ in FIG. 8) (i.e., the first reference line) may be a reference line with index=0 closest to the target block. A non-first reference line may be a reference line with index>0.

In some embodiments, the processing device 112 may add, as the elements of the second final MPM list, the angular intra-prediction modes in the first final MPM list corresponding to the first reference line to the second final MPM list according to the order of the angular intra-prediction modes in the first final MPM list. The number (or count) of the elements of the second final MPM list may be equal to the number (or count) of the angular modes of the first final MPM list.

Merely by way of example, there may be 4 angular modes and 2 non-angular modes in the first final MPM list. In solution A, the processing device may set the first 4 elements $MPM_{f2}$ [0]~$MPM_{f2}$ [3] of the second final MPM list as the 4 angular modes of the first final MPM list according to the order of the 4 angular modes in the first final MPM list. In solution A, there are only 4 elements in the second final MPM list.

In some embodiment, the processing device 112 may determine the second final MPM list by performing the supplement operation to replace the non-angular mode in the first final MPM list with an angular mode. The number (or count) of the second final MPM list may be equal to the number (or count) of the first final MPM list.

Merely by way of example, there may be 4 angular modes and 2 non-angular modes in the first final MPM list. In solution B, the processing device 112 may determine the second final MPM list by performing the supplement operation to replace the 2 non-angular modes (e.g., the planar mode and the DC mode) in the first final MPM list with an angular mode. The number (or count) of the second final MPM list may be equal to 6.

In some embodiments, because the difference between the Rdcosts of the planar mode (or the DC mode) of different reference lines is small, there is no need to fill the planar mode and the DC mode into the second final MPM list. In some embodiments, the processing device 112 may determine the second final MPM list corresponding to the non-first reference lines based on the first final MPM list corresponding to the first reference line, which may simplify the process for determining the second final MPM list corresponding to the non-first reference lines.

In some embodiments, if there are multiple reference lines, the process (including two cases of N=2 and N>2) for determining the second final MPM list corresponding to the non-first reference lines except the first reference line may be described as follows.

In order to simplify the description, the first final MPM list and the second final MPM list may include 6 elements. For example, the second final MPM list may include, in order, $MPM_{f2}$ [0], $MPM_{f2}$ [1], $MPM_{f2}$ [2], $MPM_{f2}$ [3], $MPM_{f2}$ [4], and $MPM_{f2}$ [5]. The processing device 112 may obtain N (N≥2) adjacent blocks of the target block. The number (or count) of the intra-prediction modes in the preliminary MPM list may be i (N≥i). Modes 0-66 in FIG. 6 may be applied.

When N=2, if the preliminary MPM list includes only the non-angular intra-prediction mode, the processing device 112 may set the elements of the second final MPM list as $MPM_{f2}$ [0]=vertical mode, $MPM_{f2}$ [1]=horizontal mode, $MPM_{f2}$ [2]=2, $MPM_{f2}$ [3]=34, $MPM_{f2}$ [4]=66, and $MPM_{f2}$ [5]=26 (e.g., as shown in FIG. 6).

If there are one or two modes in the preliminary MPM list, but only one of which is the angular intra-prediction mode m, the processing device 112 may set the elements of the second final MPM list as $MPM_{f2}$ [0]=m, $MPM_{f2}$ [1]=m−1, $MPM_{f2}$ [2]=m+1, $MPM_{f2}$ [3]=m−2, $MPM_{f2}$ [4]=m+2, and $MPM_{f2}$ [5]=m−3.

If there are two different angular modes $m_0$ and $m_1$ in the preliminary MPM list, the processing device 112 may set the first two elements in the second final MPM list as $MPM_{f2}$ [0]=$m_0$ and $MPM_{f2}$ [1]=$m_1$. The processing device 112 may select any four of the eight angular modes of min $\{m_0, m_1\} \pm 1$, max $\{m_0, m_1\} \pm 1$, max $\{m_0, m_1\} \pm 1$, max $\{m_0, m_1\} \pm 2$, and set the remaining 4 elements of the second final MPM list as the four selected angular modes in any order. The four selected angular modes may be different from $m_0$ and $m_1$.

When N>2, the processing device 112 may determine the second final MPM list based on solution A or solution B.

In some embodiments, if there are multiple reference lines, the processing device 112 may determine the first final MPM list corresponding to the first reference line based on, for example, any one of the first solution, the second solution, the third solution, the fourth solution, and the fifth solution above, and determine the second final MPM list corresponding to the non-first reference lines based on the first final MPM list and any one of solution A and solution B above.

Merely by way of example, the processing device 112 may search 5 adjacent blocks (e.g., L, A, AL, BL, and AR in FIG. 10A) of the target block and obtain the intra-prediction mode used in each adjacent block. The searching order may include but is not limited to the following orders:
(I) L>A>BL>AL>AR,
(II) L>A>AL>BL>AR,
(III) A>L>BL>AL>AR,
(IV) A>L>AL>BL>AR, and
(V) A>L>AR>BL>AL.

The processing device 112 may select one of above 5 searching orders to search the 5 adjacent blocks. After searching, the processing device 112 may obtain the preliminary MPM list (e.g., $\{m_0, m_1, \ldots, m_{i-1}\}$, i≤5) of the target block by ranking the intra-predication modes of the adjacent blocks according to the searching order, and combining the same modes.

The processing device 112 may determine, based on the preliminary MPM list, the final MPM list of the target block (i.e., the first final MPM list and/or the second final MPM list).

(1) For reference line 0, there may be 6 elements in the final MPM list, such as, in order, $MPM_f$ [0], $MPM_f$ [1], $MPM_f$ [2], $MPM_f$ [3], $MPM_f$ [4], and $MPM_f$ [5].
  a. If there is at least one non-angular mode in the preliminary MPM list, the processing device 112 may determine that $MPM_f$ [0]=Planar and $MPM_f$ [1]=DC.
    i. If all modes in the preliminary MPM list are the non-angular mode (e.g., the modes of all adjacent blocks are not the angular mode), the processing device 112 may determine that $MPM_f$ [2]=vertical mode, $MPM_f$ [3]=horizontal mode, $MPM_f$ [4]=vertical mode-4, and $MPM_f$ [5]=horizontal mode-4.
    ii. If there is only one angular mode m (m is greater than 1) in the preliminary MPM list, the processing device 112 may determine that $MPM_f$ [2]=m, $MPM_f$ [3]=m−1, $MPM_f$ [4]=m+1, and $MPM_f$ [5]=m−2.
    iii. If there are only two angular modes $m_0$ and $m_1$ in the preliminary MPM list, and the searching order is modes $m_0$ and $m_1$ in order, the processing device 112 may determine that $MPM_f$ [2]=$m_0$ and $MPM_f$ [3]=$m_1$. If 1<|$m_0$−$m_1$|<63, $MPM_f$ [4]=max $\{m_0, m_1\}$−1, and $MPM_f$ [5]=max $\{m_0, m_1\}$+1; otherwise $MPM_f$ [4]=max $\{m_0, m_1\}$−2, and $MPM_f$ [5]=max $\{m_0, m_1\}$+2.
    iv. If there are only three angular modes $m_0$, $m_1$, and $m_2$ in the preliminary MPM list, and the searching order is modes $m_0$, $m_1$, and $m_2$ in order, $MPM_f$ [2]=$m_0$, $MPM_f[3]=m_1$, and $MPM_f[4]=m_2$. If max $\{m_0, m_1, m_2\}$-middle $\{m_0, m_1, m_2\}>1$, $MPM_f[5]=$max $\{m_0, m_1, m_2\}-1$. If max $\{m_0, m_1, m_2\}$-middle $\{m_0, m_1, m_2\}=1$, and max $\{m_0, m_1, m_2\}+1\neq$Min $\{m_0, m_1, m_2\}$, $MPM_f[5]=$max $\{m_0, m_1, m_2\}+1$. In other cases, $MPM_f[5]=$max $\{m_0, m_1, m_2\}-2$.

v. If there are only four angular modes $m_0, m_1, m_2$, and $m_3$ in the preliminary MPM list, and the searching order is modes $m_0, m_1, m_2$, and $m_3$ in order, $MPM_f[2]=m_0$, $MPM_f[3]=m_1$, $MPM_f[4]=m_2$, $MPM_f[5]=m_3$.

b. There is no non-angular mode in the preliminary MPM list, that is, all of the intra-prediction modes of the adjacent blocks are the angular modes with indexes greater than 1.

i. If there is only one angular mode m in the preliminary MPM list (e.g., the intra-prediction modes of all adjacent blocks are the same), $MPM_f[0]=m$, $MPM_f[1]=$Planar, $MPM_f[2]=$DC, $MPM_f[3]=m-1$, $MPM_f[4]=m+1$, and $MPM_f[5]=m-2$.

ii. If there are only 2 angular modes of which the order is $m_0$ and $m_1$ in the preliminary MPM list, $MPM_f[0]=m_0$, $MPM_f[1]=m_1$, $MPM_f[2]=$Planar, and $MPM_f[3]=$DC. If $1<|m_0-m_1|<63$, $MPM_f[4]=$max $\{m_0, m_1\}-1$, and $MPM_f[5]=$max $\{m_0, m_1\}+1$; otherwise $MPM_f[4]=$max $\{m_0, m_1\}-2$, and $MPM_f[5]=$max $\{m_0, m_1\}+2$.

iii. If there are only 3 angular modes of which the order is $m_0$, $m_1$, and $m_2$ in the preliminary MPM list, $MPM_f[0]=m_0$, $MPM_f[1]=m_1$, $MPM_f[2]=m_2$, $MPM_f[3]=$Planar, and $MPM_f[4]=$DC. If max $\{m_0, m_1, m_2\}$-middle $\{m_0, m_1, m_2\}>1$, $MPM_f[5]=$max $\{m_0, m_1, m_2\}-1$. If max $\{m_0, m_1, m_2\}$-middle $\{m_0, m_1, m_2\}=1$, and max $\{m_0, m_1, m_2\}+1\neq$min $\{m_0, m_1, m_2\}$, $MPM_f[5]=$max $\{m_0, m_1, m_2\}+1$. In other cases, $MPM_f[5]=$max $\{m_0, m_1, m_2\}-2$. As used herein, middle $\{m_0, m_1, m_2\}$ refers to one of $m_0, m_1$, and $m_2$ with the second-largest index among $m_0, m_1$, and $m_2$.

iv. If there are only 4 angular modes of which the order is $m_0, m_1, m_2$, and $m_3$ in the preliminary MPM list, $MPM_f[0]=m_0$, $MPM_f[1]=m_1$, $MPM_f[2]=m_2$, $MPM_f[3]=m_3$, $MPM_f[4]=$Planar, and $MPM_f[5]=$DC.

v. If there are 5 angular modes in the preliminary MPM list, which are $m_0, m_1, m_2, m_3$, and $m_4$ in order, the processing device 112 may determine the final MPM list based on a process same as operation iv of b.

(2) There may be 4 elements (e.g., $MPM_{f2}[0]$-$MPM_{f2}[3]$) in the second final MPM list corresponding to the non-first reference lines of which the indexes are larger than 0. The processing device 112 may set $MPM_{f2}[0]$-$MPM_{f2}[3]$ as the 4 angular modes of the final MPM list based on the order of the 4 angular modes in the final MPM list.

Example 1

The processing device 112 may select two (N=2) adjacent blocks (e.g., L and A in FIG. 10O). The searching order may be L>A. The processing device 112 may determine the first final MPM list based on the first solution, and determine the second final MPM list based on solution A. If the mode of block L (referred to as mode L for brevity) is the planar mode and the mode of block A (referred to as mode A for brevity) is the angular mode 2 (e.g., as shown in FIG. 6), the processing device 112 may determine the final MPM list as $MPM_f[0]=$Planar, $MPM_f[1]=$DC, $MPM_f[2]=2$, $MPM_f[3]=65$, $MPM_f[4]=3$, and $MPM_f[5]=64$. The processing device 112 may determine the second final MPM list as $MPM_{f2}[0]=2$, $MPM_{f2}[1]=65$, $MPM_{f2}[2]=3$, $MPM[3]_{12}=64$.

Example 2

The processing device 112 may select 5 (N=5) adjacent blocks (e.g., L, A, BL, AL, and AR in FIG. 10A). The searching order may be the order (I) above, i.e., L>A>BL>AL>AR. The processing device 112 may determine the final MPM list based on the first solution, and determine the second final MPM list based on solution A. The mode of block L may be mode 2, the mode of block A may be mode 2, the mode of block BL may be 65, the mode of block AL may be mode 66, and the mode of block AR may be mode 66. The processing device 112 may determine the final MPM list as $MPM_f[0]=2$, $MPM_f[1]=65$, $MPM_f[2]=66$, $MPM_f[3]=$Planar, $MPM_f[4]=$DC, and $MPM_f[5]=64$. The processing device 112 may determine the second final MPM list as $MPM_{f2}[0]=2$, $MPM_{f2}[1]=65$, $MPM_{f2}[2]=66$, and $MPM_{f2}[3]=64$.

Example 3

The processing device 112 may select two (N=2) adjacent blocks (e.g., L and A in FIG. 10O). The searching order may be L>A. The processing device 112 may determine the final MPM list based on the second solution, and determine the second final MPM list based on solution A. The mode of block L may be mode 2, and the mode of block A may be the DC mode. The processing device 112 may determine the final MPM list as $MPM_f[0]=$DC, $MPM_f[1]=2$, $MPM_f[2]=$Planar, $MPM_f[3]=65$, $MPM_f[4]=3$, and $MPM_f[5]=64$. The processing device 112 may determine the second final MPM list as $MPM_{f2}[0]=2$, $MPM_{f2}[1]=65$, $MPM_{f2}[2]=3$, and $MPM_{f2}[3]=64$.

Example 4

The processing device 112 may select 5 (N=5) adjacent blocks (e.g., L, A, BL, AL, and AR in FIG. 10A). The searching order may be the order I above, i.e., L>A>BL>AL>AR. The processing device 112 may determine the final MPM list based on the fourth solution, and determine the second final MPM list based on solution A. If the mode of block L is mode 2, the mode of block A is mode 2, the mode of block BL is DC, the mode of block AL is mode 66, and the mode of block AR is mode 34, the processing device 112 may determine the final MPM list as $MPM_f[0]=$DC, $MPM_f[1]=2$, $MPM_f[2]=66$, $MPM_f[3]=34$, $MPM_f[4]=$Planar, and $MPM_f[5]=65$, and determine the second final MPM list as $MPM_{f2}[0]=2$, $MPM_{f2}[1]=66$, $MPM_{f2}[2]=34$, and $MPM_{f2}[3]=65$. If the mode of block L is mode 2, the mode of block A is mode 2, the mode of block BL is the planar mode, the mode of block AL is mode 18, and the mode of block AR is mode 50, the processing device 112 may determine the final MPM list as $MPM_f[0]=$Planar, $MPM_f[1]=2$, $MPM_f[2]=18$, $MPM_f[3]=50$, $MPM_f[4]=$DC, and $MPM_f[5]=65$, and determine the second final MPM list as $MPM_{f2}[0]=2$, $MPM_{f2}[1]=18$, $MPM_{f2}[2]=50$, and $MPM_{f2}[3]=65$.

In some embodiments, the construction of the final MPM list may try to ensure that the target intra-prediction mode of the target block falls into the final MPM list and is the same as the top-ranked element in the final MPM list as much as possible. In some embodiments, the correlation between each adjacent block and the target block may be fully utilized, because the intra-prediction modes in the preliminary MPM list of the target block is ranked according to the descending order of the correlation between each adjacent block and the target block, that is, the correlation between each intra-prediction mode in the preliminary MPM list and the target intra-prediction mode of the target block is ranked from large to small. When the target intra-prediction mode falls in the final MPM list, for the final MPM list that is obtained based on the preliminary MPM list, the probability that the element ranked in top of the final MPM list is selected as the target intra-prediction mode, thus further reducing the code word length of the target intra-prediction mode of the target block and reducing the bit overhead.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 11 is a flowchart illustrating an exemplary process for determining a preliminary MPM list of a target block according to some embodiments of the present disclosure. In some embodiments, the process 1100 may be implemented as a set of instructions (e.g., an application) stored in the storage ROM 230 or RAM 240. The processor 220, and/or the modules and/or the units in FIG. 4 may execute the set of instructions, and when executing the instructions, the processor 220, and/or the modules and/or the units may be configured to perform the process 1100. The operations of the illustrated process presented below are intended to be illustrative. In some embodiments, the process 1100 may be accomplished with one or more additional operations not described and/or without one or more of the operations herein discussed. Additionally, the order in which the operations of the process as illustrated in FIG. 11 and described below is not intended to be limiting. In some embodiments, the processing device 112 may perform operation 910 of the process 900 in FIG. 9 based on the process 1100.

In 1110, the processing device 112 may obtain intra-prediction modes of the two or more adjacent blocks of the target block by searching the two or more adjacent blocks according to a searching order. In some embodiments, the searching order of the two or more adjacent blocks may be a descending order of the correlation between each of the two or more adjacent blocks and the target block.

In some embodiments, the processing device 112 may select N adjacent blocks (N≥2) of the target block. For example, the processing device 112 may select at least two of blocks L, A, AL, BL, and AR shown in FIG. 10A as the adjacent blocks of the target block. The processing device 112 may select any one of orders (I)-(V) described in FIG. 9 as the searching order of the two or more adjacent blocks. The intra-prediction mode of each adjacent block may be recorded after searching.

In 1120, the processing device 112 may obtain the preliminary MPM list of the target block by ranking the intra-prediction modes of the two or more adjacent blocks and combining the same intra-prediction modes of the intra-prediction modes of the two or more adjacent blocks.

In some embodiments, the processing device 112 may rank the intra-prediction modes of the two or more adjacent blocks according to the searching order. The processing device 112 may combine the same intra-prediction modes of the intra-prediction modes of the two or more adjacent blocks by retaining one of the same intra-prediction modes and removing the other of the same intra-prediction modes to determine the preliminary MPM list $\{m_0, m_1, \ldots, m_{i-1}\}$, i≤N. For example, the processing device 112 may retain one of the same intra-prediction modes that ranks in top of the same intra-prediction modes and remove the other of the same intra-prediction modes.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 12:
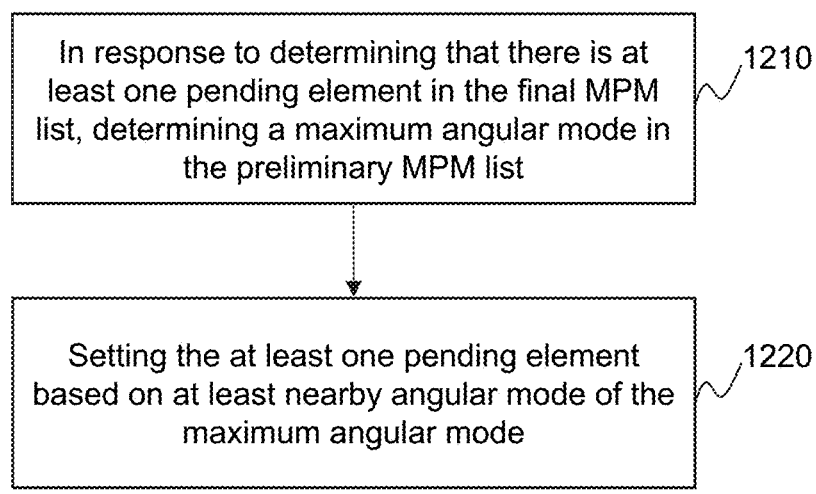
FIG. 12 is a flowchart illustrating an exemplary process for a supplement operation according to some embodiments of the present disclosure.

FIG. 12 is a flowchart illustrating an exemplary process for a supplement operation according to some embodiments of the present disclosure. In some embodiments, the process 1200 may be implemented as a set of instructions (e.g., an application) stored in the storage ROM 230 or RAM 240. The processor 220, and/or the modules and/or the units in FIG. 4 may execute the set of instructions, and when executing the instructions, the processor 220, and/or the modules and/or the units may be configured to perform the process 1200. The operations of the illustrated process presented below are intended to be illustrative. In some embodiments, the process 1200 may be accomplished with one or more additional operations not described and/or without one or more of the operations herein discussed. Additionally, the order in which the operations of the process as illustrated in FIG. 12 and described below is not intended to be limiting.

In 1210, in response to determining that there is at least one pending element in the final MPM list, the processing device 112 may determine a maximum angular mode in the preliminary MPM list.

The maximum angular mode in the preliminary MPM list may refer to an angular mode with the largest index in the preliminary MPM list. In some embodiments, compared with the angular modes with relatively small indexes, the angular modes with relatively large indexes may have a higher probability of being selected as the target intra-prediction mode.

In 1220, the processing device 112 may set the at least one pending element based on at least one nearby angular mode of the maximum angular mode. A nearby angular mode of a specific angular mode (e.g., the maximum angular mode) may refer to an angular mode with an index that is close to or in a range (e.g., 1, 2, 3, 4, etc.) of an index of the specific angular mode (e.g., the maximum angular mode). For example, the nearby angular mode of an angular mode m may include, but is not limited to, angular modes m±1, angular modes m±2, and angular modes m±3. In some embodiments, taking modes 0-66 in FIG. 6 as an example, mode 66±1 may be mode 3 and mode 65, respectively, mode 2±1 may be 3 and 65, respectively, and mode 65±1 may be 2 and 64, respectively.

For example, the processing device 112 may select the maximum angular mode $m_{max}$ from the n angular intra-prediction modes in the preliminary MPM list. The processing device 112 may determine whether the angular modes $m_{max}-1$ and/or $m_{max}+1$ is consistent with the determined elements in the final MPM list. The processing device 112 may add the angular mode $m_{max}-1$ and/or $m_{max}+1$ that is not consistent with the determined elements into the final MPM list. If there is still at least one pending element in the final MPM list after the angular modes $m_{max}-1$ and/or $m_{max}+1$ is added in the final MPM list, the processing device 112 may determine whether the angular mode $m_{max}-2$ and/or $m_{max}+2$ is consistent with the determined elements in the final MPM list. The processing device 112 may add the angular mode $m_{max}-2$ and/or $m_{max}+2$ that is not consistent with the determined elements into the final MPM list. If there is still at least one pending element in the final MPM list after the angular mode $m_{max}-2$ and/or $m_{max}+2$ is added in the final MPM list, the processing device 112 may determine whether the angular mode $m_{max}-3$ and/or $m_{max}+3$ is consistent with the determined elements in the final MPM list, and add the angular mode $m_{max}-3$ and/or $m_{max}+3$ that is not consistent with the determined elements into the final MPM list. In some embodiments, with respect to adding priority in the final MPM list, $m_{max}\pm 1$ may be higher than $m_{max}\pm 2$, and $m_{max}\pm 2$ may be higher than $m_{max}\pm 3$. The adding priority of $m_{max}-1$ and $m_{max}+1$ may be the same, the adding priority of $m_{max}-2$ and $m_{max}+2$ may be the same, and the adding priority of $m_{max}-3$ and $m_{max}+3$ may be the same.

For example, if there is one pending element in the final MPM list, the processing device 112 may select the maximum angular mode $m_{max}$ from the n angular intra-prediction modes in the preliminary MPM list. The processing device 112 may determine whether the angular mode $m_{max}-1$ and/or $m_{max}+1$ is consistent with the determined elements in the final MPM list. if there is only one of the angular modes $m_{max}-1$ and $m_{max}+1$ that is not consistent with the determined elements, the processing device 112 may set the pending element of the final MPM list as the angular mode $m_{max}-1$ or $m_{max}+1$ that is not consistent with the determined elements. If both of the angular modes $m_{max}-1$ and $m_{max}+1$ are not consistent with the determined elements in the final MPM list, the processing device 112 may set the pending element of the final MPM list as any one of the angular modes $m_{max}-1$ and $m_{max}+1$. If both of the angular modes $m_{max}-1$ and $m_{max}+1$ are consistent with the determined elements in the final MPM list, the processing device 112 may determine whether the angular modes $m_{max}-2$ or $m_{max}+2$ is consistent with the determined elements in the final MPM list, and so on.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 13:
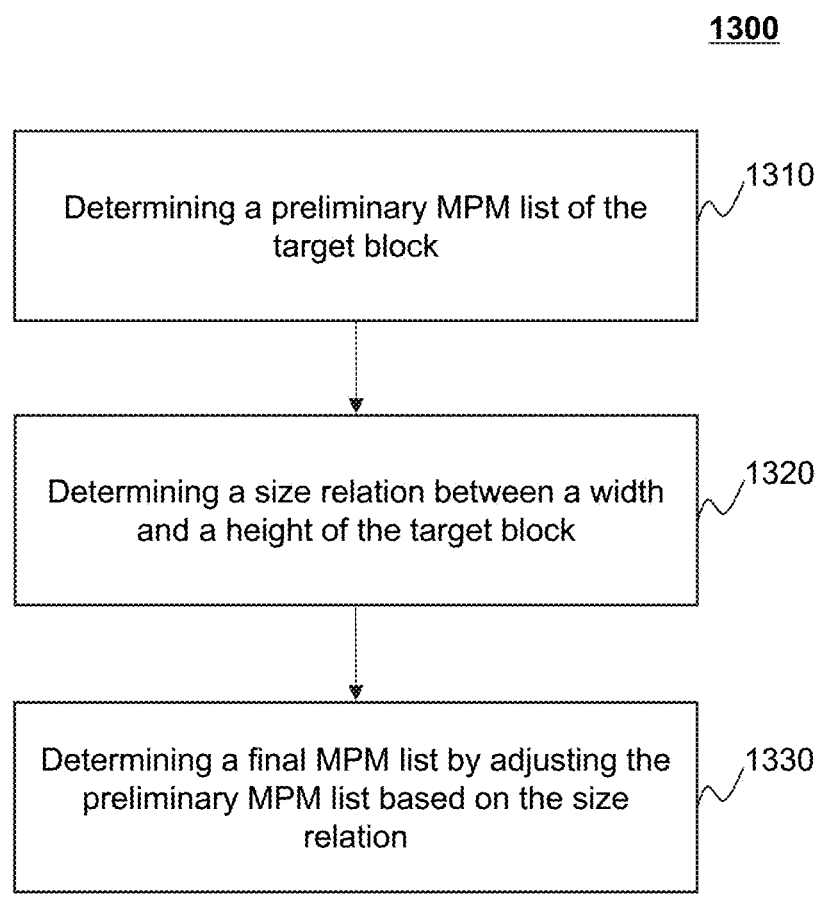
FIG. 13 is a flowchart illustrating an exemplary process for determining a final MPM list according to some embodiments of the present disclosure.

FIG. 13 is a flowchart illustrating an exemplary process for determining a final MPM list of a target block according to some embodiments of the present disclosure. In some embodiments, the process 1300 may be implemented as a set of instructions (e.g., an application) stored in the storage ROM 230 or RAM 240. The processor 220, and/or the modules and/or the units in FIG. 4 may execute the set of instructions, and when executing the instructions, the processor 220, and/or the modules and/or the units may be configured to perform the process 1300. The operations of the illustrated process presented below are intended to be illustrative. In some embodiments, the process 1300 may be accomplished with one or more additional operations not described and/or without one or more of the operations herein discussed. Additionally, the order in which the operations of the process as illustrated in FIG. 13 and described below is not intended to be limiting. In some embodiments, the processing device 112 may perform operations 513 and 515 of the process 500 in FIG. 5 based on the process 1300.

In 1310, the processing device 112 may determine a preliminary MPM list of the target block.

In some embodiments, as illustrated in operation 511 of the process 500 in FIG. 5A, the target block may be the coding unit or the sub-unit that is to be encoded.

In some embodiments, intra sub-partition (ISP) may be used to divide a coding unit into a plurality of sub-units. In some embodiments, the sizes of the plurality of sub-units may be the same or different.

In some embodiments, intra-prediction related to ISP may include ISP, reference pixel construction, filtering of reference pixels in the ISP mode, construction of one or more MPM lists in the ISP mode, and a process for selecting a prediction mode.

In some embodiments, the ISP may include vertical partition and horizontal partition. In the vertical partition, the coding unit may be divided into a plurality of sub-units along a vertical direction of the coding unit. The lengths of sides of the plurality of sub-units along a horizontal direction of the coding unit may be equal to the length of a side of the coding unit along the horizontal direction. The lengths of sides of the plurality of sub-units along the vertical direction may be the same or different, a sum of which may be equal to the length of a side of the coding unit along the vertical direction. In the horizontal partition, the coding unit may be divided into a plurality of sub-units along the horizontal direction of the coding unit. The lengths of sides of the plurality of sub-units along the vertical direction may be equal to the length of the side of the coding unit along the vertical direction. The lengths of sides of the plurality of sub-units along the horizontal direction may be the same or different, a sum of which may be equal to the length of the side of the coding unit along the horizontal direction.

Figure 14:
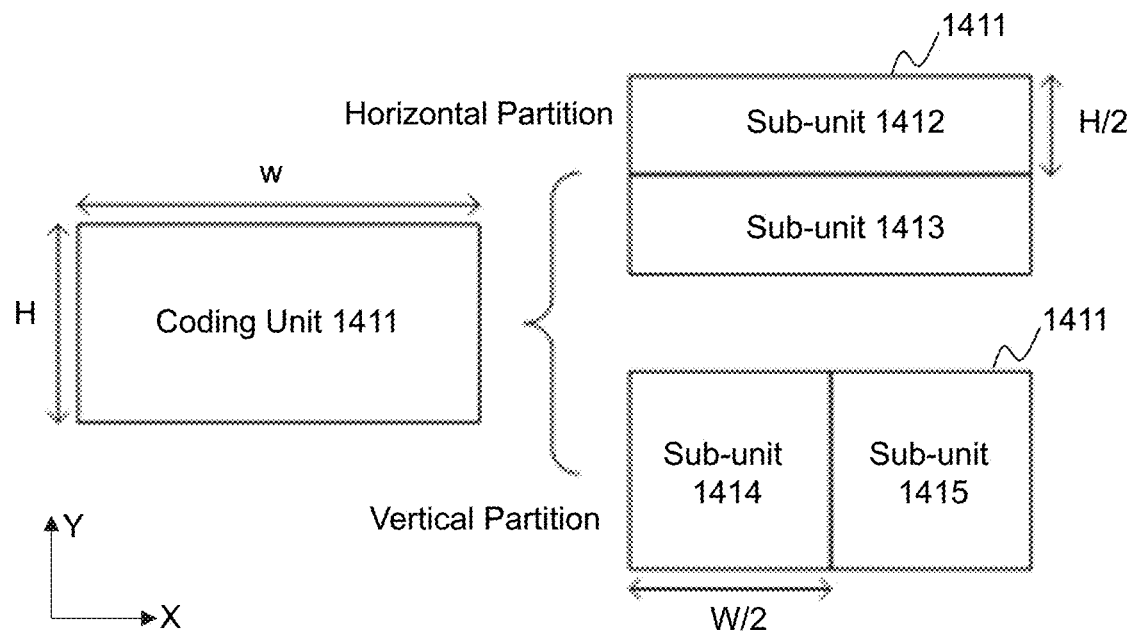
FIGS. 14 and 15 are schematic diagrams illustrating exemplary intra sub-partition (ISP) according to some embodiments of the present disclosure.

For example, FIG. 14 is a schematic diagram of an exemplary partition manner of ISP according to some embodiments of the present disclosure. As shown in FIG. 14, the length of a side of a coding unit 1411 along the horizontal direction (e.g., the X direction in FIG. 14) may be referred to as the width (represented as W in FIG. 14) of the coding unit 1411. The length of a side of the coding unit 1411 along the vertical direction (e.g., the Y direction in FIG. 14) may be referred to as the height (represented as H in FIG. 14) of the coding unit 1411. As shown in FIG. 14, in horizontal partition, the coding unit 1411 was divided into two sub-units (e.g., a sub-unit 1412 and a sub-unit 1413) with the same size. The height of each of the two sub-units is equal to half of the height of the coding unit 1411. The width of the sub-unit is equal to the width of the coding unit 1411. In vertical partition, the coding unit 1411 was divided into two sub-units (e.g., a sub-unit 1414 and a sub-unit 1415) with the same size. The width of each of the two sub-units is equal to half of the width of the coding unit 1411. The height of the sub-unit is equal to the height of the coding unit 1411.

Figure 15:
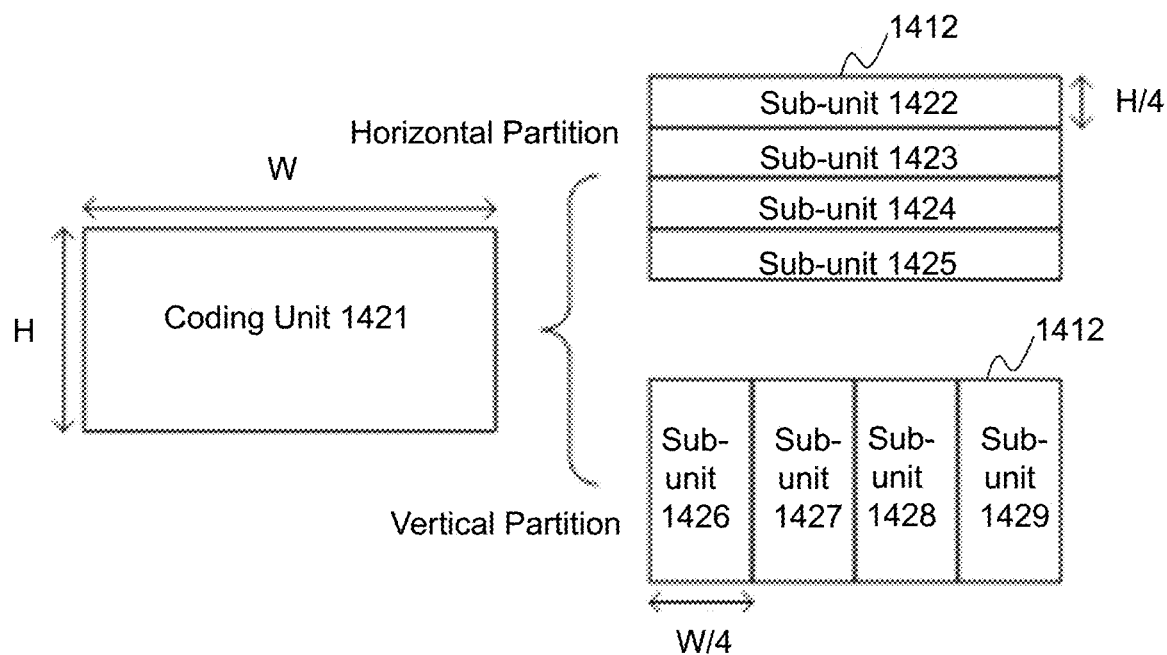

As another example, FIG. 15 is a schematic diagram of an exemplary partition manner of ISP according to some embodiments of the present disclosure. As shown in FIG. 15, the length of a side of a coding unit 1421 along the horizontal direction (e.g., the X direction in FIG. 14) may be referred to as the width (represented as W in FIG. 15) of the coding unit 1421. The length of a side of the coding unit 1421 along the vertical direction (e.g., the Y direction in FIG. 14) may be referred to as the height (represented as H in FIG. 15) of the coding unit 1421. As shown in FIG. 15, in horizontal partition, the coding unit 1421 was divided into four sub-units (e.g., a sub-unit 1422, a sub-unit 1423, a sub-unit 1424, and a sub-unit 1425) with the same size. The height of each of the four sub-units is equal to ¼ of the height of the coding unit 1421. The width of each of the four sub-units is equal to the width of the coding unit 1421. In vertical partition, the coding unit 1421 was divided into four sub-units (e.g., a sub-unit 1426, a sub-unit 1427, a sub-unit 1428, and a sub-unit 1429) with the same size. The width of each of the four sub-units is equal to ¼ of the width of the coding unit 1421. The height of each of the four sub-units is equal to the height of the coding unit 1421.

In some embodiments, the coding unit larger than 4×4 (the number (or count) of pixels) may be divided into a plurality of sub-units. In some embodiments, for the coding unit larger than 4×4, the coding unit of 4×8 or 8×4 may be divided into 2 sub-units with the same size, and the coding unit with other sizes may be divided into 4 sub-units with the same size.

In some embodiments, the processing device 112 may determine the preliminary MPM list based on intra-prediction modes of two or more adjacent blocks of the target block.

In some embodiments, the target block may be non-square (e.g., rectangular). The reference pixels adjacent to the longer side of the non-square target block may be more relevant than the reference pixels adjacent to the shorter side of the non-square target block. In this case, in addition to ordinary angular modes (e.g., angular modes 2-66 in FIG. 6 and FIG. 7), some wide-angular modes may be added to determine an MPM list of the target block, so that the reference pixels of the target block may be as close as possible to the longer side of the target block. For example, as shown in FIG. 7, angular modes 2-66 may be the ordinary angle modes, and the angular modes −13-1 and 67-81 may be the wide-angular modes, which represent different prediction directions. Modes 18 and 50 may represent the horizontal mode and the vertical mode, respectively. Among the angular modes −13-81 shown in FIG. 7, the angular modes greater than or equal to the angular mode 34 may be classified as intra-prediction modes in the vertical direction, and the angular modes less than 34 may be classified as intra-prediction modes in the horizontal direction.

In some embodiments, the processing device 112 may determine the preliminary MPM list based on the intra-prediction modes of adjacent blocks A and L (e.g., as shown in FIG. 10O). For multiple reference lines, the processing device 112 may determine a preliminary MPM list for the first reference line (index=0), and determine a preliminary MPM list for the non-first reference lines (index>0). Alternatively, the processing device 112 may determine a preliminary MPM list for the multiple reference lines (index≥0).

In the following tables (e.g., tables 1-9), A and L represent the intra-prediction mode of the corresponding adjacent block (e.g., block A or L shown in FIGS. 10A-10B), V represents the vertical mode (i.e., mode 18), and H represents the horizontal mode (i.e., mode 50). Signs +/− indicates adding a certain value to or subtracting a certain value from an index of an intra-prediction mode. In particular, mode 66±1 may represent mode 3 and mode 65, respectively, and mode 2±1 may represent mode 65 and mode 3, respectively.

In some embodiments, the processing device 112 may determine the preliminary MPM list for multiple reference lines in a non-ISP mode based on operations as follows.

(1) The processing device 112 may determine a first preliminary MPM list for the first reference line (index=0) based on the intra-prediction modes (referred to as mode A and mode L for brevity) of adjacent blocks A and L. For example, the first preliminary MPM list may include 6 elements as shown in Table 1.

TABLE 1

| | Condition | MPM[0] | MPM[1] | MPM[2] | MPM[3] | MPM[4] | MPM[5] |
|---|---|---|---|---|---|---|---|
| L=A | L=Planar | L | DC | V | H | V−4 | V+4 |
| | L=DC | L | Planar | V | H | V−4 | V+4 |
| | L>DC | L | Planar | DC | L−1 | L+1 | L−2 |
| L≠A | L+A=DC | L | A | V | H | V−4 | V+4 |
| | L>1&A>1& (L adjacent to A) | L | A | Planar | DC | Max{L, A}−2 | Max{L, A}+2 |
| | L>1&A>1& (L not adjacent to A) | L | A | Planar | DC | Max{L, A}−1 | Max{L, A}+1 |
| | Min{L, A}=Planar&L+A≥2 | L | A | DC | Max{L, A}−1 | Max{L, A}+1 | Max{L, A}−2 |
| | Min{L, A}=DC&L+A≥2 | L | A | Planar | Max{L, A}−1 | Max{L, A}+1 | Max{L, A}−2 |

(2) The processing device 112 may determine a second preliminary MPM list for the non-first reference lines (index>0) based on modes A and L, and one or more angular modes. For example, the second preliminary MPM list may include 6 elements as shown in Table 2.

TABLE 2

| | Condition | MPM[0] | MPM[1] | MPM[2] | MPM[3] | MPM[4] | MPM[5] |
|---|---|---|---|---|---|---|---|
| | L<2&A<2 | V | H | 2 | 34 | 66 | 26 |
| L=A | L≥2 | L | L−1 | L+1 | L−2 | L+2 | L−3 |
| L≠A | |L−A|=1&Min{L,A}≥2 | L | A | Min{L,A}−1 | Max{L,A}+1 | Min{L,A}−2 | Max{L,A}+2 |
| | |L−A|=2&Min{L,A}≥2 | L | A | Min{L,A}+1 | Min{L,A}−1 | Max{L,A}+1 | Min{L,A}−2 |
| | |L−A|≥62&Min{L,A}≥2 | L | A | Min{L,A}+1 | Max{L,A}−1 | Min{L,A}+2 | Max{L,A}−2 |

TABLE 2-continued

| Condition | MPM[0] | MPM[1] | MPM[2] | MPM[3] | MPM[4] | MPM[5] |
|---|---|---|---|---|---|---|
| 2<|L−A|<62&Min{L,A}≥2 | L | A | Min{L,A}−1 | Min{L,A}+1 | Max{L,A}−1 | Max{L,A}+1 |
| L+≥2&Min{L,A}<2 | Max{L,A} | Max{L,A}−1 | Max{L,A}+1 | Max{L,A}−2 | Max{L,A}+2 | Max{L,A}−3 |

In some embodiments, in the non-ISP mode, the processing device 112 may determine the preliminary MPM list for the first reference line and/or the preliminary MPM list for the non-first reference lines based on the process 900 in FIG. 9.

If the first reference line is used in the ISP mode, the processing device 112 may determine a preliminary MPM list corresponding to the reference line 0. In the ISP mode, the partition of the coding unit may include the horizontal partition and the vertical partition. Therefore, the two partition ways may correspond to two preliminary MPM lists, respectively.

In some embodiments, the processing device 112 may determine a preliminary MPM list including 6 elements based on modes L and A, and the partition way of the target block. There may be no DC mode in the preliminary MPM list. In the following tables, in a certain partition way, $M_0$ indicates the mode of block A or L that is closer to the certain partition way, and $M_1$ indicates the mode of block A or L that is farther from the certain partition way. For example, in the horizontal partition, $M_0$ represents mode A or L that is closer to the horizontal mode, and $M_1$ represents mode A or L that is farther from the horizontal mode.

For example, in the horizontal partition, the preliminary MPM list corresponding to the horizontal partition is shown in Table 3.

TABLE 3

| | Condition | MPM[0] | MPM[1] | MPM[2] | MPM[3] | MPM[4] | MPM[5] |
|---|---|---|---|---|---|---|---|
| | L<2&A<2 | Planar | H | 25 | 10 | 65 | V |
| L=A | L≥2&L<34 | L | L−1 | L+1 | L−2 | L+2 | L−3 |
| | L≥34 | L | L−1 | L+1 | H | 5 | Planar |
| L≠A | |L−A|=1&Min{L,A}≥2 | $M_0$ | $M_1$ | Min{L,A}−1 | Max{L,A}+1 | Min{L,A}−02 | Max{L,A}+2 |
| | |L−A|=2&Min{L,A}≥2 | $M_0$ | $M_1$ | Min{L,A}+1 | Min{L,A}−1 | Max{L,A}+1 | Min{L,A}−2 |
| | |L−A|≥62&Min{L,A}≥2 | $M_0$ | $M_1$ | Min{L,A}+1 | Max{L,A}−1 | Min{L,A}+2 | Max{L,A}−2 |
| | 2<|L−A|<62&Min{L,A}≥2 | $M_0$ | $M_1$ | Min{L,A}−1 | Min{L,A}+1 | Max{L,A}−1 | Max{L,A}+1 |
| | L+A≥2&Min{L,A}<2 | Planar | Max{L,A} | Max{L,A}−1 | Max{L,A}+1 | Max{L,A}−2 | Max{L,A}+2 |

As another example, in the vertical partition, the preliminary MPM list corresponding to the vertical partition is shown in Table 4.

TABLE 4

| | Condition | MPM[0] | MPM[1] | MPM[2] | MPM[3] | MPM[4] | MPM[5] |
|---|---|---|---|---|---|---|---|
| | L<2&A<2 | Planar | V | 43 | 60 | 3 | H |
| L=A | L≥34 | L | L−1 | L+1 | L−2 | L+2 | L−3 |
| | L≥2&L<34 | L | L−1 | L+1 | V | 63 | Planar |
| L≠A | |L−A|=1&Min{L,A}≥2 | $M_0$ | $M_1$ | Min{L,A}−1 | Max{L,A}+1 | Min{L,A}−2 | Max{L,A}+2 |
| | |L−A|=2&Min{L,A}≥2 | $M_0$ | $M_1$ | Min{L,A}+1 | Min{L,A}−1 | Max{L,A}+1 | Min{L,A}−2 |
| | |L−A|≥62&Min{L,A}≥2 | $M_0$ | $M_1$ | Min{L,A}+1 | Max{L,A}−1 | Min{L,A}+2 | Max{L,A}−2 |
| | 2<|L−A|<62&Min{L,A}≥2 | $M_0$ | $M_1$ | Min{L,A}−1 | Min{L,A}+1 | Max{L,A}−1 | Max{L,A}+1 |
| | L+A≥2&Min{L,A}<2 | Planar | Max{L,A} | Max{L,A}−1 | Max{L,A}+1 | Max{L,A}−2 | Max{L,A}+2 |

In 1320, the processing device 112 may determine a size relation between a width and a height of the target block.

In some embodiments, similar to FIG. 14, the width of the target block may refer to the length of a first side of the target block along the horizontal direction (e.g., the X direction in FIG. 14), and the height of the target block may refer to the length of a second side of the target block along the vertical direction (e.g., the Y direction in FIG. 14).

In some embodiments, the size relation may include a relation that the width is equal to the height (that is, the target block is a square), a relation that the width is greater than the height, and a relation that the height is greater than the width.

In 1330, the processing device 112 may determine a final MPM list by adjusting the preliminary MPM list based on the size relation.

In some embodiments, the processing device 112 may re-rank the intra-prediction modes of the preliminary MPM list according to the size relation.

In some embodiments, when the width is greater than the height, the processing device 112 may adjust the preliminary MPM list by switching the positions of the vertical mode and the horizontal mode to make the vertical mode ranked in front of the horizontal mode. When the height is greater than the width, the processing device 112 may adjust the preliminary MPM list by switching the positions of the vertical mode and the horizontal mode to make the vertical mode ranked behind the horizontal mode.

For example, in the non-ISP mode, the processing device 112 may determine the final MPM list corresponding to the first reference line (index=0) by adjusting the preliminary MPM list corresponding to the first reference line based on the following operation.

When the width of the target block is larger than or equal to the height of the target block, the processing device 112 may determine the preliminary MPM list as the final MPM list (e.g., Table 1).

When the width of the target block is less than the height of the target block, the processing device 112 may determine the final MPM list by switching the positions of the vertical mode and the horizontal mode in the preliminary MPM list to make the horizontal mode ranked in front of the vertical mode. For example, the final MPM list is shown in Table 5.

TABLE 5

| | Condition | MPM[0] | MPM[1] | MPM[2] | MPM[3] | MPM[4] | MPM[5] |
|---|---|---|---|---|---|---|---|
| L=A | L=Planar | L | DC | H | V | V−4 | V+4 |
| | L=DC | L | Planar | H | V | V−4 | V+4 |
| | L>DC | L | Planar | DC | L−1 | L+1 | L−2 |
| L≠A | L+A=DC | L | A | H | V | V−4 | V+4 |
| | L>1&A>1& (L adjacent to A) | L | A | Planar | DC | Max{L,A}−2 | Max{L,A}+2 |
| | L>1&A>1& (L not adjacent to A) | L | A | Planar | DC | Max{L,A}−1 | Max{L,A}+1 |
| | Min{L,A}=Planar&L+A≥2 | L | A | DC | Max{L,A}−1 | Max{L,A}+1 | Max{L,A}−2 |
| | Min{L,A}=DC&L+A≥2 | L | A | Planar | Max{L,A}−1 | Max{L,A}+1 | Max{L,A}−2 |

In some embodiments, when the width is greater than the height, the processing device 112 may adjust the preliminary MPM list by switching the positions of mode A and mode L to make mode A ranked in front of mode L. When the height is greater than the width, the processing device 112 may adjust the preliminary MPM list by switching the positions of mode A and mode L to make mode A ranked behind mode L.

For example, in the non-ISP mode, the processing device 112 may determine the final MPM list corresponding to the non-first reference lines (index>0) by adjusting the preliminary MPM list corresponding to the non-first reference lines based on the following operations.

When the height of the target block is larger than or equal to the width of the target block, the processing device 112 may determine the preliminary MPM list as the final MPM list (e.g., Table 2).

When the width of the target block is larger than the height of the target block, the processing device 112 may determine the final MPM list by switching the positions of mode A and mode L in the preliminary MPM list to make mode A ranked in front of mode L. For example, the final MPM list is shown in Table 6.

TABLE 6

| | Condition | MPM[0] | MPM[1] | MPM[2] | MPM[3] | MPM[4] | MPM[5] |
|---|---|---|---|---|---|---|---|
| | L<2&A<2 | V | H | 2 | 34 | 66 | 26 |
| L=A | L≥2 | L | L−1 | L+1 | L−2 | L+2 | L−3 |
| L≠A | \|L−A\|=1&Min{L,A}≥2 | A | L | Min{L,A}−1 | Max{L,A}+1 | Min{L,A}−2 | Max{L,A}+2 |
| | \|L−A\|=2&Min{L,A}≥2 | A | L | Min{L,A}+1 | Min{L,A}−1 | Max{L,A}+1 | Min{L,A}−2 |
| | \|L−A\|≥62&Min{L,A}≥2 | A | L | Min{L,A}+1 | Max{L,A}−1 | Min{L,A}+2 | Max{L,A}−2 |
| | 2<\|L−A\|<62&Min{L,A}≥2 | A | L | Min{L,A}−1 | Min{L,A}+1 | Max{L,A}−1 | Max{L,A}+1 |
| | L+A≥2&Min{L,A}<2 | Max{L,A} | Max{L,A}−1 | Max{L,A}+1 | Max{L,A}−2 | Max{L,A}+2 | Max{L,A}−3 |

In some embodiments, the processing device 112 may determine the final MPM list by replacing one or more intra-prediction modes of the preliminary MPM list according to the size relation.

In some embodiments, when the width is greater than the height, the processing device 112 may determine the final MPM list by replacing the horizontal mode in the preliminary MPM list with the vertical mode. When the height is greater than the width, the processing device 112 may determine the final MPM list by replacing the vertical mode in the preliminary MPM list with the horizontal mode.

For example, in the horizontal partition of ISP, when the width of the target block (the sub-unit) is less than or equal to the height of the target block, the processing device 112 may determine the preliminary MPM list as the final MPM list (e.g., Table 3).

When the width of the target block is larger than the height of the target block, as shown in Table 7, when L<2&A<2, the processing device 112 may determine the final MPM list by exchanging the modes of MPM [1] and MPM [5] in the preliminary MPM list. When L=A, L≥34, and L>V+1|L<V−1, the processing device 112 may determine the final MPM list by replacing the mode H of MPM [3] with the mode V.

In some embodiments, when the width is greater than the height, the processing device 112 may determine the final MPM list by replacing the maximum ordinary angular mode (e.g., mode 66) or the ordinary angular mode nearby the maximum ordinary angular mode (e.g., modes 65, 64, 63, etc.) in the preliminary MPM list with a wide-angular mode adjacent to the maximum ordinary angular mode (e.g., the wide-angular mode 68 in FIG. 7). When the height is greater than the width, the processing device 112 may determine the final MPM list by replacing the minimum ordinary angular mode (e.g., mode 2) or the ordinary angular mode nearby the minimum ordinary angular mode (e.g., modes 3, 4, 5, etc.) in the preliminary MPM list with a wide-angular mode adjacent to the minimum ordinary angular mode (e.g., the wide-angular mode 0 in FIG. 7).

For example, in the non-ISP mode, the processing device 112 may determine the final MPM list corresponding to the non-first reference lines (index>0) by adjusting the preliminary MPM list corresponding to the non-first reference lines based on the following operation.

When the height of the target block is equal to the width of the target block, the processing device 112 may determine the preliminary MPM list as the final MPM list (e.g., Table 2).

As shown in Table 8, when the width of the target block is larger than the height of the target block, and L<2&A<2, the processing device 112 may determine the final MPM list by changing MPM [4] from mode 66 to mode 3. Because the

TABLE 7

| | Condition | MPM[0] | MPM[1] | MPM[2] | MPM[3] | MPM[4] | MPM[5] |
|---|---|---|---|---|---|---|---|
| | L<2&A<2 | Planar | V | 25 | 10 | 65 | H |
| L=A | L≥2&L<34 | L | L−1 | L+1 | L−2 | L+2 | L−3 |
| | L≥34&(L>V+1\|L<V−1) | L | L−1 | L+1 | V | 5 | Planar |
| | L≥34&L=V | L | L−1 | L+1 | H | 5 | Planar |
| L≠A | \|L−A\|=1&Min{L,A}≥2 | $M_0$ | $M_1$ | Min{L,A}−1 | Max{L,A}+1 | Min{L,A}−2 | Max{L,A}+2 |
| | \|L−A\|=2&Min{L,A}≥=2 | $M_0$ | $M_1$ | Min{L,A}+1 | Min{L,A}−1 | Max{L,A}+1 | Min{L,A}−2 |
| | \|L−A\|≥62&Min{L,A}≥2 | $M_0$ | $M_1$ | Min{L,A}+1 | Max{L,A}−1 | Min{L,A}+2 | Max{L,A}−2 |
| | 2<\|L−A\|<62&Min{L,A}≥2 | $M_0$ | $M_1$ | Min{L,A}−1 | Min{L,A}+1 | Max{L,A}−1 | Max{L,A}+1 |
| | L+A≥2&Min{L,A}<2 | Planar | Max{L,A} | Max{L,A}−1 | Max{L,A}+1 | Max{L,A}−2 | Max{L,A}+2 | width is larger than the height, the processing device 112 may further automatically adjust mode 3 to the wide-angular mode 68.

TABLE 8

| Condition | | MPM[0] | MPM[1] | MPM[2] | MPM[3] | MPM[4] | MPM[5] |
|---|---|---|---|---|---|---|---|
| | L<2&A<2 | V | H | 2 | 34 | 3 | 26 |
| L=A | L≥2 | L | L−1 | L+1 | L−2 | L+2 | L−3 |
| L≠A | \|L−A\|=1&Min{L,A}≥2 | L | A | Min{L,A}−1 | Max{L,A}+1 | Min{L,A}−2 | Max{L,A}+2 |
| | \|L−A\|=2&Min{L,A}≥2 | L | A | Min{L,A}+1 | Min{L,A}−1 | Max{L,A}+1 | Min{L,A}−2 |
| | \|L−A\|≥62 &Min{L,A}≥2 | L | A | Min{L,A}+1 | Max{L,A}−1 | Min{L,A}+2 | Max{L,A}−2 |
| | 2<\|L−A\|<62&Min{L,A}≥2 | L | A | Min{L,A}−1 | Min{L,A}+1 | Max{L,A}−1 | Max{L,A}+1 |
| | L+A≥2&Min{L,A}<2 | Max{L,A} | Max{L,A}−1 | Max{L,A}+1 | Max{L,A}−2 | Max{L,A}+2 | Max{L,A}−3 |

As shown in Table 9, when the width of the target block is less than the height of the target block, and L<2 & A<2, the processing device 112 may determine the final MPM list by changing MPM [2] from mode 2 to mode 65. Because the height is larger than the width, the processing device 112 may further automatically adjust mode 65 to the wide-angular mode 0.

TABLE 9

| Condition | | MPM[0] | MPM[1] | MPM[2] | MPM[3] | MPM[4] | MPM[5] |
|---|---|---|---|---|---|---|---|
| | L<2&A<2 | V | H | 65 | 34 | 66 | 26 |
| L=A | L≥2 | L | L−1 | L+1 | L−2 | L+2 | L−3 |
| L≠A | \|L−A\|=1&Min{L,A}≥2 | L | A | Min{L,A}−1 | Max{L,A}+1 | Min{L,A}−2 | Max{L,A}+2 |
| | \|L−A\|=2&Min{L,A}≥2 | L | A | Min{L,A}+1 | Min{L,A}−1 | Max{L,A}+1 | Min{L,A}−2 |
| | \|L−A\|≥62& Min{L,A}≥2 | L | A | Min{L,A}+1 | Max{L,A}−1 | Min{L,A}+2 | Max{L,A}−2 |
| | 2<\|L−A\|<62&Min{L,A}≥2 | L | A | Min{L,A}− | Min{L,A}+1 | Max{L,A}−1 | MAX{L,A}+1 |
| | L+A≥2&Min{L,A}<2 | Max{L,A} | Max{L,A}−1 | Max{L,A}+1 | Max{L,A}−2 | Max{L,A}+2 | Max{L,A}−3 |

In some embodiments, when the width and the height of the target block are different and there are a plurality of encoded blocks adjacent to the longer side of the target block, the processing device 112 may select the intra-prediction modes of a preset number (e.g., 0-6) of encoded blocks, and replace the preset number of intra-prediction modes in the preliminary MPM list with the selected intra-prediction modes.

For example, there may be 2 encoded blocks $L_0$ and $L_1$ adjacent to the left side (which is the longer one) of the target block. If the intra-prediction mode of $L_1$ is not in the preliminary MPM list, the processing device 112 may determine the final MPM list by changing MPM [5] to the intra-prediction mode of $L_1$.

In some embodiments, the process for determining a final MPM list of the target block may include: determining a preliminary MPM list of the target block; determining a size relation between a width and a height of the target block; and determining a final MPM list by adjusting the preliminary MPM list based on the size relation. The first mode in the MPM list may be encoded with fewer code words, and the last mode in the MPM list may be encoded with more code words. Therefore, by ranking the intra-prediction modes in the MPM list, fewer code words may be used to represent the target intra-prediction mode of the target block. When the target intra-prediction mode falls in the MPM list, there is no need to encode the prediction mode number. Only the index of the target intra-prediction mode in the MPM list is used to be encoded, so that the target intra-predication mode is represented in the code stream. Therefore, by adjusting the intra-prediction modes to increase the probability that the target intra-prediction mode falls in the MPM list, fewer code words may be used to represent the target intra-prediction mode.

In some embodiments, the processing device 112 may re-rank the intra-prediction modes in the MPM list according to the width and the height of the coding unit or the sub-unit, which may make the target intra-prediction mode in the MPM list being represented using fewer code words.

In some embodiments, the processing device 112 may replace one or more intra-prediction modes in the MPM list according to the width and the height of the coding unit or the sub-unit, which may increase the probability that the target intra-prediction mode falls in the MPM list.

In some embodiments, the target intra-prediction modes of all sub-units in a coding unit may be the same. For example, the encoding direction of the target image may be form left to right and from top to bottom. In the ISP mode, the target image may be encoded by encoding the sub-units. When the reference pixels is obtained in the ISP mode, the first reference line with index=0 (e.g., reference line TR1+LR1 in FIG. 8) may be used. In the vertical partition, the reference pixels of the first sub-unit (e.g., the sub-unit 1414 in FIG. 14 or the sub-unit 1426 in FIG. 15) from left to right may be obtained based on the first reference line of the original coding unit (e.g., the coding unit 1411 in FIG. 14 and FIG. 15). The first sub-unit may be encoded based on the target intra-prediction mode and the reference pixels of the first sub-unit. The reference pixels of the second sub-unit (e.g., the sub-unit 1415 in FIG. 14 or the sub-unit 1427 in FIG. 15) from left to right may be obtained based on the first reference line of the original coding unit (e.g., the coding unit 1411 in FIG. 14 and FIG. 15) and the encoded pixels of the right side of the encoded first sub-unit. The second sub-unit may be encoded based on the same target intra-prediction mode and the reference pixels of the second sub-unit. In the horizontal partition, the reference pixels of the first sub-unit (e.g., the sub-unit 1412 in FIG. 14 or the sub-unit 1422 in FIG. 15) from top to bottom may be obtained based on the first reference line of the original coding unit (e.g., the coding unit 1411 in FIG. 14 and FIG. 15). The first sub-unit may be encoded based on the target intra-prediction mode and the reference pixels of the first sub-unit. The reference pixels of the second sub-unit (e.g., the sub-unit 1413 in FIG. 14 or the sub-unit 1423 in FIG. 15) from top to bottom may be obtained based on the first reference line of the original coding unit (e.g., the coding unit 1411 in FIG. 14 and FIG. 15) and the encoded pixels of the bottom side of the encoded first sub-unit. The second sub-unit may be encoded based on the same target intra-prediction mode and the reference pixels of the second sub-unit.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 16 is a flowchart illustrating an exemplary process for determining a final MPM list of a target block according to some embodiments of the present disclosure. In some embodiments, the process 1600 may be implemented as a set of instructions (e.g., an application) stored in the storage ROM 230 or RAM 240. The processor 220, and/or the modules and/or the units in FIG. 4 may execute the set of instructions, and when executing the instructions, the processor 220, and/or the modules and/or the units may be configured to perform the process 1600. The operations of the illustrated process presented below are intended to be illustrative. In some embodiments, the process 1600 may be accomplished with one or more additional operations not described and/or without one or more of the operations herein discussed. Additionally, the order in which the operations of the process as illustrated in FIG. 16 and described below is not intended to be limiting. In some embodiments, the processing device 112 may perform operations 513 and 515 of the process 500 in FIG. 5 based on the process 1600.

In 1610, the processing device 112 may determine an MPM candidate list of the target block according to statistical information of intra-prediction modes of a plurality of encoded blocks (e.g., the intra-prediction modes used to encode the plurality of encoded blocks). In some embodiments, an encoded block may include a plurality of encoded pixels. In some embodiments, the plurality of encoded blocks may be in the target image where the target block belong to. For example, the plurality of encoded blocks may be different from the adjacent block of the target block. In some embodiments, the plurality of encoded blocks may be in an encoded video frame prior to the target image. Each of the plurality of encoded blocks may be encoded using an intra-prediction mode. In some embodiments, the statistical information may include the number (or count) of each type of the intra-prediction modes of the plurality of encoded blocks.

In some embodiments, an encoded block may be square or non-square (e.g., rectangular) in shape. In some embodiments, the shapes of the plurality of encoded blocks may be the same or different. In some embodiments, the shapes of at least one of the plurality of encoded blocks and the target block may be the same or different. In some embodiments, the sizes of at least two of the plurality of encoded blocks may be the same or different. In some embodiments, the sizes of at least one of the plurality of encoded blocks and the target block may be the same or different. For example, if the size of the target block is 16×16, the size of an encoded block may be 16×16, 4×4, 8×8, etc.

In some embodiments, the processing device 112 may search the target image to determine the plurality of encoded blocks based on the encoded order of the target image. For example, if the target image is encoded from left to right and from top to bottom, the processing device 112 may search for the plurality of encoded blocks from left to right and from top to bottom in the target image. In some embodiments, the processing device 112 may search a video frame prior to the target image to find the plurality of encoded blocks in any order.

In some embodiments, a global or local search may be performed on a search region of an image (e.g., the target image or a video frame prior to the target image). The global search may refer to searching for all encoded blocks in the search region. The local search may refer to searching for a portion of encoded blocks in the search region. The search region may include all or a portion of the image (e.g., the target image or a video frame prior to the target image).

In some embodiments, the processing device 112 may determine an final MPM list of the target block according to the intra-prediction modes of the encoded blocks, so it is necessary to perform a statistical analysis to the intra-prediction modes of the encoded blocks, and determine the final MPM list of the target block by selecting the intra-prediction modes that are used more frequently for intra-prediction based on the statistical information. In some embodiments, compared to the intra-prediction modes that are used less frequently in statistics, the probability of an intra-prediction mode that is used more frequently in statistics being selected as the target intra-prediction mode of the target block may be higher.

In some embodiments, operation 1610 may include determining the number (or count) (also referred to as the statistical number) of the intra-prediction modes of each type of the encoded blocks; and determining the MPM candidate list by ranking the intra-prediction modes of each type in a descending order of the statistical numbers. In some embodiments, the intra-prediction modes of one or more types with the largest statistical number may be ranked at the top portion of the MPM candidate list, and the intra-prediction modes of one or more types with the smallest statistical number may be ranked at the bottom portion of the MPM candidate list. If there are the intra-prediction modes of two or more types with the same statistical number, the intra-prediction modes of the two or more types may be ranked according to the indexes of the intra-prediction modes of the two or more types. For example, the intra-prediction modes of the two or more types may be ranked in a descending order or ascending order of the indexes of the intra-prediction modes of the two or more types.

For example, the processing device 112 may determine an MPM candidate list including 67 elements {S[0], S[1], S[2], . . . , S[66]}. Each element of the MPM candidate list may correspond to the intra-prediction mode of a type of angular intra-prediction modes 0-66. S[0] may indicate that the statistical number of the corresponding intra-prediction mode of a type is largest. S[66] may indicate that the statistical number of the corresponding intra-prediction mode of another type is smallest.

In some embodiments, each video frame may have a sequence number corresponding to a timestamp. If the sequence number of the target image (i.e., current frame) where the target block is located is 20, the encoded blocks may include encoded blocks in 4 video frames with the sequence numbers 16-19. The MPM candidate list determined based on the encoded blocks may include S[0]=0, S[1]=3, S[2]=1, . . . , and S[66]=4, which indicates that in the MPM candidate list, the intra-prediction modes of three types with the top three statistical numbers are the planar mode, the angular mode 3, and the DC mode, and the angular mode 4 is ranked last (e.g., the statistical number of the angular mode 4 is smallest).

In some embodiments, operation 1610 may include determining the statistical number of the intra-prediction modes of each type the encoded blocks; determining a ratio of each statistical number to a sum of the statistical numbers as a weight of the intra-prediction modes of each type; selecting one or more intra-prediction modes of one or more types that satisfy a weight condition as one or more elements in the MPM candidate list. In some embodiments, the weight condition being satisfied may include that the weight of the intra-prediction mode of a type is greater than or equal to a weight threshold. The weight threshold may be between 0 and 1, such as, 0.2, 0.1, 0.05, etc.

Details regarding determining the MPM candidate list may be found elsewhere in the present disclosure (e.g., the description in connection with FIG. 17).

In 1620, the processing device 112 may determine a final MPM list of the target block according to the MPM candidate list of the target block.

In some embodiments, the processing device 112 may select one or more intra-prediction modes ranked relatively high (e.g., top 1, top 2, top 5, top 1%, top 2%, top 5%, etc.) in the MPM candidate list as the final MPM list of the target block. In some embodiments, the final MPM list of the target block may be obtained by combining the elements in the MPM candidate list and one or more intra-prediction modes of the adjacent blocks of the target block (e.g., the preliminary MPM list as described in FIGS. 9-11). More descriptions for determining the final MPM list based on the MPM candidate list and the preliminary MPM list may be found in FIG. 18. In some embodiments, according to the MPM candidate list, the processing device 112 may select the intra-prediction modes ranked relatively high in the MPM candidate list as the elements of the final MPM list. In some embodiments, the final MPM list may also include other elements, such as one or more intra-prediction modes of the adjacent blocks of the target block, the special mode (e.g., the planar mode, the DC mode), etc.

In some embodiments, the construction of the final MPM list may ensure that the target intra-prediction mode of the target block falls into the final MPM list and is ranked at the top of the final MPM list. In some embodiments, considering the correlation between the intra-prediction mode of the encoded block and the target intra-prediction mode of the target block, the MPM candidate list may be constructed according to the statistical count (i.e., the statistical number) of the intra-prediction modes of each type of the encoded blocks and then the final MPM list is determined according to the MPM candidate list. The intra-prediction modes ranked relatively high in the MPM candidate list may be selected as the elements of the final MPM list. For the final MPM list, the elements may be the intra-prediction modes that are used more frequently in the encoded blocks that may be in the same video frame or different video frames as the target block in statistics, which may increase the probability that the target intra-prediction mode falls into the final MPM list, and reduce the code word length of the target intra-prediction mode of the target block and the bit overhead.

Details regarding determining the final MPM list may be found elsewhere in the present disclosure (e.g., the description in connection with FIG. 18).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 17 is a flowchart illustrating an exemplary process for determining an MPM candidate list according to some embodiments of the present disclosure. In some embodiments, the process 1700 may be implemented as a set of instructions (e.g., an application) stored in the storage ROM 230 or RAM 240. The processor 220, and/or the modules and/or the units in FIG. 4 may execute the set of instructions, and when executing the instructions, the processor 220, and/or the modules and/or the units may be configured to perform the process 1700. The operations of the illustrated process presented below are intended to be illustrative. In some embodiments, the process 1700 may be accomplished with one or more additional operations not described and/or without one or more of the operations herein discussed. Additionally, the order in which the operations of the process as illustrated in FIG. 17 and described below is not intended to be limiting. In some embodiments, the processing device 112 may perform operation 1610 of the process 1600 in FIG. 16 based on the process 1700.

In 1710, the processing device 112 may rank the intra-prediction modes of the encoded blocks in a descending order of the statistical numbers of the intra-prediction modes of each type.

In some embodiments, the processing device 112 may obtain a data set $\{m_0, m_1, \ldots, m_{k-1}\}$ by ranking the intra-prediction modes of the encoded blocks in the descending order of the statistical numbers of the intra-prediction modes of each type. For example, k=67, and each element of the data set may correspond to an intra-prediction mode of a type of intra-prediction modes 0-66. $m_0$ may represent an intra-prediction mode of a type of which the statistical number is largest. $m_{k-1}$ may represent an intra-prediction mode of a type of which the statistical number is smallest. For example, if none of the encoded blocks is encoded using the mode $m_{k-1}$, the statistical number of the mode $m_{k-1}$ may be 0. The mode $m_{k-1}$ may be ranked last in the data set.

In 1720, the processing device 112 may select a preset number of top-ranked intra-prediction modes as elements of the MPM candidate list.

In some embodiments, the intra-prediction modes ranked relatively high in the data set may be selected as the elements of the MPM candidate list. Accordingly, the elements in the MPM candidate list may be fewer and more meaningful. Therefore, the final MPM list constructed based on the MPM candidate list of this embodiment may be better. According to some embodiments in process 1700, the probability that the target intra-prediction mode falls into the final MPM list may be increased, and the code word length of the target intra-prediction mode of the target block and the bit overhead may be reduced.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 18 is a flowchart illustrating an exemplary process for determining a final MPM list of a target block according to some embodiments of the present disclosure. In some embodiments, the process 1800 may be implemented as a set of instructions (e.g., an application) stored in the storage ROM 230 or RAM 240. The processor 220, and/or the modules and/or the units in FIG. 4 may execute the set of instructions, and when executing the instructions, the processor 220, and/or the modules and/or the units may be configured to perform the process 1800. The operations of the illustrated process presented below are intended to be illustrative. In some embodiments, the process 1800 may be accomplished with one or more additional operations not described and/or without one or more of the operations herein discussed. Additionally, the order in which the operations of the process as illustrated in FIG. 18 and described below is not intended to be limiting. In some embodiments, the processing device 112 may perform operation 1620 of the process 1600 in FIG. 16 based on the process 1800.

In 1810, the processing device 112 may determine a preliminary MPM list of the target block based on intra-prediction modes of two or more adjacent blocks of the target block.

For example, referring to FIG. 100, the two or more adjacent blocks of the target block may include a top adjacent block (A) and a left adjacent block (L). The elements in the preliminary MPM list may be mode L (the intra-prediction mode of block L) and mode A (the intra-prediction mode of block A) in turn, or mode A and mode L in turn. When mode A is the same as mode L, the preliminary MPM list may only include mode L. In some embodiments, the preliminary MPM list may further include the planar mode and/or the DC mode that may be even ranked at top portion of the preliminary MPM list. For example, the preliminary MPM list may include the planar mode, the DC mode, mode L, and mode A in turn.

In short, the processing device 112 may determine the preliminary MPM list in various ways. For example, the processing device 112 may determine the preliminary MPM list based on the process 900 (e.g., operation 910 and/or operation 920) in FIG. 9. The processing device 112 may determine the preliminary MPM list or the final MPM list in the process 900 as the preliminary MPM list in operation 1810. As another example, the processing device 112 may determine the preliminary MPM list based on the process 1300 (e.g., operation 1310 and/or operation 1330) in FIG. 13. The processing device 112 may determine the preliminary MPM list or the final MPM list in the process 1300 as the preliminary MPM list in operation 1810.

In 1820, the processing device 112 may determine a final MPM list of the target block based on the preliminary MPM list and the MPM candidate list.

According to the MPM candidate list and the preliminary MPM list, the obtaining the final MPM list of the target block may include, but is not limited to, the following operations. (1) The processing device 112 may combine the MPM candidate list and the preliminary MPM list to obtain the final MPM list. In some embodiments, in the final MPM list, the intra-prediction modes from the MPM candidate list may be ranked in front of the intra-prediction modes from the preliminary MPM list. In some embodiments, in the final MPM list, the intra-prediction modes from the MPM candidate list may be ranked behind the intra-prediction modes from the preliminary MPM list. In some embodiments, in the final MPM list, the intra-prediction modes from the MPM candidate list and the preliminary MPM list may be mixed. (2) The processing device 112 may select a first number of elements from the MPM candidate list and a second number of elements from the preliminary MPM list, and combine the first number of elements and the second number of elements to obtain the final MPM list based on the combination way in (1). (3) The processing device 112 may select a number of elements from the MPM candidate list. The processing device 112 may obtain the final MPM list by adding the selected elements to the preliminary MPM list or replacing some elements in the preliminary MPM list with the selected elements. Alternatively, the processing device 112 may select a number of elements from the preliminary MPM list. The processing device 112 may obtain the final MPM list by adding the selected elements to the MPM candidate list or replacing some elements in the MPM candidate list with the selected elements. In some embodiments, the elements selected from the MPM candidate list to obtain the final MPM list may include the elements ranked relatively high in the MPM candidate list. In some embodiments, the order of the selected elements in the MPM candidate list may be consistent with the order of the selected elements in the final MPM list.

In some embodiments, operation 1820 may include determining one or more elements to be replaced in the preliminary MPM list; obtaining the final MPM list of the target block by replacing the one or more elements to be replaced in the preliminary MPM list with one or more top-ranked elements in the MPM candidate list.

In some embodiments, the processing device 112 may replace one or more elements to be replaced in the preliminary MPM list with the one or more top-ranked elements in the MPM candidate list.

For example, an element to be replaced may include the special mode. The special mode may refer to the intra-prediction mode that is not the mode of the adjacent block of the target block. For example, when the preliminary MPM list is determined based on Table 1, the special mode may include at least one of the following intra-prediction modes: the planar mode, the DC mode, the vertical mode (V) (e.g., the mode 50 in FIG. 6), the horizontal mode (H) (e.g., the mode 18 in FIG. 6), the intra-prediction mode nearby the mode of the adjacent block, mode V±4, mode H±4, or the like. The intra-prediction mode nearby the mode m of the adjacent block may include modes m±1, modes m±2, modes m±3, modes m±4, and so on. In some embodiments, modes 66±1 may be mode 3 and mode 65, respectively. Modes 2±1 may be mode 3 and mode 65, respectively. Modes 65±1 may be mode 2 and mode 64, respectively.

In some embodiments, the top-ranked elements in the MPM candidate list may be more possible to be selected as the target intra-prediction mode of the target block. It may be difficult to determine the possibility that the special mode in the preliminary MPM list is selected as the target intra-prediction mode. Therefore, the operation of using the top-ranked elements in the MPM candidate list to replace the elements to be replaced (e.g., the special mode) in the preliminary MPM list may increase the probability that the target intra-prediction mode falls into the final MPM list. In some embodiments, the number (or count) of elements to be replaced in the preliminary MPM list may be the same as or different from the number (or count) of top-ranked elements in the MPM candidate list. In some embodiments, the number (or count) of elements in the preliminary MPM list may be the same as or different from the number (or count) of elements in the final MPM list.

In some embodiments, the adjacent blocks of the target block may include a first adjacent block and a second adjacent block. The final MPM list may include M (M≥3) elements located at positions [0]-[M−1], respectively. The processing device 112 may determine an element that is located at position [M−P] in the preliminary MPM list. The processing device 112 may obtain the final MPM list of the target block by replacing, with the top-ranked elements in the MPM candidate list, the elements to be replaced within positions [M−P]-[M−1] in the preliminary MPM list.

In some embodiments, if the intra-prediction mode of the first adjacent block is the same as the intra-prediction mode of the second adjacent block, P may be an integer within the range [1, M−1]. If the intra-prediction mode of the first adjacent block is different from the intra-prediction mode of the second adjacent block, P may be an integer within [1, M−2].

In some embodiments, during the process for selecting the top-ranked elements in the MPM candidate list and replacing the elements to be replaced in the preliminary MPM list, it is necessary to retain the top-ranked elements in the preliminary MPM list as much as possible, even if the top-ranked elements include at least one special mode. The elements to be replaced within positions [M−P]-[M−1] in the preliminary MPM list may be replaced, until all elements of the final MPM list are determined. In some embodiments, the elements from position [0] to position [M−N−1] in the final MPM list may include the top-ranked elements in the preliminary MPM list, and at least one of the elements from position [M−N] to position [M−1] in the final MPM list may include the top-ranked element in the MPM candidate list, which combines the better modes in the preliminary MPM list with the better modes in the MPM candidate list, further increasing the probability that the target intra-prediction mode falls into the final MPM list.

Merely by way of example, the preliminary MPM list may include the mode L, the mode A, and the special mode. There may be M elements in the preliminary MPM list and M elements in the final MPM list. The processing device 112 may obtain the MPM candidate list based on the statistical numbers of the intra-prediction modes of each type of the encoded blocks, and use the modes in the MPM candidate list to replace one or more special modes in the preliminary MPM list. If the number of modes to be replaced in the preliminary MPM list is set to P, when the mode L is the same as the mode A, the value range of P may be [1, M−1] and P<M. When the mode L is different form the mode A, the value range of P may be [1, M−2] and P<M−1. The final MPM list may be obtained by replacing the elements from position [M−P] to position [M−1] in the preliminary MPM list.

In some embodiments, the processing device 112 may first compare the first mode of the MPM candidate list with modes corresponding to MPM [0] MPM [M−P−1] of the preliminary MPM list. If the first mode is different from the modes corresponding to MPM [0]-MPM [M−P−1], MPM [M−P] of the preliminary MPM list may be replaced with the first mode of the MPM candidate list; otherwise, the processing device 112 may ignore the first mode and continue to judge the second mode in the MPM candidate list. If the second mode is different from the modes corresponding to MPM [0]-MPM [M−P−1], the processing device 112 may replace a mode corresponding to MPM [M−P] with the second mode, and so on, until all of the M elements in the final MPM list are determined.

For the purpose of illustration, Examples 1-3 are provided below. In Example 1-3, the preliminary MPM list may be determined based on Table 1 as shown in FIG. 13.

Example 1

The MPM candidate list may include 67 elements S[0]-S[66], M=6, and all special modes in the preliminary MPM list may be replaced with the elements in the MPM candidate list. If modes L and A are the same, and L=S[2], the final MPM list may include {L, S[0], S[1], S[3], S[4], S[5]}. If modes L and A are different, and L=S[1], A=S[6], the final MPM list may include {L, A, S[0], S[2], S[3], S[4]}.

Example 2

The MPM candidate list may include 67 elements S[0]-S[66], M=3, and one special mode in the preliminary MPM list may be replaced with the element in the MPM candidate list. If modes L and A are the same, and L≠Planar, L=S[2], S[0]≠Planar, the final MPM list may include {L, Planar, S[0]}. If modes L and A are different, and L=S[0], A=S[6], the final MPM list may include {L, A, S[1]}.

Example 3

The MPM candidate list may include 67 elements S[0]-S[66], M=6, and two special modes in the preliminary MPM list may be replaced with the elements in the MPM candidate list. If modes L and A are the same, and mode L is not the planar mode, the DC mode, and the vertical mode, and L=S[1], S[0]=DC, S[3]=Planar, S[2] and S[4] are not the vertical mode, the final MPM list may include {L, Planar, DC, V, S[2], S[4]}. If modes L and A are different, and L=S[1], A=S[2], S[3]=Planar, S[0] and S[4] are not the DC mode, the final MPM list may include {L, A, Planar, DC, S[0], S[4]}.

In some embodiment, if a single reference line (e.g., the first reference line) is used for intra-prediction of the target block, the processing device 112 may determine the final MPM list corresponding to the first reference line based on the process 1600, the process 1700, and/or the process 1800. In some embodiment, if multiple reference lines are used for intra-prediction of the target block, the processing device 112 may determine the final MPM list corresponding to the multiple reference lines based on the process 1600, the process 1700, and/or the process 1800. Alternatively, the processing device 112 may determine a first final MPM list corresponding to the first reference line based on the process 1600, the process 1700, and/or the process 1800. The processing device 112 may determine a second final MPM list corresponding to the non-first reference lines. For example, the processing device 112 may determine the second final MPM list based on the first final MPM list as described in the process 900 in FIG. 9. As another example, the processing device 112 may determine a preliminary MPM list corresponding to the non-first reference lines as described in the process 1300 in FIG. 13 (e.g., Table 2 or Table 6). The processing device 112 may determine the second final MPM list based on the preliminary MPM list corresponding to the non-first reference lines as described in operation 1620 of the process 1600 in FIG. 16 and/or the process 1800 in FIG. 18.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 19 is a flowchart illustrating an exemplary process for determining a final MPM list of a target block according to some embodiments of the present disclosure. In some embodiments, the process 1900 may be implemented as a set of instructions (e.g., an application) stored in the storage ROM 230 or RAM 240. The processor 220, and/or the modules and/or the units in FIG. 4 may execute the set of instructions, and when executing the instructions, the processor 220, and/or the modules and/or the units may be configured to perform the process 1600. The operations of the illustrated process presented below are intended to be illustrative. In some embodiments, the process 1900 may be accomplished with one or more additional operations not described and/or without one or more of the operations herein discussed. Additionally, the order in which the operations of the process as illustrated in FIG. 19 and described below is not intended to be limiting. In some embodiments, the processing device 112 may perform operations 513 and 515 of the process 500 in FIG. 5 based on the process 1900.

In 1910, the processing device 112 may obtain a plurality of encoded blocks, and determine at least one of the plurality of encoded blocks as a similar block of the target block. A difference between a first texture value of each of the plurality of encoded blocks and a second texture value of the target block may be within a range.

Texture feature may be statistics of a gray distribution function of local properties of an image. The texture value may be a value of the texture feature of a block in an image. Blocks with similar texture features may have similar luminance and chrominance values. The intra-prediction mode of a block may be related to the texture direction of the block. Therefore, blocks with similar texture features may correspond to a similar intra-prediction mode. According to the similarity between texture features of an encoded block and the target block, the processing device 112 may determine the target intra-prediction mode of the target block using the intra-prediction modes of the encoded blocks that include texture features similar to the texture feature of the target block.

In some embodiments, the difference between the first texture value and the second texture value may be a relative difference or an absolute difference. The absolute difference may refer to an absolute value of a difference between the first texture feature value and the second feature value. The relative difference may refer to a ratio of the absolute difference to a texture feature value of a reference block. The relative difference may represent the similarity degree between the texture features of two blocks (e.g., the encoded block and the target block). In some embodiments, the range of the relative difference may be 0.05-0.3. For example, the relative difference may be 0.1, 0.2, etc., that is, the similarity degree of the texture feature of an encoded block and the target block is 90% or 80%.

In some embodiments, an encoded block may be in the target image and different from the adjacent block of the target block, or may be in an encoded video frame prior to the target image. Details regarding the encoded block and the searching process for the encoded block may be similar to the corresponding description in connection with FIG. 16.

Mere by way of example, FIG. 20 is a schematic diagram of an exemplary target image including encoded blocks and a target block according to some embodiments of the present disclosure. In this embodiment, a global search strategy of searching for all encoded blocks in the target image may be used. The size of the target image is 64×64, and the size of the target block is 16×16. The search region may include the encoded blocks on the top side and the left side of the target block. The numbers 1-15 represent the indexes of the encoded blocks, and the search order may be the order of the indexes of the encoded blocks. For example, the processing device 112 may search the encoded blocks from block 1 to block 15.

In some embodiments, each searched encoded block may be compared with the target block in the texture feature. In some embodiments, the gradient value of an image block (e.g., the target block or the encoded block) may be used to represent the texture feature of the image block, because the gradient value of the image block may reflect the texture direction of the image block. The gradient value of an image block may be used as the texture value of the image value. In some embodiments, the texture feature may be obtained in other ways, such as using a local binary mode and a gray level co-occurrence matrix to obtain the texture feature of the image block.

The gradient value of an image block may be obtained based on Equation (2) below:

$$grad = \frac{1}{w*h}\sum_{j=1}^{h}\sum_{i=1}^{w}(|p_{i,j} - p_{i,j-1}| + |p_{i,j} - p_{i-1,j}|), \quad (2)$$

wherein w and h represent the width and the height of the image block, respectively; i and j represent a horizontal coordinate and a vertical coordinate of a pixel in the image block, respectively; and p represents the pixel value of a pixel in the image block. The width of the image block may refer to the number (or count) pixels in a first side of the image block along a first direction (e.g., the horizontal direction X in FIG. 14). The height of the image block may refer to the number (or count) pixels in a second side of the image block along a second direction (e.g., the vertical direction Y in FIG. 14).

The coordinate system of the image including the image block may have an origin at a vertex of the image, a horizontal axis along the horizontal direction, and a vertical axis along the vertical direction. For example, the origin is at the left-bottom vertex of the image, the horizontal axis is from left to right, and the vertical axis is from bottom to top. A pixel (i, j) may refer to a pixel that is located in the $i^{th}$ pixel column of the image along the horizontal axis and the $j^{th}$ row of the image along the vertical axis. For example, the coordinates of a pixel at the left-top corner of the image may be (1, 1).

In some embodiment, the processing device 112 may determine an extended gradient value of the image block. The extended gradient value may refer to the gradient value of an extended image block that includes the image block and a plurality of reference pixels of the image block. For example, in addition to the target block, the extended target block may further include the reference pixels adjacent to the top side of the target block and/or the reference pixels adjacent to the left side of the target block.

For example, as shown in FIG. 20, if the encoding direction of the target image is from left to right and from top to bottom, the extended target block may include the target block, the reference pixels in dotted box 2010 adjacent to the top side of the target block (also referred to as upper reference pixels), and the reference pixels in dotted box 2020 adjacent to the left side of the target block (also referred to as left reference pixels). The number of the upper reference pixels may be equal to the width of the target block, and the number of the left reference pixels may be equal to the height of the target block. For example, the size of the target block may be 16×16. The extended target block may include the target block, a row of 16 reference pixels adjacent to the top side of the target block, and a column of 16 reference pixels adjacent to the left side of the target block.

By extending the image block, during comparing the texture features, the probability and accuracy of determining the similar block of the target block may be increased.

After obtaining the gradient values of the searched encoded blocks and the target block, the processing device 112 may compare each encoded block with the target block in the gradient values, and select the encoded blocks whose relative differences of gradient values with the target block are within a preset range. The processing device 112 may determine at least one of the selected encoded blocks as a similar block of the target block. For example, the processing device 112 may designate the encoded block with the smallest relative difference of gradient values with the target block as the similar block (also referred to as the most similar block). The encoded block with the smallest relative difference may be regarded as the encoded block with the most similarity to the target block in the texture feature.

After determining the similar block, the processing device 112 may obtain the intra-prediction mode related to the similar block. In some embodiments, the intra-prediction mode related to the similar block may include at least one of the intra-prediction mode used to encode the similar block (also referred to as an optimal intra-prediction mode) and the intra-prediction modes in an MPM list of the similar block.

In some embodiments, the processing device 112 may further determine whether the absolute difference between the second texture value of the target block and the first texture value of the similar block is less than or equal to a threshold. If not, it indicates that the texture feature of the target block may be different from the similar block, and the intra-prediction mode of the similar block may have no guiding significance for predicting the target block, so it is not necessary to consider the similar block. If yes, the intra-prediction modes related to the similar block may be possible to be selected as an element in the final MPM list of the target block.

In 1920, the processing device 112 may determine a final MPM list of the target block based on an intra-prediction mode related to the at least one similar block.

In some embodiments, the processing device 112 may determine an MPM candidate list based on the intra-prediction mode related to the at least one similar block.

In some embodiments, if there is only one similar block (e.g., the most similar block), the MPM candidate list may include the optimal intra-prediction mode of the similar block and/or one or more intra-prediction modes in the MPM list of the similar block. The similar block may be an encoded block. During a process for encoding the similar block, an MPM list of the similar block is needed to be determined. As used herein, the MPM list of the similar block refers to an MPM list that was determined during the process for encoding the similar block. In some embodiments, the one or more intra-prediction modes may be a first preset number (e.g., 1, 2, 3, etc.) of top-ranked elements in the MPM list of the similar block. In the MPM candidate list, the optimal mode may be the first element. The one or more intra-prediction modes may be ranked after the optimal mode in an order that is the same as the order in the MPM list of the similar block. In some embodiments, the one or more intra-prediction modes may be a second preset number (e.g., 1, 2, 3, etc.) of elements in the MPM list of the similar block with the Rdcosts less than a cost threshold. In the MPM candidate list, the optimal mode may be the first element. The one or more intra-prediction modes may be ranked after the optical mode in an ascending order of the Rdcosts.

In some embodiments, if there are two or more similar blocks, the MPM candidate list may include the optimal mode of each similar block and/or one or more intra-prediction modes in the MPM list of each similar block. In some embodiments, in the MPM candidate list, the modes related to the two or more similar blocks may be ranked based on the similarity between the texture value of each of the two or more similar blocks and the texture value of the target block. The modes related to the similar block with a higher texture similarity may be ranked before the modes related to the similar block with a lower texture similarity. In the MPM candidate list, the order of the modes related to the same similar block may be determined based on the description above.

In some embodiments, in the MPM candidate list, the optimal modes of the two or more similar blocks may be ranked before the modes in the MPM lists of the similar blocks. The optimal modes of the two or more similar blocks may be ranked based on a descending order of the texture similarity of the two or more similar blocks. After the optimal modes of the two or more similar blocks, the modes of the MPM lists of the two or more similar blocks may be ranked based on a descending order of the texture similarity of the two or more similar blocks. The modes in the MPM list of the similar block with a higher texture similarity may be ranked before the modes in the MPM list of the similar block with a lower texture similarity. In the MPM candidate list, the order of the modes in the same MPM list may be determined based on the description above.

In some embodiments, the processing device 112 may determine a preliminary MPM list of the target block based on the intra-prediction modes of two or more adjacent blocks of the target block. For example, the processing device 112 may determine the preliminary MPM list based on the process 900 (e.g., operation 910 and/or operation 920) in FIG. 9. The processing device 112 may determine the preliminary MPM list or the final MPM list in the process 900 as the preliminary MPM list in operation 1810. As another example, the processing device 112 may determine the preliminary MPM list based on the process 1300 (e.g., operation 1310 and/or operation 1330) in FIG. 13. The processing device 112 may determine the preliminary MPM list or the final MPM list in the process 1300 as the preliminary MPM list in operation 1810.

In some embodiments, the processing device 112 may determine the final MPM list of the target block based on the preliminary MPM list and the MPM candidate list. Details regarding determining the final MPM list may be similar to the description of determining the final MPM list in connection with the operation 180 of the process 1800 in FIG. 18.

In some embodiments, the similarity between the texture features of image blocks may be used to obtain one or more similar blocks of the target block. The intra-prediction mode related to at least one of the one or more similar blocks may be used as an element in the final MPM list of the target block, so that in addition to one or more intra-prediction modes determined based on the adjacent blocks of the target block, there are also one or more intra-prediction modes determined based on one or more similar blocks, which may improve the accuracy of selecting the target intra-prediction mode of the target block.

For the purpose of illustration, Examples 1-2 are provided below. In Examples 1-2, the preliminary MPM list may be determined based on Table 1. The MPM candidate list may include the modes related to the most similar block. There may be M1 elements in the final MPM list of the target block.

Example 1

M1=6, and the optimal intra-prediction mode K and all elements in the MPM list of the most similar block are different. The preliminary MPM list of the target block may include MPM1 [0], MPM1 [1], MPM1 [2], MPM1 [3], MPM1 [4], and MPM1 [5]. The MPM list of the most similar block may include MPM0 [0], MPM0 [1], MPM0 [2], MPM0 [3], MPM0 [4], and MPM0 [5]. The MPM candidate list S1 may include {S1 [0], S1 [1], S1 [2], S1 [3], 51 [4], S1 [5], S1 [6]}, wherein S1 [0]=K, S1 [1]=MPM0 [0], S1 [2]=MPM0 [1], S1 [3]=MPM0 [2], S1 [4]=MPM0 [3], S1 [5]=MPM0 [4], S1 [6]=MPM0 [5].

In solution 1, the intra-prediction modes (mods L and A) of the adjacent blocks L and A of the target block may be the same as the planar mode that is the same as S1 [2], that is, mode L=mode A=Planar=S1 [2]. According to Table 1, the preliminary MPM list of the target block may include {L, DC, V, H, V−4, V 4}. The processing device 112 may use the intra-prediction modes in S1 to replace all special modes in the preliminary MPM list of the target block. Starting from the first mode S1 [0] (the mode K) of S1, the processing device 112 may successively compare each element in S1 with the mode L. If S1 [0]≠L, the processing device 112 may use S1 [0] to replace MPM1 [1], that is, use the mode K to replace the DC mode. The processing device 112 may continue to compare S1 [1] with L. If S1 [1]≠L, the processing device 112 may use S1 [1] to replace MPM1 [2], that is, use the mode MPM0 [0] to replace the mode V, and so on, until all of the special modes are replaced. The final MPM list of the target block may include {L, S1 [0], S1 [1], S1 [3], S1 [4], S1 [5]}.

In solution 2, modes L and A may be different, L+A=DC, and L=S1 [1], A=S1 [6]. According to Table 1, the preliminary MPM list of the target block may include {L, A, V, H, V−4, V+4}. The processing device 112 may use the modes in S1 to replace all special modes in the preliminary MPM list of the target block. Starting from the first mode S1 [0] (the mode K) of S1, the processing device 112 may compare each element in S1 with the modes L and A, respectively. If S1 [0]≠L and S1 [0]≠A, the processing device 112 may use S1 [0] to replace MPM1 [2], that is, use the mode K to replace the mode V. The processing device 112 may continue to compare S1 [1] with modes L and A. If S1 [1]=L, the processing device 112 may skip S1 [1] and compare S1 [2] with modes L and A. If S1 [2]≠L and S1 [2]≠A, the processing device 112 may use S1 [2] to replace MPM1 [3], that is, use the mode MPM0 [1] to replace the mode H. The processing device 112 may continue to compare S1 [3] with modes L and A. If S1 [3]≠L and S1 [3]≠A, the processing device 112 may use S1 [3] to replace MPM1 [4], that is, the mode MPM1 [4] is replaced by the mode MPM0 [2], and so on, until all special modes in the preliminary MPM list are replaced. The final MPM list of the target block may include {L, A, S1[0], S1[2], S1[3], S1[4]}.

Example 2

M1=6, and the optimal intra-prediction mode K of the most similar block may be the same as MPM0 [2] in the MPM list of the most similar block. After MPM0 [2] is removed, the MPM candidate list S2 may include {K, MPM0 [0], MPM0 [1], MPM0 [3], MPM0 [4], MPM0 [5]}.

In solution 1, modes A and L may be the same and equal to the DC mode. According to Table 1, the preliminary MPM list of the target block may include {L, Planar, V, H, V−4, V+4}, and L=Ω [1], Planar=S2 [3], and V=Ω [0]. The processing device 112 may use the modes in S2 to replace the two special modes in the preliminary MPM list of the target block, such as V−4 and V+4. Starting from the first mode S2 [0] (the mode K) of S2, the processing device 112 may successively compare each element in S2 with the modes L, Planar, DC, and V. If S2 [0]=V, the processing device 112 may skip S2 [0], and compare S2 [1] with the modes L, Planar, DC, and V. If S2 [1]=L, the processing device 112 may skip S2 [0], and compare S2 [2] with the modes L, Planar, DC, and V. If S2 [2]≠L S2 [2]≠Planar, S2 [2]≠V, and S2 [2]≠H, S2 [2] may be used to replace MPM1 [4], that is, MPM0 [1] is used to replace the mode V−4. The processing device 112 may continue to compare S2 [3] with L, Planar, DC, and V. If S2 [3]=Planar, the processing device 112 may skip S2 [3], and compare S2 [4] with L, Planar, DC, and V. If S2 [4]≠L S2 [4]≠Planar, S2 [4]≠DC, and S2 [4]≠V, the processing device 112 may use S2 [4] to replace MPM1 [5], that is, use MPM0 [4] to replace the mode V+4. The final MPM list of the target block may include {L, Planar, DC, V, S2 [2], S2 [4]}.

In solution 2, modes L and A may be different, and L>1&A>1&(L and A are adjacent). According to Table 1, the preliminary MPM list of the target block may include {L, A, Planar, DC, Max{L, A}−2, Max{L, A}+2}, and L=S2 [1], A=S2 [2], Planar=S2 [3]. The processing device 112 may use the prediction modes in S2 to replace 2 special modes in the preliminary MPM list of the target block, such as modes Max {L, A}−2, and Max {L, A}+2. Starting from the first mode S2 [0] (the mode K) of S2, the processing device 112 may compare each element in S2 with L, Planar, DC, and V. If S2 [0]≠L, S2 [0]≠A, S2 [0]≠Planar, S2 [0]≠DC, the processing device 112 may use S2 [0] to replace MPM1 [4], that is, use the mode K to replace the mode Max{L, A}−2. The processing device 112 may continue to compare S2 [1] with modes L, A, Planar, and DC. If S2 [1]=L, the processing device 112 may skip S2 [1], and compare S2 [2] with L, A, Planar, and DC. If S2 [2]=A, the processing device 112 may skip S2 [2] and compare S2 [3] with L, A, Planar and DC. If S2 [3]=Planar, the processing device 112 may skip S2 [3] and compare S2 [4] with L, A, Planar and DC. If S2 [4]≠L S2 [4]≠A, S2 [4]≠Planar, S2 [4]≠DC, the processing device 112 may use S2 [4] to replace MPM1 [5], that is, use MPM0 [4] to replace the mode Max {L, A}+2. The final MPM list of the target block may include {L, Planar, DC, V, S2 [0], S2 [4]}.

In some embodiments, according to the similarity between the texture features of the encoded block and the target block, the optimal intra-prediction mode and the MPM list of the encoded block that is similar to the target block in the texture feature may be used to replace the special mode in the preliminary MPM list of the target block, which may remove the uncertainty caused by the special mode and improve the accuracy of selecting the target prediction mode of the target block, and may be beneficial to remove spatial redundancy to increase the compression rate of intra-frame encoding.

In some embodiment, if a single reference line (e.g., the first reference line) is used for intra-prediction of the target block, the processing device 112 may determine the final MPM list corresponding to the first reference line based on the process 1600, the process 1700, and/or the process 1800. In some embodiment, if multiple reference lines are used for intra-prediction of the target block, the processing device 112 may determine the final MPM list corresponding to the multiple reference lines based on the process 1600, the process 1700, and/or the process 1800. Alternatively, the processing device 112 may determine a first final MPM list corresponding to the first reference line based on the process 1600, the process 1700, and/or the process 1800. The processing device 112 may determine a second final MPM list corresponding to the non-first reference lines. For example, the processing device 112 may determine the second final MPM list based on the first final MPM list as described in the process 900 in FIG. 9. As another example, the processing device 112 may determine a preliminary MPM list corresponding to the non-first reference lines as described in the process 1300 in FIG. 13 (e.g., Table 2 or Table 6). The processing device 112 may determine the second final MPM list based on the preliminary MPM list corresponding to the non-first reference lines as described in operation 1620 of the process 1600 in FIG. 16 and/or the process 1800 in FIG. 18.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, the present disclosure may also provide an encoder or a decoder including a processor (e.g., the processing device 112). The processor may be configured to execute instructions to implement a process (e.g., process 500-1, process 500-2, process 900, process 1100, process 1200, process 1300, process 1600, process 1700, process 1800, and process 1900) described elsewhere in the present disclosure. As used herein, the encoder may further include a storage (not shown) storing instructions and data and the instructions and data may be executed by the processor.

In some embodiments, the present disclosure may also provide a storage storing instructions. The instructions may be executed to implement a process (e.g., process 500-1, process 500-2, process 900, process 1100, process 1200, process 1300, process 1600, process 1700, process 1800, and process 1900) described elsewhere in the present disclosure. In some embodiments, the instructions may be formed a program file and stored in the storage in a form of a software product, so that a computer device (e.g., a personal computer, a server, a network device, etc.) or a processor may execute the process described elsewhere in the present disclosure. In some embodiments, the storage may include but not limited to a U disk, a mobile hard disk, a read-only memory (ROM), a random access memory (RAM), a disk, an optical disk, a terminal device (e.g., a computer, a server, a mobile phone, a tablet, etc.), or the like, or any combination thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or comlocation of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for intra prediction, comprising:
   at least one storage device including a set of instructions; and
   at least one processor in communication with the at least one storage device, wherein when executing the set of instructions, the at least one processor is directed to cause the system to:
      obtain a target block to be encoded in a target image;
      determine a final most probably mode (MPM) list of the target block based on
         statistical information of second intra-prediction modes, the second intra-prediction modes being configured to encode a plurality of first encoded blocks associated with the target block, the statistical information including a statistical count of the second intra-prediction modes of each type;
      determine, based on the final MPM list, a target intra-prediction mode corresponding to the target block; and
      encode, based on the target intra-prediction mode, the target block, wherein the determining the final MPM list of the target block based on statistical information of second intra-prediction modes includes:
         obtaining the plurality of first encoded blocks or the plurality of second encoded blocks associated with the target block, at least a portion of the plurality of first encoded blocks or at least a portion of the plurality of second encoded blocks being in the target image or in a video frame prior to the target image;
         determining an MPM candidate list based on the plurality of first encoded blocks or the plurality of second encoded blocks by ranking the second intra-prediction modes based on a descending order of the statistical counts; and, and determining one or more top-ranked second intra-prediction modes as one or more elements of the MPM candidate list; and
         determining the final MPM list based on the MPM candidate list.

2. The system of claim 1, wherein the final MPM list is further determined based on first intra-prediction modes configured to encode two or more adjacent blocks of the target block, and the determining the final MPM list of the target block includes:
   determining a preliminary MPM list based on the first intra-prediction modes, wherein in the preliminary MPM list, the first intra-prediction modes are ranked based on a descending order of a correlation degree between each of the two or more adjacent blocks and the target block; and
   determining the final MPM list based on the preliminary MPM list.

3. The system of claim 2, wherein the two or more adjacent blocks include
   a first-level adjacent block and a second-level adjacent block, wherein
   the correlation degree between the first-level adjacent block and the target block is greater than the correlation degree between the second-level adjacent block and the target block.

4. The system of claim 3, wherein
   at least a portion of a side of the first-level adjacent block overlaps at least a portion of a side of the target block; and
   only a vertex of the second-level adjacent block overlaps with a vertex of the target block.

5. The system of claim 2, wherein the determining the final MPM list based on the preliminary MPM list includes:
   determining the final MPM list based on the preliminary MPM list and one or more non-angular intra-prediction modes, wherein
      the one or more non-angular intra-prediction modes includes at least one of a planar mode or a direct-current (DC) mode; and
      the final MPM list includes at least one of the one or more non-angular intra-prediction modes and one or more top-ranked angular intra-prediction modes of the preliminary MPM list.

6. The system of claim 2, wherein the target block is encoded using multiple reference lines, and the final MPM list includes at least one non-angular intra-prediction mode and at least one angular intra-prediction mode; and
   wherein when executing the set of instructions, the at least one processor is further directed to cause the system to:
      determine the final MPM list as a first final MPM list of a first reference line of the multiple reference lines, wherein the first reference line is closest to the target block in the multiple reference lines; and
   determine a second final MPM list of non-first reference lines of the multiple reference lines based on the first final MPM list.

7. The system of claim 2, wherein the target block is encoded using multiple reference lines, and a count of the two or more adjacent blocks is 2; and
   wherein when executing the set of instructions, the at least one processor is further directed to cause the system to:
      determine the final MPM list as a first final MPM list of a first reference line of the multiple reference lines, wherein the first reference line is closest to the target block in the multiple reference lines; and
      determine a second final MPM list of non-first reference lines of the multiple reference lines by an operation including one of:

in response to determining that the preliminary MPM list includes one or two elements each of which is a planar mode or a DC mode, setting first to sixth elements of the second final MPM list as a vertical mode, a horizontal mode, an angular mode 2, an angular mode 34, an angular mode 66, and an angular mode 26, respectively;

in response to determining that the preliminary MPM list includes one or two elements only one of which is an angular intra-prediction mode m, setting the first to sixth elements of the second final MPM list as the mode m, a mode m−1, a mode m+1, a mode m−2, a mode m+2, and a mode m−3, respectively; or in response to determining that the preliminary MPM list includes two angular intra-prediction modes $m_0$ and $m_1$, and $m_0$ is ranked before $m_1$ in the preliminary MPM list, setting the first element of the second final MPM list as $m_0$;

setting the second element of the second final MPM list as $m_1$; and setting the third to sixth elements as any four of 8 modes $\min\{m_0, m_1\}+1$, $\max\{m_0, m_1\}\pm1$, $\max\{m_0, m_1\}\pm1$, $\max\{m_0, m_1\}\pm2$.

8. The system of claim 1, wherein the final MPM list is further determined based on a width and a height of the target block, and the determining the final MPM list of the target block includes:

determining a preliminary MPM list of the target block, the preliminary MPM list including a plurality of intra-prediction modes;

obtaining a size relation between the width and the height of the target block, the width of the target block being equal to a length of a first side of the target block that is along a horizontal direction of the target block, the height of the target block being equal to a length of a second side of the target block that is along a vertical direction of the target block; and determining the final MPM list by adjusting the preliminary MPM list based on the size relation.

9. The system of claim 8, wherein the determining the final MPM list by adjusting the preliminary MPM list based on the size relation includes:

adjusting positions of at least two of the plurality of intra-prediction modes in the preliminary MPM list based on the size relation.

10. The system of claim 8, wherein the determining the final MPM list by adjusting the preliminary MPM list based on the size relation includes:

replacing one or more of the plurality of intra-prediction modes in the preliminary MPM list based on the size relation.

11. The system of claim 1, wherein the determining the final MPM list of the target block includes:

determining a preliminary MPM list based on the first intra-prediction modes configured to encode the two or more adjacent blocks of the target block; and determining the final MPM list based on the preliminary MPM list and the MPM candidate list.

12. The system of claim 11, wherein the determining the MPM candidate list based on the plurality of first encoded blocks or the plurality of second encoded blocks includes:

obtaining the second intra-prediction modes;

determining the statistical information of the second intra-prediction modes; and determining the MPM candidate list based on the statistical information of the second intra-prediction modes.

13. The system of claim 11, wherein the final MPM list is further determined based on texture features of a plurality of second encoded blocks associated with the target block, and the determining the MPM candidate list based on the plurality of first encoded blocks or the plurality of second encoded blocks includes:

obtaining a first texture value of the target block and a second texture value of each of the plurality of second encoded blocks;

determining a texture difference between the first texture value and the second texture value;

selecting at least one of the plurality of second encoded blocks based on the texture differences, the texture difference of the at least one selected second encoded block being within a range;

determining one or more of the at least one selected second encoded block as one or more similar blocks of the target block;

obtaining one or more third intra-prediction modes related to the one or more similar blocks; and determining the MPM candidate list based on the one or more third intra-prediction modes.

14. The system of claim 13, wherein the first texture value is represented as a gradient value related to the target block.

15. The system of claim 14, wherein the gradient value related to the target block includes a gradient value of the target block or a gradient value of an extended target block, the extended target block including the target block, first reference pixels on a first side of the target block, and second reference pixels on a second side of the target block, the first side being adjacent to the second side.

16. The system of claim 11, wherein the obtaining the plurality of first encoded blocks or the plurality of second encoded blocks associated with the target block includes:

searching for the plurality of first encoded blocks or the plurality of second encoded blocks in a region of at least one of the target image and one or more video frames prior to the target image according to an order from left to right and from top to bottom.

17. The system of claim 11, wherein the determining the final MPM list based on the preliminary MPM list and the MPM candidate list includes:

determining the final MPM list by inserting at least one element of the MPM candidate list into the preliminary MPM list.

18. The system of claim 11, wherein the determining the final MPM list based on the preliminary MPM list and the MPM candidate list includes:

determining one or more elements to be replaced in the preliminary MPM list; and determining the final MPM list by replacing the one or more elements to be replaced with one or more top-ranked elements in the MPM candidate list.

19. A system for intra prediction, comprising:

at least one storage device including a set of instructions; and at least one processor in communication with the at least one storage device, wherein when executing the set of instructions, the at least one processor is directed to cause the system to:

obtain a target block to be encoded in a target image;

determine a final most probably mode (MPM) list of the target block based on statistical information of second intra-prediction modes, the second intra-prediction modes being configured to encode a plurality of first encoded blocks associated with the target block, the statistical information including a statistical count of the second intra-prediction modes of each type;

obtain a code word of a target intra-prediction mode of the target block;

obtain the target intra-prediction mode by decoding the code word of the target intra-prediction mode based on the final MPM list; and decode the target block based on the target intra-prediction mode, wherein the determining the final MPM list of the target block based on statistical information of second intra-prediction modes includes:

obtaining the plurality of first encoded blocks or the plurality of second encoded blocks associated with the target block, at least a portion of the plurality of first encoded blocks or at least a portion of the plurality of second encoded blocks being in the target image or in a video frame prior to the target image;

determining an MPM candidate list based on the plurality of first encoded blocks or the plurality of second encoded blocks by ranking the second intra-prediction modes based on a descending order of the statistical counts; and, and determining one or more top-ranked second intra-prediction modes as one or more elements of the MPM candidate list; and determining the final MPM list based on the MPM candidate list.

20. A method for intra prediction implemented on a machine having one or more storage devices and one or more processors, the method comprising:

obtaining a target block to be encoded in a target image;

determining a final most probably mode (MPM) list of the target block based on statistical information of second intra-prediction modes, the second intra-prediction modes being configured to encode a plurality of first encoded blocks associated with the target block, the statistical information including a statistical count of the second intra-prediction modes of each type;

determining, based on the final MPM list, a target intra-prediction mode corresponding to the target block; and encoding, based on the target intra-prediction mode, the target block, wherein the determining the final MPM list of the target block based on statistical information of second intra-prediction modes includes:

obtaining the plurality of first encoded blocks or the plurality of second encoded blocks associated with the target block, at least a portion of the plurality of first encoded blocks or at least a portion of the plurality of second encoded blocks being in the target image or in a video frame prior to the target image;

determining an MPM candidate list based on the plurality of first encoded blocks or the plurality of second encoded blocks by ranking the second intra-prediction modes based on a descending order of the statistical counts; and, and determining one or more top-ranked second intra-prediction modes as one or more elements of the MPM candidate list; and determining the final MPM list based on the MPM candidate list.

* * * * *